US007720779B1

(12) United States Patent
Perry et al.

(10) Patent No.: US 7,720,779 B1
(45) Date of Patent: May 18, 2010

(54) EXTENSIBLE BAYESIAN NETWORK EDITOR WITH INFERENCING CAPABILITIES

(75) Inventors: Benjamin Beau Perry, Bear (DE); Eli T. Faulkner, Clayton (DE)

(73) Assignee: Quantum Leap Research, Inc., Claymont, DE (US)

( * ) Notice: Subject to any disclaimer, the term of this patent is extended or adjusted under 35 U.S.C. 154(b) by 254 days.

(21) Appl. No.: 11/626,354

(22) Filed: Jan. 23, 2007

Related U.S. Application Data

(60) Provisional application No. 60/761,173, filed on Jan. 23, 2006.

(51) Int. Cl.
*G06F 17/00* (2006.01)
*G06N 5/00* (2006.01)
(52) U.S. Cl. ...................................................... 706/45
(58) Field of Classification Search .................... 706/45
See application file for complete search history.

(56) References Cited

U.S. PATENT DOCUMENTS

| | | | | | |
|---|---|---|---|---|---|
| 6,044,370 | A | * | 3/2000 | Anfindsen | 707/4 |
| 7,023,979 | B1 | * | 4/2006 | Wu et al. | 379/265.11 |
| 7,152,060 | B2 | * | 12/2006 | Borthwick et al. | 707/3 |
| 7,162,522 | B2 | * | 1/2007 | Adar et al. | 709/224 |
| 7,328,201 | B2 | * | 2/2008 | D'Ambrosio | 706/52 |
| 7,363,299 | B2 | * | 4/2008 | Dalvi et al. | 707/3 |
| 7,386,545 | B2 | * | 6/2008 | Ashutosh et al. | 707/5 |
| 7,401,057 | B2 | * | 7/2008 | Eder | 706/20 |

OTHER PUBLICATIONS

Generalized normal forms for probabilistic relational data Dey, D.; Sarkar, S.; Knowledge and Data Engineering, IEEE Transactions on vol. 14, Issue 3, May-Jun. 2002 pp. 485-497 Digital Object Identifier 10.1109/TKDE.2002.1000338.*

(Continued)

*Primary Examiner*—Michael B Holmes
(74) *Attorney, Agent, or Firm*—Brian A. Gomez; Gomez International Patent Office, LLC

(57) ABSTRACT

A system for the representation, editing, evaluation, and inference of graphical models is disclosed which can be used to construct and evaluate a graphical model or graphical network and to calculate inference values. An efficient method of updating graphical models is demonstrated, and provides the basis for an improved system for manipulation and evaluation of probabilistic models. The graphical network editor is useful in the construction of graphical modes such as Bayesian Networks. The graphical network and network graphical user interface (GUI) are used in conjunction with each other to model a system wherein failure probabilities and the current state of components are taken into account to monitor the health and progress of a system for an engineer or engineering software to evaluate and monitor. The evaluation is useful in the monitoring of assets and other real systems having multiple, dependent, and independently operating components such as a pump, a manufacturing plant, a production line, an assembly line, where asset health and quality control is a concern. The asset components each influencing some overall outcome of a system or situation. Success or failure or probability of success, probability of failure and health of the system can be monitored and manipulated by altering the values of prior probability and posterior probability values. Failure correlation between components can be evaluated wherein failure rates of asset is unknown. Production and quality can be monitored and altered.

57 Claims, 21 Drawing Sheets

Functional Block Diagram Of An Exemplary System

OTHER PUBLICATIONS

A possible world approach to uncertain relational data de Keijzer, A.; van Keulen, M.; Database and Expert Systems Applications, 2004. Proceedings. 15th International Workshop on Aug. 30-Sept. 3, 2004 pp. 922-926 Digital Object Identifier 10.1109/DEXA.2004.1333596.*

Recovery protocols in multi-agent probabilistic reasoning systems Butz, C.J.; Wong, S.K.M.; Database Engineering and Applications, 1999. IDEAS '99. International Symposium Proceedings Aug. 2-4, 1999 pp. 302-310 Digital Object Identifier 10.1109/IDEAS.1999.787280.*

Probabilistic relational indexing Chou Yu-Yu; Shapiro, L.G.; Pattern Recognition, 1998. Proceedings. Fourteenth International Conference on vol. 2, Aug. 16-20, 1998 pp. 1331-1335 vol. 2 Digital Object Identifier 10.1109/ICPR.1998.711947.*

A Recommendation Algorithm Combining User Grade-Based Collaborative Filtering and Probabilistic Relational Models Ying Gao; Hong Qi; Jie Liu; Dayou Liu; Fuzzy Systems and Knowledge Discovery, 2007. FSKD 2007. Fourth International Conference on vol. 1, Aug. 24-27, 2007 pp. 67-71 Digital Object Identifier 10.1109/FSKD.2007.113.*

Probabilistic Relational Database Applications for Biomedical Informatics Ping-Tsai Chung; Hsin-Hua Hsiao; Advanced Information Networking and Applications—Workshops, 2008. AINAW 2008. 22nd International Conference on Mar. 25-28, 2008 pp. 720-725 Digital Object Identifier 10.1109/WAINA.2008.280.*

A probabilistic relational student model for virtual laboratories Noguez, J.; Sucar, L.E.; Computer Science, 2005. ENC 2005. Sixth Mexican International Conference on Sept. 26-30, 2005 pp. 2-9 Digital Object Identifier 10.1109/ENC.2005.7.*

Situation assessments using object oriented probabilistic relational models Howard, C.; Stumptner, M.; Information Fusion, 2005 8th International Conference on vol. 2, Jul. 25-28, 2005 p. 8 pp. Digital Object Identifier 10.1109/ICIF.2005.1592031.*

* cited by examiner

FIG. 1 Functional Block Diagram Of An Exemplary System

FIG. 5  Exemplary Logical Relational Data Structure Of The Bayesian Network

FIG. 7 Exemplary Modified Alternative Bayesian Network

Exemplary Second Alternative Bayesian Network

FIG. 9 Exemplary Modified Second Alternative Bayesian Network

Exemplary Bayesian Network Editing Field

FIG. 14 Exemplary Node Properties Window Showing General Properties

FIG. 15  Exemplary Node Properties Window Showing A CPT Table

FIG. 17 Exemplary Bayesian Network Editor Window - Nodes, Arcs, Tool Pallets

FIG. 19  Exemplary Text CPT Window

Exemplary Data Evidence Curve Of A Data Generator Window

EXTENSIBLE BAYESIAN NETWORK EDITOR WITH INFERENCING CAPABILITIES

CROSS-REFERENCE TO RELATED APPLICATIONS

The present application claims priority from U.S. Provisional Application Ser. No. 60/761,173 filed on Jan. 23, 2006.

STATEMENT REGARDING FEDERALLY SPONSORED RESEARCH OR DEVELOPMENT

Portions of the present invention were developed with funding from the Office of Naval Research under contract N00014-02-C-0320, and contract N00014-05-C-0541.

FIELD OF THE INVENTION

The field of the invention generally relates to data processing, graphical modeling, graphical networks, Bayesian networks, extensible Bayesian networks, generation of such networks, calculation of inference, and the use and manipulation of such networks in applications such as asset monitoring.

BACKGROUND OF THE INVENTION

A fundamental characteristic of graphical modeling is modularity. A complex system can be constructed by the combination of simpler parts, such as sub-graphs, conditional probability tables (CPTs), arcs and nodes. Probability theory can be used to provide the link for the combination of parts, affording a mathematical interface between models, data and information. Graphical modeling further provides an intuitively appealing formalism and interface for the construction and manipulation of sets of variables or data structures acting within a set of interactive models. It also provides an intuitive visual representation of an asset monitor for a user through the use of data, graphical representations, probability theory and visual cueing.

Many of the classical multivariate probabilistic systems studied in fields such as statistics, systems engineering, information theory, pattern recognition and statistical mechanics are special cases of a general graphical model formalism. Some examples include mixture models, directed graphical models, factor analysis, hidden Markov models, Kalman filters and Ising models. The graphical model framework provides a way for a human to view all of these systems as instances of a common underlying formalism. The graphical model formalism provides a natural framework for the design of new systems. This allows joint distribution to factor into a product of conditional distributions. The graphical model structure may indicate direct dependencies among random variables and may indicate conditional independencies among give values of influencing variables.

Through computer science, the advent of artificial intelligence (AI) has presented many decision support systems to aid users in the understanding and control of complex systems. Decision support through the use of computers and models has greatly increased a human's ability to control and evaluate real world systems. Decisions and recommendations can be rendered by either of, or both a computer and human. Thus the human can become better informed, increasingly aware and controlling of situations surrounding multivariate systems that would otherwise overwhelm the human capacity of understanding and judgment.

During the creation of decision support systems, computer scientists seek to provide a framework to supply decisions or decision recommendations with the greatest possible accuracy and speed. The decision support system is constructed in an effort to allow for increased awareness, increased accuracy, faster analysis, and increased control in the overall operation of a situation or system under observation. Applications of decision support systems include medical diagnosis, troubleshooting of computer networks, asset monitoring, automotive trouble-shooting and monitoring, electro-mechanical troubleshooting, monitoring of complex systems or the troubleshooting of complex systems, or gene regulatory networks. Decision support systems calculate decisions based upon recognizable, obvious, non-obvious, observable, unobservable, hidden, latent or unrecognizable criteria while incorporating their probabilistic, logistical and mathematical relationships.

Why Use a Bayesian Network?

As an example of an application of graphical models, consider the case of a Bayesian network used in manufacturing. By employing an observer, an asset monitor, or an automated system for the collection of data through the observation of a situation under observation, data for a model system can be collected from sources observing the situation to be modeled with a graphical model. This data can be organized and provided for a domain expert for use in the generation a Bayesian network. Data may be collected and used in real time and may be stored and used for historical analysis. Useful predictions can thus be made on the output of system being modeled, including yield characteristics, failure predictions and the ability to control quality. This increased ability of production control and monitoring, afforded through the use of the Bayesian network, can be realized as increased productivity, decreased costs, decreased waste of material, decrease use of energy and faster production.

Mathematical Background

If an experiment is performed or observations are made on a situation, an acceptable probability of an event may be calculated. If this event, event A, occurs with a given frequency, the value of the probability of event A's occurrence becomes acceptable and usable with a degree of confidence. We can make similar observations of other events within the same situation or within a set of observables. Suppose during our observations that a set of other events occur, including an event B. This leads to a question regarding the occurrence of the event B. How does the knowledge of the probability of event A revise the probability of event B?

For example, given a set of one million bicycles painted blue or red, we have no idea as to the specific amount of blue bicycles. Some bicycles are equipped with an apple seat or a banana seat. Knowing how likely a selection from the set of bicycles will be blue would be helpful, as to the type of seat. Counting all of the bicycles in the set would take an extraordinary amount of time and effort. To lessen our burden, we take a random sample of a substantial size, say one hundred bicycles and count how many are blue and how many are red. After repeating the sample 19 times, we calculate that 35% of the samples are red, while 65% of the sample is blue. We also calculated that 25% of the samples have apple seats while 75% of the bicycles have banana seats. We can evaluate our accuracy and thus establish confidence on our estimates by calculating the standard deviation of the samples. We can further refine our confidence by calculating the sample error and comparing a z-test value against expected values. This will allow us to gauge whether or not the sample size was sufficient for our purposes based upon the set size.

At times, these events may have been observed as occurring simultaneously, independently or dependently. Suppose that N observations have been made, and that event A occurred $n_a$ times, event B occurred $n_b$ times, and it was observed that the combination of event A and event B occurred $n_{a \cap b}$ times. Consequently, event A occurred a $n_{a \cap b}/n_b$ times among the $n_b$ times event B occurred. If the experiment is conducted a large amount of times, N, then we can assume the probability of the event A occurring given the knowledge that event B is occurring can be expressed as $(n_{a \cap b}/N)/(n_b/Na)$ which is equivalent to $P(A \cap B)/P(B)$. The conditional probability of event A occurring given the fact that event B is occurring is expressed as $P(A \cap B)/P(B) = P(A|B)$. Consequently $P(B|A) = P(A|B)P(B)/P(A)$ and is read as the probability of event B occurring while event A is occurring is equal to the probability of event A occurring given the probability of event B times the ratio of the probability of event B to that of the probability of event A.

These mathematical relationships between events can be extended and generalized into mathematical relationships for more than two events. Give event A, event B and event C, the probability of all three occurring is notated as $P(A \cap B \cap C) = P(A|B \cap C)P(B|C)P(C)$. It is evident that any number of probabilities of any number of events can be evaluated. These mathematical relationships among variables have been formalized for us by Thomas Bayes, and are generally known as Bayes' Theorems.

As with any experiment or observation involving a degree of randomness or chaos, involving weather, games of chance or manufacturing systems, there is an underlying set of assumptions, known variations, and constraints. Given a discrete set of variations, such as the value of a card from a standard set of fifty two playing cards, or the permutations of a pair of thrown dice, or the meteorological event of rain, or the acceptability of a product from an assembly line, a deterministic background may coexist with a randomly varying counterpart. If the events of the situation are limited to a specific or discrete outcome, or a finite set of outcomes, there may be a fixed or acceptable value of expectation of each of those events, yet we are limited in our control and actual realization of those outcomes.

Bayesian Networks

Bayesian networks are an excellent choice of graphical model for decision support modeling. A Bayesian network can be described as a graphical model for probabilistic and deterministic representations of real world situations. Graphically, a Bayesian network is generally constructed using nodes (vertices) and directional arcs (edges). Mathematically, nodes are used to represent events, states of events or variables of the event. Nodes may have probabilities, conditional probability or marginal probabilities associated with the variables of the events and can be used to represent any kind of variable. Arcs may be used to indicate logical influences, logical dependencies, mathematical influences, mathematical dependence, probabilistic dependence and probabilistic influences between nodes. The lack of an arc between nodes indicates independence between events of associated nodes. Graphical models unite mathematical theory, probability theory, logical theory and graph theory seamlessly and are a natural tool for solving problems that occur throughout mathematics and engineering by addressing uncertainty and complexity in user friendly environment which may be used to represent and construct an immediately recognizable visual representation of a complex system. Bayesian networks can also be applied to design and analysis of learning algorithms, among other applications.

Within a Bayesian network, an arc emanating from a first node to a second node indicates the first node is mathematically dependent and logically dependent on the second node. This notion can be associated between multiple nodes connected via a path comprised of a series of consecutive directional arcs. For example, if Node C is dependent upon Node B, and node B is dependent on Node A, then we can assume with certainty that Node C is dependent upon Node A. Node A, Node B and Node C can be described as being conditionally dependent. The lack of an arc between two nodes is indicative of conditional independence. Examples of Bayesian networks are illustrated in FIGS. 2, 3, 4, 6, 7, 8 and 9.

A Bayesian network may be used to represent a joint probability distribution over all of the variables represented by the nodes of the graphical model. If the variables $X(1), \ldots, X(n)$ represent events $1 \ldots, n$ and Parents(A) are the parental nodes of NodeA. We can say that the joint distribution for variables $X(1)$ through $X(n)$ is represented as the mathematical product of the probability distributions of $P(X(i)|parents(X(i)))$ for $i=1$ to n. That is, given the probability of the parental nodes of node $[X(1), \ldots, X(n)|X(1)] [X(2), \ldots, X(n)|X(2)]*[X(3), \ldots, X(n)|X(3)]* \ldots, [X(n-1)X(n)|X(n)][X(n)|X(n)]$. If the variable X has no parents, or is represented by a root node, then the probability distribution of X is unconditional, otherwise the distribution of X is conditional.

By visually studying the graphical model of the Bayesian network, questions concerning the dependencies between variables can be realized by the user. The graphical notion of d-separation corresponds to the graphical notion of conditional independence. If Node A and Node B are d-separated, then variable A and variable B are independent given the evidence variables. The set of nodes which Node X is directly dependent upon consists of Node X's Markov blanket 2001, FIG. 2. The Markov blanket of a node, X is the set of nodes consisting of X's parents, X's children, and the parents of X's children.

To perform numerical calculations on the entire Bayesian network, such as performing inference, it may be necessary to specify the probability distribution for each node X with respect to the parents of that node. This approach may become numerically large and consume processor resources. Using discrete distributions, Boolean distributions, or Gaussian distributions limitations may be imposed on the model, based on the knowledge of the distribution. Algorithms are introduced to circumvent this situation by introducing the principle of maximum entropy for the specification of the distribution given known constraints. These known constraints may be coalesced from streaming data or data bases through various methods. To maximize accuracy, assumptions need to be minimized. The introduction of assumptions into the model lends to the increase of entropy, which is preferably avoidable. Typically, conditional distributions rely mathematically on known constraints and parameters which are traditionally coalesced from data, often employing a maximum likelihood algorithm, iterative approximation algorithms, or expectation-maximization algorithms.

The purpose of calculating inference is to determine the conditional distribution of a subset of variables, given the condition of known values or variables for a distinct subset of evidence values or evidence variables. This specific conditional distribution is known as the posterior distribution of the subset of the evidence variables. The posterior distribution allows a user to select values for the variable subset. The Bayesian network can be used as a mechanism for automatically constructing an extension of Bayes' Theorem to calculate distributions for increasingly complex problems. The prior art methodology is limited by inexact methods such as iterative variable elimination (either discrete or continuous) of the variables via distribution of the sum over the product, clique tree propagation which caches computations to query variables iteratively, and recursive conditioning which trades accuracy for time and processing speeds. The mathematical complexity of these methodologies grows exponentially with Bayesian network width, making them unsuitable for many applications. Other approximate inference algorithms incorporate stochastic simulation, mini-bucket elimination and variational methods, all suffer from inherent limitations of either accuracy or time.

Many situations can be modeled using the knowledge based approach. In one such situation, we can model a situation wherein we have two neighbors besides our vacation home, of which we never visit. Our neighbors, John and Mary, call when our alarm sounds. The alarm will sound in the event of a flood or a burglary. From historical records and data, we have concluded that the chances of our vacation home experiencing a flood, $P(F)=0.02$ and homes in that area have a probability of being burglarized, $P(B)=0.01$. John is our more diligent neighbor and will call 0.90 ($P(J|A)=0.90$) of the times the alarm sounds, while Mary will call 0.70 ($P(M|A)=0.70$) of the times the alarm goes sounds. Either one or both of them call when our house alarm goes sounds. Suppose that a flood occurred, and that $P(A|B,F)=0.29$ wherein burglary equals false and earthquake equals true. What is the probability that John is going to call? We take the product of $P(A|B,F)*P(J|A)=(0.29)(0.90)$ to get 0.261. In the event that our alarm sounds and we receive a call, our Bayesian network can also be used to calculate the probability that it is John calling. This calculation practice is known as inference. Bayesian inference allows for a prediction to be made based on knowledge or experience.

Bayesian networks are a powerful alternative to a rules-based approach for inference. They allow both a black and white approach as well as a very gray approach to solving problems. Instead of an outcome being "yes" or "no", it now can be "80% yes", and "20% no." The ability to formulate a decision such as "yes" or "no" is helpful yet that ability coupled with a confidence metric is increasingly informative and explanatory. A rendered decision based on possible actions is a better informed decision if coupled with an ability to assess the confidence of the decision variables.

Flexibility of rules-based networks coupled with expert software objects and modules allow for proactive monitoring of equipment and equipment conditions for the prediction of problems at an earlier point in time, thus allowing for alarm operations to take action. Early detection of alarm conditions allows system monitors and custodians to detect problems or potential problems before problems reach typical alarm limits of traditional process control systems. Problems detected comprise problems related to efficiency, equipment failure, environmental regulations, production yields, resource consumption, quality control, unsafe conditions and other factors.

There are several inference techniques available for Bayesian networks which often perform better than traditional art rules-based inference approaches. However, one of the main drawbacks to Bayesian networks is the large amount of information that must be entered either by hand or by some machine learning technique for every single node in the network. Often, in the design of a decision support system, a vast amount of time can be required to enter enough information to build an accurate representation of the domain, or useful inferences for that representation. This is particularly true for Bayesian network nodes whose purpose are to emulate a well-understood rule, such as defined by an "AND" or an "OR" node.

Bayesian Network Construction

The construction of Bayesian networks can be approached in many ways. Two of the most popular and conventional approaches are the "knowledge based approached" and the "data based approach." With the knowledge based approach, a domain expert is employed to identify distinctions of the world which are important for making distinctions within our model. Distinctions made are translated into domain variables to be used within the Bayesian network. The domain is considered to be the set of all variables in the Bayesian network. At times some of the pertinent domain knowledge is unavailable, or is not specifically identifiable. Domain knowledge can be learned by modeling the system with known parameters. Dependencies among the variables are proposed, identified and verified as are probability distributions of the variables. The dependencies and probability distributions are used to quantify the strengths of the influences between variables or the strengths of the dependencies. Dependencies can be graphically illustrated as directional arcs within the graphical representation of the model system or situation. The variables and dependencies thus represented manifest themselves as a Bayesian network.

Using the data-driven approach, the expert identifies and determines the variables of the domain. Data is collected for variable that are used to drive an applicable algorithm for the generation of a Bayesian Network. The data is collected from the real world and instances of decisions made in the domain. Traditionally, the data-driven approach is used when variables are discrete.

DESCRIPTION OF RELATED ART INCLUDING INFORMATION DISCLOSED UNDER 37 CFR 1.97 AND 1.98.

Friedman et al., Learning Bayesian network structure from massive datasets: the "sparse candidate" algorithm. Proceedings of the International Conference on Uncertainty in Artificial Intelligence (1999).

U.S. application Ser. No. 08/240,019 filed May 9, 1994 entitled "Generating Improved Belief Networks" describes an improved system and method for generating Bayesian networks (also known as "belief networks") that utilize both expert data received from an expert ("expert knowledge") and data received from real world instances of decisions made ("empirical data"). By utilizing both expert knowledge and empirical data, the network generator provides an improved Bayesian network that is more accurate than conventional Bayesian networks. In addition, the exemplary embodiment facilitates the use of continuous variables in Bayesian networks and handles missing data in the empirical data that is used to construct Bayesian networks.

Several prior inventions have applied variations of probabilistic inference to the areas of diagnosis and fault analysis. U.S. Pat. No. 5,133,046, to Kaplan, for a "Computer-based diagnostic expert system organized according to Bayesian theory" presents an expert system which applies bayesian logic to discretized time-series information. This system considers time series data, but has no particular ability to incorporate existing knowledge in the form of Boolean expressions or to generate test cases via graphical manipulation of the time-series data. U.S. Pat. No. 5,715,374 to Heckerman, et al. discloses a "method and system for case-based reasoning utilizing a belief network", which uses a complex model, including: issues, causes, resolutions, symptoms, terms, and alternates, and thus constrains the domain expert to a model that may not be appropriate or consistent with their view of the domain. U.S. Pat. No. 6,330,563 to Heckerman, et al. describes an "architecture for automated data analysis" which includes two stages of learning, and two different types of probabilistic models (bayesian network, and naive bayes clustering), to discover new relationships among variables. Heckerman's modeling environment is aimed at data analysts, rather than domain experts, and is very complex for the end user. Also, Heckerman's models are aimed entirely at discovering new relationships, rather than in exploiting initial knowledge, given an expert model.

US Patent Application 20030115325 to Cohen, et al. describes a method for "adapting Bayesian network parameters on-line in a dynamic environment", which obtains a traditional Bayesian influence network from a domain expert, then adjusts the parameters, based on new observations. This method does not intrinsically support the representation of boolean operators, the relaxation of those operators, or the automatic construction of test data from time-series drawings.

In the commercial world, the two popular tools for creating Bayesian networks are HUGIN (www.hugin.com) and Netica (www.norsys.com). Both of these systems have graphical user interfaces for the construction and manipulation of Bayesian Networks, but neither supports the direct incorporation of Boolean expressions, nor do they support relaxation of the crisp-logic constraint of Boolean expressions, and neither permits the user to draw the statistical behavior of variables over an independent variable such as time, or to use such a drawing to generate test data.

Thus, there is a need for a system that incorporates arbitrary Boolean components in a Bayesian Network framework, supports variable degrees of crisp logic behavior of those components, and that supports efficient update of the resulting networks, and that allows users to construct sample data by graphically manipulating generation curves, or by fitting an existing data set and constructing alternative scenarios based on that data.

BRIEF SUMMARY OF THE INVENTION

Important aspects of the instant invention can be described in the following ways:

In a computer system, having at least one processor or virtual machine, at least one memory unit, at least one input device, at least one output device, an optional network, an optional shared memory among the at least one processor, a method for processing conditional probabilities comprises computer implemented steps of: creating a representation of a first event and a representation of a second event of a model system; creating a representation of at least one logical influential relationship between the first event and the second event; creating a representation of a probabilistic relational data structure incorporating probabilistic influences of the at least one logical influential relationship between the first event and the second event; populating the probabilistic relational data structure with a first set of probabilities representing the probabilistic influences between the first event and the second event; creating a modified probabilistic relational data structure while maintaining the logical influential relationships between the first event and the second event; and populating the modified probabilistic relational data structure with a second set of probabilities representing modified probabilistic influences between the first event and the second event while preserve the logical influential relationships between the first event and the second event.

In a computer system, having at least one processor or virtual machine, at least one memory unit, at least one input device, at least one output device, an optional network, an optional shared memory among the at least one processor, a method for processing probabilities within a graphical model comprises computer implemented steps of: creating a probabilistic relational data structure comprising entries of a first probability of at least a first state of a first event and entries of a second probability of at least a second state of a second event, the entries being constrained by probabilistic relationships, logical relationships and influential relationships as represented by the graphical model; manipulating the first probability of the first state of the first event; calculating the second probability of the second state of the second event based upon the manipulations of the first probability of the first event; and maintaining the constraints imposed by the logical relationships between the nodes, representing events and their states, of the graphical model.

In a computer system, having at least one processor or virtual machine, at least one memory unit, at least one input device, at least one output device, an optional network, an optional shared memory among the at least one processor, a method for processing conditional probabilities comprising computer implemented steps of: identifying a related first event among a collection of situationally related events within a model system; creating a user manipulable distribution of an incidence profile of an observable or unobservable event per unit time within a user manipulable time interval; creating a probability distribution representing probabilities of an occurrence of the first event within the time interval; and creating data cases based on the probability and distribution of the related first event.

In a computer implemented system having at least one processor or virtual machine, at least one memory unit, at least one processing unit, at least one input device, at least one output device, an optional network, an optional shared memory among the at least one processor, a method for generating and manipulating a graphical representation of an environment comprising observable events and unobservable events, the method comprising the computer implemented steps of: presenting a workspace to a user, the workspace supporting the graphical representation; presenting a first palette of user manipulable graphical objects, the graphical objects representing at least a first state of a first event; presenting a second palette of user manipulable graphical tools; presenting at least one user manipulable first conditional probability table of a state of an event exhibiting inference with respect to a second state of a second event; and populating a second conditional probability table reflecting the manipulations of the first conditional probability table.

In a computer implemented system having at least one processor or virtual machine, at least one memory unit, at least one processing unit, at least one input device, at least one output device, an optional network, an optional shared memory among the at least one processor, a method for processing conditional probabilities comprising computer implemented steps of: presenting in a workspace a user manipulable graphical representation of a first set of values of a first conditional probability table representing at least one state of at least one event; reflecting proportional changes of the user manipulated graphical representation in the first conditional probability table; calculating inference of at least a second state of a second event of a second conditional probability table, the calculation being based on the user changes of the first conditional probability table; and proportionally graphically representing a second set of values of the second conditional probability table in a second graphical representation.

Specifically, the present invention provides in a computer system, having at least one processor or virtual machine, at least one memory unit, at least one input device and at least one output device, and optionally a network and optionally memory shared among the at least one processor, a data processing method for modifying probabilistic data structures comprising the computer implemented steps of:

a. creating a representation of a first event and a representation of a second event of a model system;
b. creating a representation of at least one logical influential relationship between the first event and the second event;
c. creating a representation of a probabilistic relational data structure incorporating probabilistic influences of the at least one logical influential relationship between the first event and the second event;
d. populating the probabilistic relational data structure with a first set of probabilities representing the probabilistic influences between the first event and the second event;
e. creating a modified probabilistic relational data structure while maintaining the logical influential relationships between the first event and the second event; and
f. populating the modified probabilistic relational data structure with a second set of probabilities representing modified probabilistic influences between the first event and the second event while preserving the logical influential relationships between the first event and the second event.

The present invention further provides in a computer system, having at least one processor or virtual machine, at least one memory unit, at least one input device and at least one output device, and optionally a network and optionally memory shared among the at least one processor, a method for processing relationships within a graphical model comprising the computer implemented steps of:

a. creating a probabilistic relational data structure comprising entries of a first probability of at least a first state of a first event and entries of a second probability of at least a second state of a second event, wherein the probabilistic relational data structure reflects constraints of (probabilistic relationships, logical relationships and influential relationships) as represented by the graphical model;
b. manipulating the first probability of the first state of the first event;
c. calculating the second probability of the second state of the second event based upon the manipulations of the first probability of the first event; and
d. maintaining the constraints imposed by the logical relationships between the events of the graphical model.

Another embodiment of the present invention includes a computer system, having at least one processor or virtual machine, at least one memory unit, at least one input device, at least one output device, optionally a network, optionally shared memory among the at least one processor, a method for generating data from a user-specified profile comprising computer implemented steps of:

a. identifying a first element among within a model system that contains at least one second element;
b. creating a user-modifiable incidence profile of the first element per incremental unit of the second element within an interval of units of the second element;
c. creating a probability distribution representing probabilities of a value of the first element within the interval of units of the second element; and
d. generating data cases based on the probability and distribution of the first element.

Yet another embodiment of the present invention includes a computer implemented system having at least one processor or virtual machine, at least one memory unit, at least one processing unit, at least one input device, at least one output device, optionally a network, optionally shared memory among the at least one processor, a method for generating and manipulating a graphical representation of probabilistically related events, the method comprising the computer implemented steps of:

a. presenting a workspace to a user, the workspace supporting the graphical representation;
b. presenting a first pallet of user manipulable graphical objects, the graphical objects representing at least a first state of a first event;
c. presenting a second pallet of user manipulable graphical tools;
d. presenting at least one user manipulable first conditional probability table of a state of an event exhibiting inference with respect to a second state of a second event;
e. populating a second conditional probability table reflecting the manipulations of the first conditional probability table; and
f. populating the second conditional probability table of the second state to meet a user-selected metric of accuracy.

In yet another embodiment the present invention provides a computer implemented system having at least one processor or virtual machine, at least one memory unit, at least one processing unit, at least one input device, at least one output device, optionally a network, optionally shared memory among the at least one processor, a method for processing conditional probabilities comprising computer implemented steps of:

a. presenting in a workspace a user manipulable graphical representation of a first set of values of a first conditional probability table representing at least one state of at least one event;
b. reflecting proportional changes of the user manipulated graphical representation in the first conditional probability table;
c. calculating inference of a second state of a second event of a second conditional probability table, the calculation being based on the user changes of the first conditional probability table; and
d. proportionally graphically representing a second set of values of the second conditional probability table in a second graphical representation.

In yet another embodiment the present invention provides a data-processing system, having:

one or more processors or virtual machines,
each processor comprising one or more cores,
the system comprising one or more memory units,
one or more input devices,
one or more output devices,
optionally a network, and
optionally shared memory supporting communication among the processors, a computer implemented system for modifying probabilistic data structures and processing relationships comprising:

a. a means of creating a representation of a first event and a representation of a second event of a model system;
b. a means of creating a representation of at least one logical influential relationship between the first event and the second event;
c. a means of creating a representation of a probabilistic relational data structure incorporating probabilistic influences of the at least one logical influential relationship between the first event and the second event;
d. a means of populating the probabilistic relational data structure with a first set of probabilities representing the probabilistic influences between the first event and the second event;
e. a means of creating a modified probabilistic relational data structure while maintaining the logical influential relationships between the first event and the second event;
f. a means of populating the modified probabilistic relational data structure with a second set of probabilities representing modified probabilistic influences between the first event and the second event while preserving the logical influential relationships between the first event and the second event; manipulating the first probability of the first state of the first event;
g. a means of calculating the second probability of the second state of the second event based upon the manipulations of the first probability of the first event; and
h. a means of maintaining the constraints imposed by the logical relationships between the events of the graphical model.

In yet another embodiment the present invention provides a data-processing system, having:
one or more processors or virtual machines,
each processor comprising one or more cores,
the system comprising one or more memory units,
one or more input devices,
one or more output devices,
optionally a network, and
optionally shared memory supporting communication among the processors, a computer implemented system for generating data from a user-specified profile comprising:
a. a means of identifying a first element among within a model system that contains at least one second element;
b. a means of creating a user-modifiable incidence profile of the first element per incremental unit of the second element within an interval of units of the second element;
c. a means of creating a probability distribution representing probabilities of a value of the first element within the interval of units of the second element; and
d. a means of generating data cases based on the probability and distribution of the first element.

In a final embodiment the present invention provides a data-processing system, having:
one or more processors or virtual machines,
each processor comprising one or more cores,
the system comprising one or more memory units,
one or more input devices,
one or more output devices,
optionally a network, and
optionally shared memory supporting communication among the processors, a computer implemented system for generating and manipulating a graphical representation of probabilistically related events and processing conditional probabilities comprising:

a. a means of presenting a workspace to a user, the workspace supporting the graphical representation;
b. a means of presenting a first pallet of user manipulable graphical objects, the graphical objects representing at least a first state of a first event;
c. a means of presenting a second pallet of user manipulable graphical tools;
d. presenting at least one user manipulable first conditional probability table of a state of an event exhibiting inference with respect to a second state of a second event; and
e. a means of populating a second conditional probability table reflecting the manipulations of the first conditional probability table;
f. a means of populating the second conditional probability table of the second state to meet a user-selected metric of accuracy.

BRIEF DESCRIPTION OF THE SEVERAL VIEWS OF THE DRAWING(S)

The invention is herein described, by way of example only, with reference to the accompanying drawings. Specific references to the drawings are made in detail to emphasize particulars of the invention shown by way of example and for illustrated purposes and discussion of the preferred embodiments of the present invention only. They are presented for providing what is believed to be the most useful and understood description of the principles and concepts of the invention. The description, along with its associated figures, discloses to those skilled in the how multiple forms of the invention can be embodied in practice.

DETAILED DESCRIPTION OF THE INVENTION

Operating Environments

Figure 1:
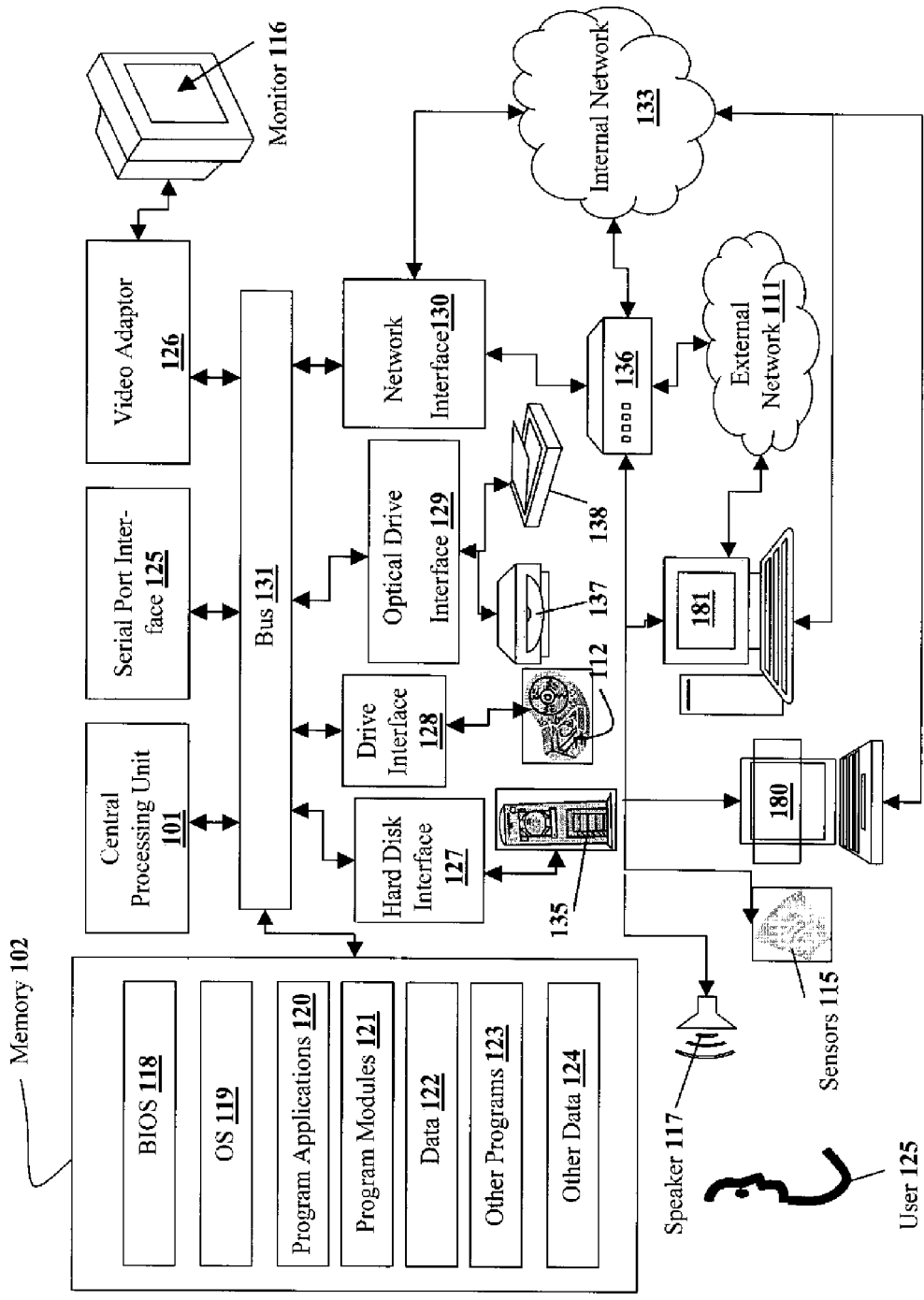
FIG. 1 illustrates a functional block diagram of an exemplary system which supports in accordance with one or more aspects of the present invention.

The instant invention, or any portion thereof, can be implemented in any generic computing environment such as a general purpose computing system or personal computer, such as a stand-alone PC or a lap-top machine. The instant invention can also be implemented in Sun Microsystem's Java Runtime Environment. The environment can readily and easily be obtained directly from Sun Microsystems via http://java.sun.com/j2se/1.432/jre/install.html. Other computer environments can be employed including but not limited to Microsoft's Windows environments, Apple's MacIntosh environments, Unix environments, Unix-like environments, Linux environments, System V environments, BSD environments, MS-DOS environments, Windows NT environments, OS environments, OS/2 environments, z/OS environments, QNX environments, eCos environments, PamOS environments, Windows CE environments, Windows XP environments, VMS environments, Mac OS environments, Mac OS X environments, RISC OS environments, yellowTAB Zeta environments, BeOS environments or any known environment capable of supporting general-purpose processing.

In a preferred embodiment, the instant invention can be implemented on a single machine. In another preferred embodiment, the instant invention can be implemented on multiple machines or on multiple machines running in parallel or in sequence. In another preferred embodiment at the instant invention can be implemented on multiple machines running in parallel in a network environment. In another preferred embodiment, at least one server can be used with any of the above machine configurations, supporting any portion of the invention. The instant invention can be implemented in whole or in part, using uniprocessing, parallel processing, symmetric multiprocessing, or massively parallel processing, and can use single- or multi-cpu computer architectures, as well as cluster computers and grid computing systems. The present invention can use either of both uniform memory architectures and non-uniform memory architectures. In the case of multiple machines, communication among individual processors can be accomplished via network connections or via shared or mutually accessible memory.

Graphical user interfaces (GUIs) are used extensively for direct manipulation of graphical images, buttons, check boxes, command menus, context menus. combo boxes, data, dialog boxes, edit fields, grid views, icons, menus, modal windows, panels, pie menus, radio buttons, scrollbars, status bars, toolbars, text, text boxes, tool-tips, tree views, windows, window objects, and widgets. Displays of visual elements including palettes of tools and palettes of objects can be presented to a user within a workspace that can be presented on a display such as a CRT, LCD, plasma display, or similar device. Data can be manipulated through the use of widgets or windows wherein a user can interact with data. Physical counterparts can also be employed through physical buttons found on keyboards, keypads or the like.

Expert systems, such as those associated with a graphical network such as a Bayesian network, rely upon specific artificial intelligence (AI) techniques that typically rely on a set of rules to make decisions based on given data. In a preferred embodiment, these rules are typically manifested in a set of logical rules and are graphically represented as arcs and nodes. For an expert system combined with a Bayesian network, the logical rules can be represented by "OR" and "AND" nodes or complex nodes comprising multiple logical operators combined in a Boolean algebraic function. The expert system combined with a Bayesian network allow for the evaluation of inference using several techniques. Some of the techniques can comprise a constraint satisfaction technique, random sampling and accurate approximations for generation of solutions to NP-hard problems. Classification of sets and intelligent responses are also possible by following the rules as established.

There are several benefits to using a rules based approach. One of the primary benefits is that the rules are black and white, are either true or false, thus leaving no room for interpretation, which provides for a crisp, clear decision. However, modeling a system under observation, such as a real-world situation, may not always necessitate or be sufficiently represented by the set of discrete rules. As with most instances of real world events the potential for exception to the rules tends to be the rule, as opposed to being the exception.

Expert systems are typically employed to aide a human in the process of decision making. Typically, a knowledge engineer, or other user, is employed to interview domain experts in an attempt to embody their knowledge and ability in a computer program for the performance of specific tasks. Expert systems attempt to duplicate the ability and performance of the domain experts. Capturing the domain experts' knowledge and ability within the functionality of a computer program is of paramount importance if the system is to perform the same tasks as the domain experts.

How well the expert system performs depends on the presence of the intellectual mechanism required for the task to be available. When this is not the case, there are many disappointing results. A pioneering expert systems was MYCIN in 1974. MYCIN was used to diagnose bacterial infections of blood samples for the suggestion of treatments. Provided the system's limitations were observed, MYCIN performed better than the surveyed medical students and practicing doctors. MYCIN ontology included bacteria, symptoms, and treatments, yet failed to include patients, doctors, hospitals, death, recovery, and events occurring in time. MYCIN was limited to interacting with a single patient, not a collection of patients or collective medical data. The usefulness of MYCIN depended on its users practicing common sense.

The instant invention solves the problems of the prior art by allowing additional expert rules to be introduced into the Bayesian network model through the execution of graphical manipulations. In a preferred embodiment, a user can introduce additional expert rules into the Bayesian network model by inserting additional nodes into the Bayesian network graphical model. The insertion of a node into the graphical model introduces the node's associated conditional probability table (CPT) into the network model. This functionality allows "AND" and "OR" nodes along with their associated CPTs to be easily inserted into the Bayesian network model by a simple drag-and-drop, point-and-click, or similar maneuver. Further this manipulation can also initiate automatic filling of effected CPTs in the network model of existing nodes when an additional node is added to the graphical model as a parental node, or a root node. Further the instant invention allows for the user to adjust any node's CPT, thus relaxing the behavior of rules that typically exhibit crisp Boolean behavior.

By incorporating Boolean expert rules within Bayesian networks, the instant invention allows for easier design, and on-the-fly manipulation of Bayesian networks and network models during execution and during editing over the prior art. Within a preferred embodiment, the user is no longer burdened to separately enter a CPT each time an additional "AND" node or an "OR" node is desired. The user has the full power of Bayesian expressions, and may use those expressions in conjunction with traditional Bayesian networks, and can even relax the crispness of Boolean expressions to provide a shading of their normal all-or-nothing logic. For example, an "AND" node need not be "100% false" if not all of the conditions are met. The "AND" node can be "80% false", or "20% false", or "99.9999% false", or any level of "false" which is mandated by the user. Further, the calculation and evaluation of inference occurs in both directions without the need to modify the Bayesian inference algorithm, as the expert-rules nodes are implemented as Bayesian network nodes.

Not only can the networks guide a user in their decision making process with a "yes" or "no" answer, but the invention can also serve to lend explanation to the decision, allowing for an educated decision to be made. Thus the invention can support its' decision of "yes" or "no" with a probability, thus lending itself to explanation and confidence of decision.

The instant invention can perform various methods of inference on Bayesian networks. It also allows for extensibility of Bayesian networks. The inference capability allows for a conclusion to be made of the most likely explanation, given evidence. It allows for the calculation of the probabilities of all the states of all the events. The invention further allows for modifications to the Bayesian network to be made during runtime. Additionally, expert rules can be inserted into the Bayesian network by a user at run-time.

For example, if a user suspects that a root node, representing a subset of variables of a situation under observation can benefit from having additional information fed to it, or additional probabilistic influence, the user can insert an appropriate arc to at least a portion of the remaining non-root nodes, or the user can insert an additional node, thus further refining the model. Additionally, if a user suspects the model's reflection of a real system can benefit from an additional "OR" or "AND" node, the user can insert the appropriate node within the existing model at runtime wherein values of affected CPTs are updated concurrently and automatically. Thus, in a preferred embodiment, the user can readily drag and drop a set of rules or conditions, as represented by a node, within their network to create a fully rules-based Bayesian network and still maintain the potential functionality for inference. Through the execution of the instant invention, expert systems can now be an integral part of Bayesian networks.

An exact inference algorithm can be employed wherein the network is sufficiently supported. Other preferred algorithms used can use a stochastic approach on large networks for data generation, evaluation and fitting. The most preferred algorithm for calculating exact inference employs a Lauritzen and Spiegalhalter (LS) algorithm. The LS algorithm is an exact inference technique and is a specific type of junction tree algorithm. The LS algorithm transforms a multiply-connected network into a clique tree allowing message propagation to take place over the clique tree.

Variable Types

Nodes can be used to represent and or describe the various states or distinctions of events of each respective event associated with a specific node. The state of an event can be represented by numerous types of variables comprising Boolean, character, numeric, and alphanumeric.

Boolean variable types can be used to indicate the truth value of a variable. In a preferred embodiment the value of a Boolean variable can assume the possible values of "true" or "false." These values are often coded as "1" and "0" respectively. In some instances, they may also assume the possible values of "yes," and "no". "Generalized Boolean" or "relaxed Boolean" variable types may assume more than two values, such as {"yes", "no", "maybe"}, or the entire continuum $[0 \ldots 1]$. Boolean variable types, their relationships and their manipulation are governed by the mathematical structure of Boolean algebra and Boolean logic. Boolean variables can also be referred to as discrete variables.

Character variable types can be used to indicate a specific lingual value. They can be comprised of Latin characters, Roman numerals, Arabic numerals, Hebrew characters, Cyrillic characters, Greek characters, geometric shapes, Arabic characters, Japanese characters, Chinese characters, Korean characters, Portuguese characters, Egyptian hieroglyphs, glyphs, scientific symbols, chemical symbols, IUPAC symbols, mathematical symbols, electrical symbols, astronomical symbols, chemical elemental symbols, other languages' characters, known written languages, phonetic characters, icons and various known other characters. Character values can be used in any permutation thus forming recognizable letters, words, strings or phrases by using any combination of language, numeral set or character set.

Numeric variable types can be used to indicate a specific numerical value of a variable. Numeric variable types can comprise real numbers and imaginary numbers. Real numbers can be represented by the use of any of the natural counting numbers, integers, positive integers, negative integers, non-negative integers, whole integers, the set of natural counting numbers, rational numbers and irrational numbers. Numerical variable types can also comprise other numerical systems such as hexadecimal, Bendix G-15, base 60, sexagesimal, unary, natural number, Elias gamma, positional systems, scientific notation, bijective numeration, p-adic numbers, ternary, quaternary, quinary, senary, septenary, octal, decimal, duodecimal, vigesimal, quadrovigesimal, hexavigesimal, septemvigesimal, hexatridecimal, other numerical systems comprising a radix. Numeric variable types can also be used to indicate or represent the relative truth of a variable, or used to indicate or represent the relative falsehood of a variable. This use of relative truth and falsehood introduces the notion of relaxed boolean constraints, of which shall be discussed below.

Alphanumeric variable types can be comprised of any permutation of numeric variable types and character variable types.

Object Classes, Objects and Object Instances

Execution of the invention preferably employs object-oriented and rule-based methods, both well known in the computing and artificial intelligence (AI) community. By using object-oriented methods within the programming language, the present invention affords computer entities and program modules to be entered as objects, thus allowing the objects to be assigned specific and general characteristics. Objects can be assigned other attributes including qualities, traits, features, aspects, mannerisms, attributes, properties and behaviors based upon user needs, user desires and system constraints.

Exemplary objects for use in an application used in an automotive manufacturing process monitor can be selected from the group of objects comprising: "automobile," "engine," "short block," "V-8," "fuel injection," "1.8 Liter," "2.0 Liter," "3.0 Diesel," "1.9 TDI," "fuel pump," "carburetor," "frame," "body," "paint," "gasoline engine," "Diesel engine," "spark plug," "glow plug," "common rail," "direct injection," "fuel injection," "turbo charger," and "carburetor." Relationships between these objects are discussed below.

Objects, object classes, object class instances, and object instances can be, and typically are, established within an object hierarchy. Objects lower in the hierarchy can inherit attributes, properties and behaviors of objects higher in the hierarchy. This hierarchy allows for attributes, properties and behaviors to transcend selected object classes and the object hierarchy and to be defined universally throughout the application, thus streamlining programming and execution of computer code and its associated commands. This also affords the application's code to exhibit a smaller foot print, thus using less CPU resources such as memory and processor time.

Using the automotive group of objects from above, object instances within an object class of "automobile" are the object instances of "engine," "frame," and "paint." Within the object class "engine" in the hierarchy are object instances "diesel engine" and "gasoline engine." Below, or lower in the hierarchy of the object class "gasoline engine" are object instances "V-8," "short block," "1.8 Liter," and "2.0 Liter." Below the object class "Diesel engine" are object instances "3.0 Diesel," and "1.9 TDI." Within the object class "V-8," "short block," "1.8 Liter," and "2.0 Liter," are object instances of "carburetor," "fuel pump," "spark plug," "distributor" and "fuel injection." Within the object class of "3.0 Diesel," and "1.9 TDI" are the object instances "glow plug," "common rail," "direct injection," and "turbo charger."

Object classes and object instances can be assigned numerous characteristics comprising attributes, properties and behaviors. If the object "diesel engine" is assigned the property "fuel system may need bleeding" then the objects "3.0 Diesel," "1.9 TDI," "glow plug," "common rail," "direct injection," and "turbo charger" may inherit the same property, unless the specific object is elsewise defined. Similarly, if we assign the behavior "stalls when coil is improperly grounded" to the object class "gasoline engine" then the object instances of "V-8," "short block," "1.8 Liter," "2.0 Liter," "carburetor," "fuel pump," "spark plug," "distributor" and "fuel injection" may inherit the same behavior assigned to the object class "gasoline engine." Attributes may be similarly assigned.

Assignments of attributes, properties and behaviors for a set of objects can be manipulated and overridden as required. This flexibility allows for customization and clarification of objects and their intended attributes. If the object class "engine" is assigned an attribute of "horse power at least 105" then the objects "gasoline engine" and "Diesel engine" also inherit the attribute. In our example our actual 1.8 Liter engine can produce a maximum of 95 horse power. So, to maintain correlation between our objects and the real world, an exception is made for the object class of "1.8 Liter" resulting in a logical exception of the class "1.8 Liter" not being associated with the attribute of "horse power at least 105." Other attributes can be assigned to the class that most closely resembles reality as desired. Attributes can be assigned to objects that are not necessarily accurate with reality, but useful for demonstration purposes and "what if" situations. These manipulations to objects and object definitions can be made at run time, while the invention is executing.

The associations of attributes, properties and behaviors can be assigned to objects and object classes by the use of relationship operators. Relationship operators are defined so as to allow a user to manipulate the attributes of objects. Typically object attributes, properties and behaviors can transcend the hierarchy of their respective object classes. Wherein an object is not to be assigned an inherited attribute, property or behavior a disassociative operator can be used to dissociate that particular characteristic with a specified object or object class.

Following portions of the detailed descriptions of the exemplary embodiments of the instant invention are referenced to the accompanying figures in part or in whole, to foster specific and general illustrations of specific exemplary embodiments wherein the invention can be practiced. Descriptions of the exemplary embodiments are described in sufficient detail to enable those skilled in the art to practice the invention and it is to be understood that other embodiments may be utilized wherein changes to the logical, electrical or mechanical aspects of the invention may be implemented without departing from the spirit of the invention. The following detailed descriptions are not to be taken in a limiting sense, but are presented so as to illustrate specific embodiments of the instant invention. It is to be understood that the invention is defined by the appended claims.

Portions of the following detailed descriptions are presented in terms of computer code, algorithms, objects, numeric representations, operators, operations and symbolic representation of data existing and or operating within at least one computer memory, computer system, module, other memory, virtual machine, or equivalent device. Unless specifically stated in the descriptions of the instant invention, reference to the processing and manipulation of the data reflects processing and manipulation of physical quantities that exist within a computer, a computer system, module or some equivalent device. Such manipulation of the data may be carried out through the use of processors, memory, input devices and output devices well known to those in the art.

In a preferred embodiment a computer system comprising hardware and software is offered in which the instant invention can operate and is shown in FIG. 1. The computer system comprises at least one processor or virtual machine, at least one memory unit, at least one input device, at least one output device. A preferred embodiment further comprises an optional network, such as an internal network 110, an external network 111, an optional shared/system memory 102 utilized among the processors. The processor used can be a central processing unit (CPU) 101 commonly found in modern digital computers, such as workstations and laptops, for the storage and execution of computer instructions and storage of data. The processor used can further be comprised of multiple processors, connected serially or in parallel. System memory 102 can comprise basic input and output storage (BIOS) 118, an operating system 119, program applications 120, program modules 121, data 122, other programs 123, and other data 124. At least one processor, microprocessor, programmable logic machine or central processing unit (CPU) 101 can be implemented in a preferred embodiment of the instant invention for interpretation and execution of instructions and data contained within data devices and memory devices.

Wherein multiple processors are employed, the processors can be used in a parallel processing environment or within a serial processing environment or any permutation thereof. It is appreciated that the processors shown or described are exemplary and other processors can be used without departing from the scope of the invention. The various processors that can be implemented with the instant invention can be connected via a network, such as a client server network, a hybrid peer to peer (P2P) network or a pure P2P network. The connections between units can be hard-wired or can be wireless. Processors may also be connected via shared memory.

The computer system of FIG. 1 can further comprise a serial port interface 125, a video adaptor 126, a hard disk interface 127, such as a redundant array of inexpensive disks (RAID) 135, a drive interface 128, an optical drive interface 129 and a network interface 130, all common to a bus 131. A network interface module 136 can be used to interconnect the network interface 130, an internal network 133, an external network 111. The networks 133, 111 can be connected via wire or wireless to system machines 181, 180, the network interface 130, or the network interface module 133.

It is apparent that the instant invention can be implemented on or within other systems similar to the computer system illustrated in FIG. 1. Other computer systems comprise hand held devices, palm pilots, Blackberrys, microprocessor devices, macroprocessor devices, multiprocessor devices, multiprocessor systems, microprocessor consumer devices, programmable devices, programmable consumer devices, consumer electronics, network computers, network machines, PCs, network PCs, microcomputers, internet tablets, smart phones, portable devices, portable computers and laptops. The instant invention can be implemented in a distributed environment wherein devices are members of a network, such as networks 133 and 111. Within a network, computing devices can be distinct geographically, comprising local and remote devices comprising processors and memory devices. Memory devices and processing devices can be local or remote to other processing devices and memory devices, thus allowing for any permutation of devise to exist within a network, such as networks 133 and 111. It is appreciated that the instant invention can be implemented using other devices shown or described and other devices can be used without departing from the scope of the invention.

The computer system further comprises at least one memory unit 102, at least one input device, such as a keyboard or mouse, at least one output device, such as a monitor 116. Data devices can comprise data devices and memory devices comprising random access memory (RAM) device, a read only memory (ROM) device, a hard drive device, a disk drive device 112, a floppy disk device, an optical memory device 137, an internal drive memory device, and an external drive memory device. It is apparent that the data devices and memory devices shown or described are exemplary and other devices can be used without departing from the scope of the invention.

The computer system further comprises at least one input device, and at least one output device. Data, information and manipulations can be realized by the computer system using any input device. Input devices and output devices can comprise a disk drive device 112, tape drive, CD drive 137, hard disk, keyboard, key pad, mouse, touch-screen, optical character recognition device, trackball, pointing stick, digitizing tablet, stylus, light pen, light gun, cyber-glove, cyber-wear, head pointer, eye-tracking device, joystick, game-pad, paddle, power pad, image scanner 138, 3D scanner, digital camera, digital camcorder, webcam, digital video recorder, microphone, cellular telephone, transducer, remote sensor, or a sensor 115, or an array of sensors. It is appreciated that the input devices and output devices shown or described are exemplary and other input devices and output devices can be used without departing from the scope of the invention.

A preferred embodiment further comprises output devices in the form of image devices, audio devices, data devices, and tactile devices. Image devices can comprise an illuminary, a printer, a plotter, a display, a monitor 116, a projector and other image devices. Audio devices can comprise a speaker 117, buzzers, klaxons, horns, and other audible signaling devices. Tactile devices can comprise haptic feedback devices, haptic controls, and other haptic devices. Other output devices can also comprise olfactory stimulators and taste stimulators. It is appreciated that the output devices shown or described are exemplary and other output devices can be used without departing from the scope of the invention.

It is apparent networks can be of any type. Numerous hardware devices can be connected to each other via a local area network (LAN), wide area network (WAN). Wherein the instant invention is used in conjunction with multiple machines, including at least one machine and optionally at least one server, the machines can be connected to each other via a network, 133 and 111. The network can be used to connect local machines and remote machines. The network can span a geographical area, a domestic area, a commercial area, an office, a residence, an academic setting or a commercial zone. Networks employed with the instant invention can comprise wired networks, wireless networks, Wireless Local Area Networks (WLANs), Personal Area Networks (PANs), piconets, scatternets, Local Area Networks (LANs), Wide Area Networks (WANs), Ethernets, Metropolitan Area Networks (MANs), Virtual Private Networks (VPNs), an intranet, or the Internet. It is appreciated that the instant invention can be implemented upon any permutation of these networks and that the networks shown or described are exemplary and other networks can be used without departing from the scope of the invention.

Probabilistic Inference in Graphical Models

Figure 13:
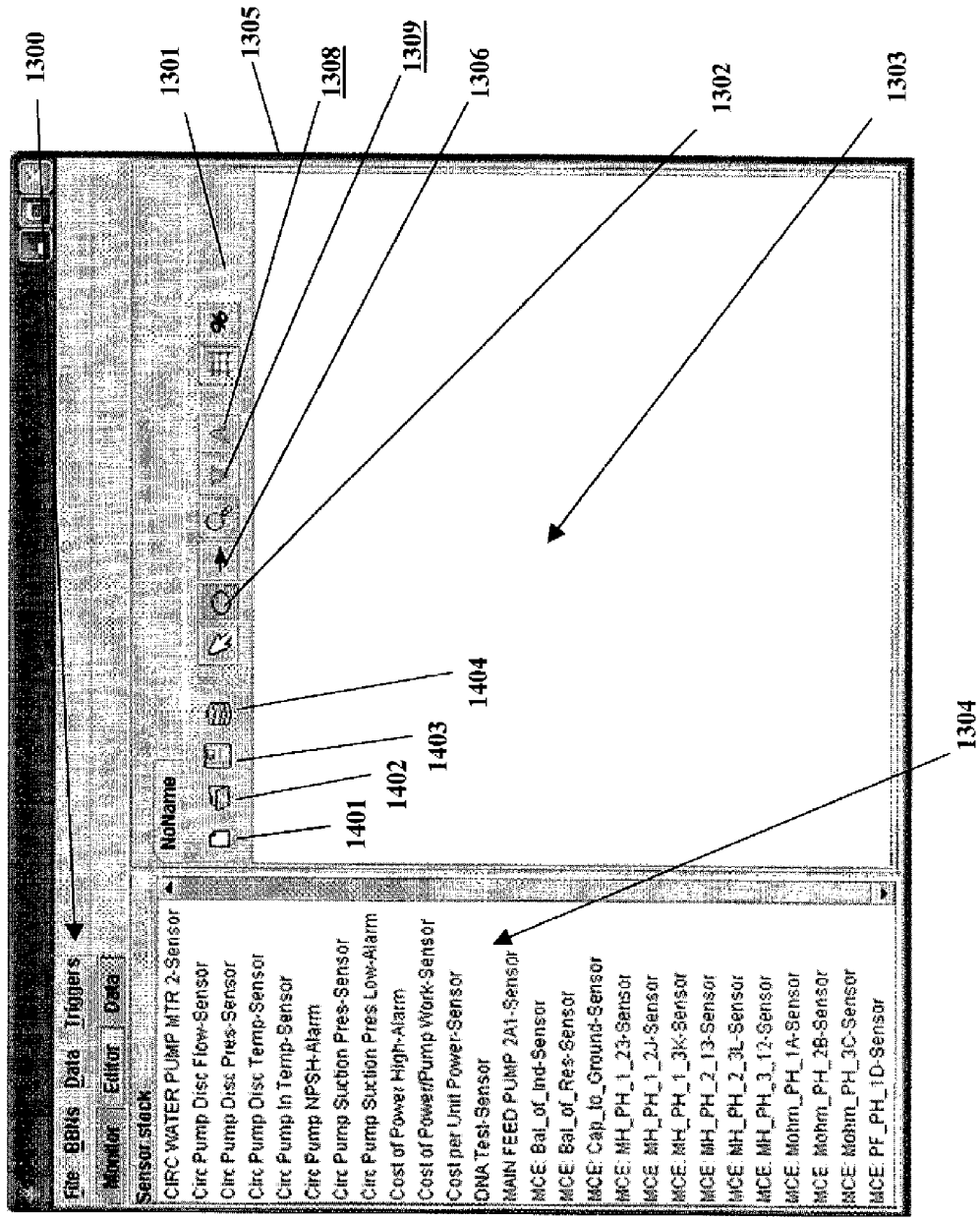
FIG. 13 illustrates an exemplary Bayesian network editing field comprising a sensor stock list and tool pallets in accordance with one or more aspects of the present invention.

The instant invention comprises a method for processing conditional probabilities comprising computer implemented steps of creating a representation of a first event and a representation of a second event within a user manipulable environment. Typically the events are represented by nodes. In a preferred embodiment, as illustrated in FIG. 13 the user manipulable environment displays a graphical user interface (GUI) comprising tool palettes 1301, object palettes and editing fields 1303, 1304 within a graphical workspace, 1305. The graphical workspace 1305 is traditionally presented to a user on a display device or other type of monitor 116. The graphical workspace 1305 supports user manipulation and creation of graphical models and graphical networks by offering tools from the tool palette comprising a pointer, a hand, a magnifier, a text tool, a paintbrush, a paint can, an erasure, and a spray can, file command tools, network command tools, a CPT tool, a first logical tool, a second logical tool and a third logical tool. An object palette is also offered to the user within the graphical workspace by presenting a collection of icons representing graphical objects, such as a new node icon 1302, a new edge icon, a new arc icon 1306 for the creation and manipulation of nodes, edges and arcs, respectively.

The instant invention supports a GUI for the construction and manipulation of graphical models, such as Bayesian networks comprising nodes and arcs. Nodes are typically used to represent events and variables and preferably have an associated CPT. The invention further allows a user to manipulate values of probability tables associated with each node. The instant invention preferably supports the use of a constructed Bayesian network for asset monitoring, through the use of the GUI. The GUI can be used to present object pallets and tool pallets for user manipulation and construction of a graphical model.

By activating the new node icon 1402, as illustrated in FIG. 13, a node is presented to the user within the graphical workspace for the user to freely position within the graphical workspace 1405. The node can be placed into the graphical workspace 1405 comprising a graphical model editing field 1403 through the use of a mouse, or stylus or similarly functioning pointing device by activating the new node icon 1402 and positioning the node thus presented within the graphical model editing field 1403 by maneuvering the mouse pointer to a desired position within the graphical model editing field 1403 and positioning the node in the desired position. This function can be realized as a drag-and-drop operation or a point-and-click operation. Portions of a preferred user interface are illustrated in FIG. 13 for presenting the graphical workspace 1305 to a user for construction of a graphical network, such as a Bayesian network or other graphical model used to simulate a model system of a system under observation. When a new node is introduced into the graphical workspace 1305, 1405 an associated conditional probability table (CPT) is generated, in a preferred embodiment by the node's node module.

Additional nodes can be introduced into the graphical model within the graphical model editing field 1305 and labeled appropriately. Nodes can be assigned a name or a label based upon a recognizable input, sensor type, a specific sensor, data source, event label other type of data input device, or collection of data input devices which can be assigned to the respective node. Manipulation of node metadata and node characteristics can be realized through the use of a user interface, such as a drop-down menu. The introduction of nodes is recognized and each is assigned an appropriate CPT. In a preferred embodiment, a user can configure properties of any node present within the current graphical model through the use and manipulation of a node properties widget or node properties window 1601, as illustrated in FIGS. 16, 17, 18.

Figure 16:
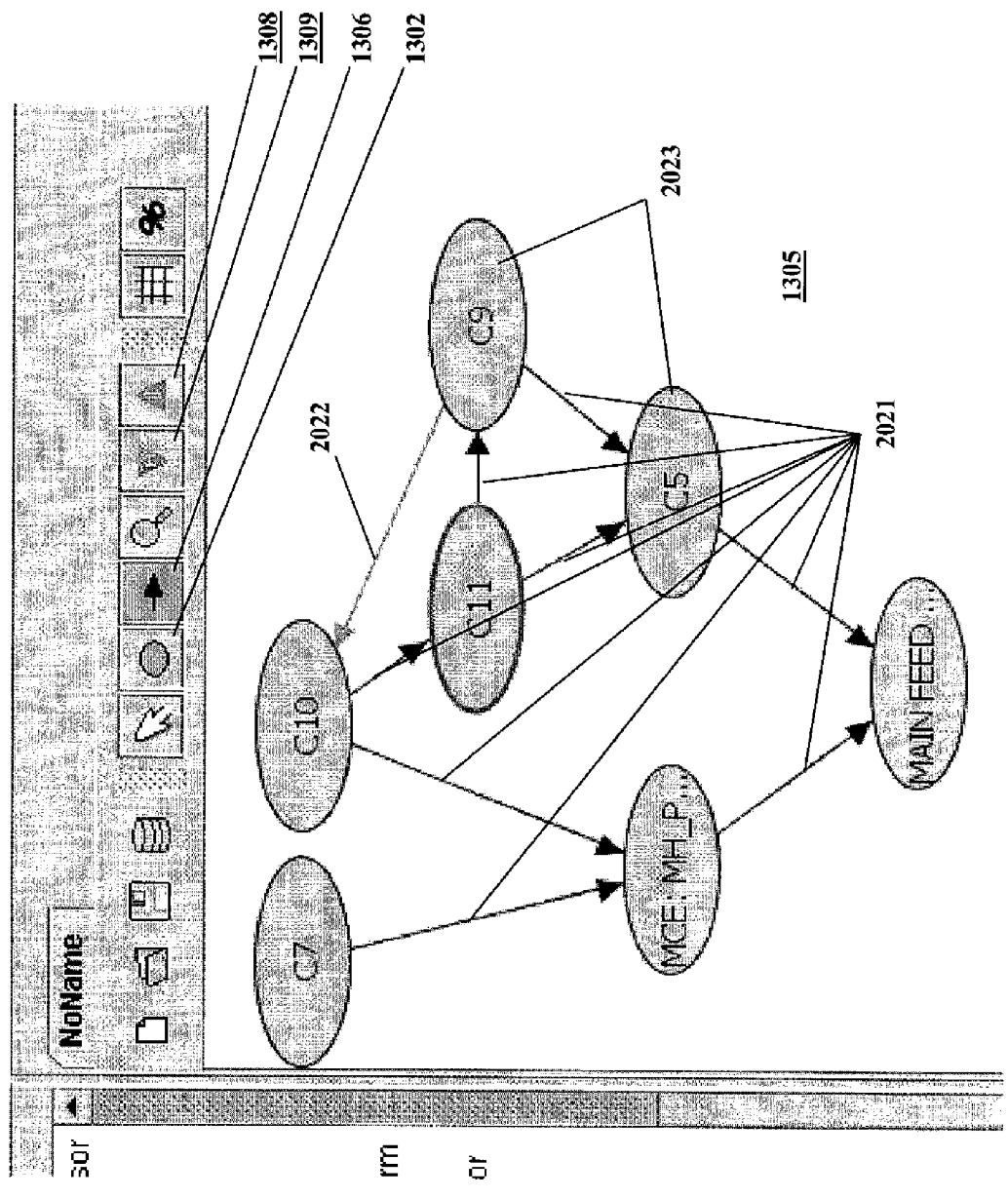
FIG. 16 illustrates an exemplary network editing field comprising nodes, validated arcs, a non-validated arc, and tool pallets in accordance with one or more aspects of the present invention.
Figure 17:
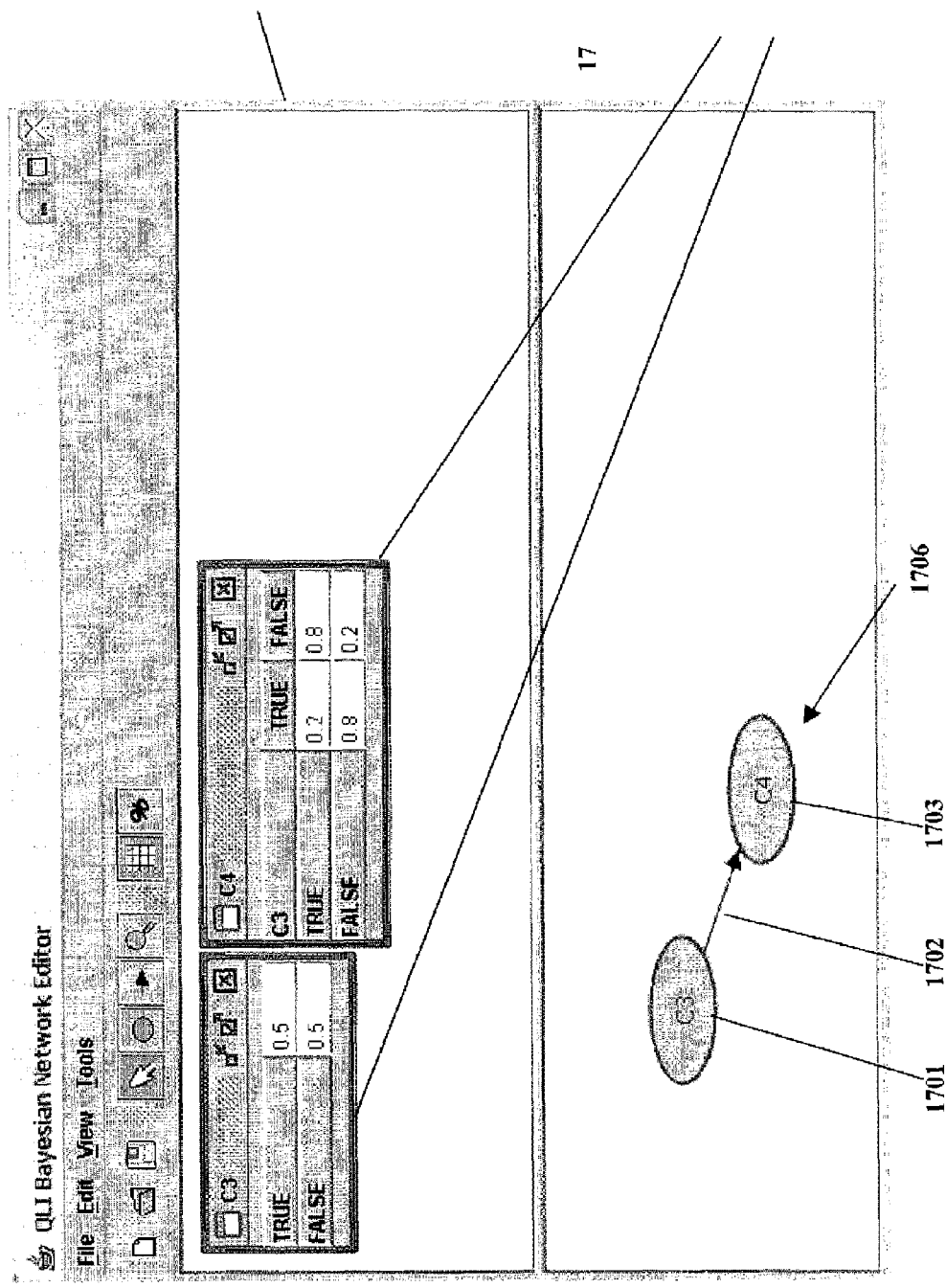
FIG. 17 illustrates an exemplary Bayesian network editor window comprising nodes, arcs, tool pallets and related node conditional probability tables (CPTs) in accordance with one or more aspects of the present invention.
Figure 18:
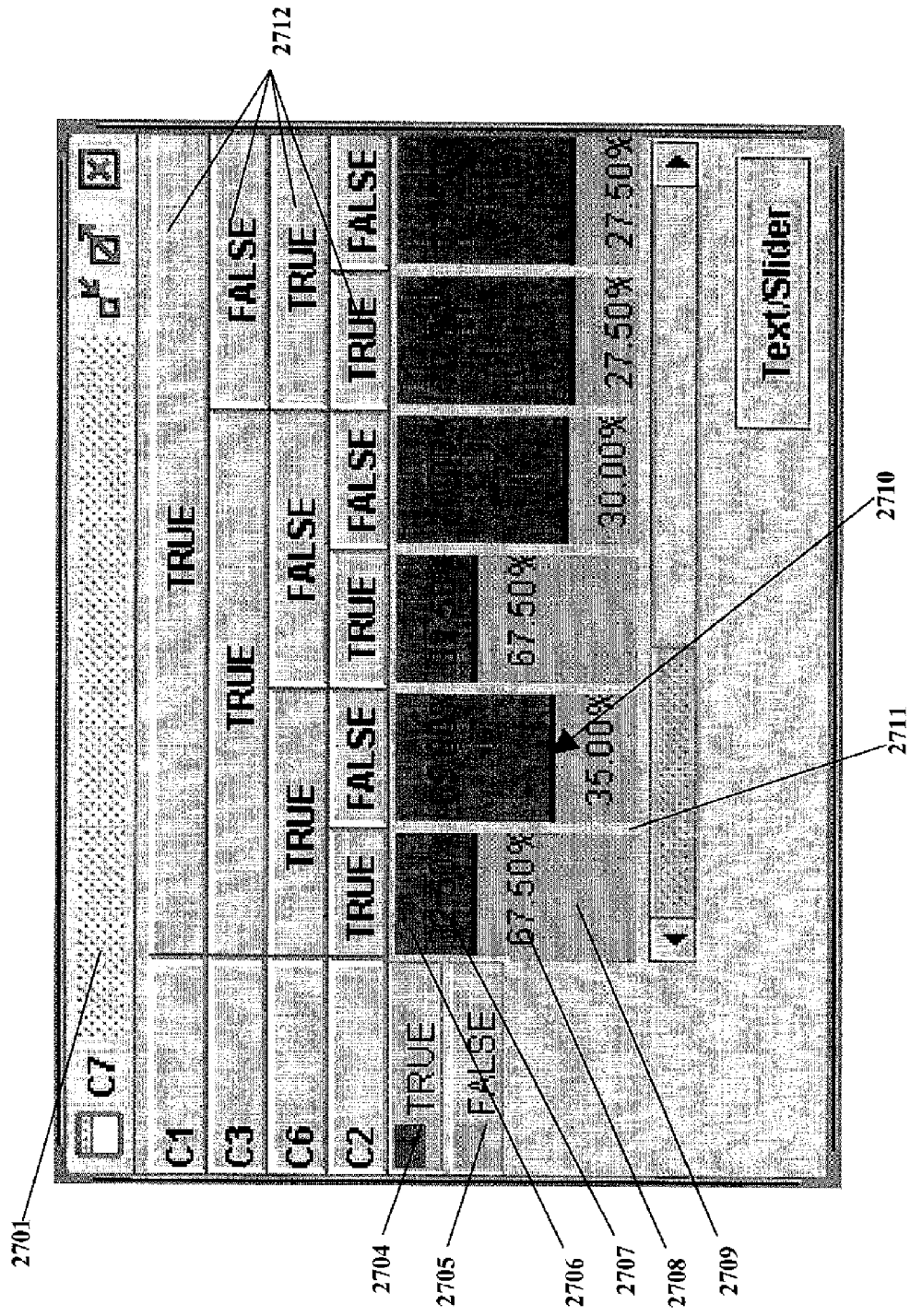
FIG. 18 illustrates an exemplary slider CPT window of node C7 comprising state values of node C1, node C2, node C3 and node C6 in accordance with one or more aspects of the present invention.

The node properties window 1601 provides the user an ability to view, manipulate, adjust or set associated nodes properties, as illustrated in FIGS. 16, 17, 18. Through the use of the node properties window 1601, the user can edit a name, adjust the type of node between discrete and continuous, and select various options from a sub-type menu. Further, states 1702 representing additional events associated with the node can be added or deleted. By default each newly introduced node to the graphical model editing field is assigned state values, "true" and "false", but any number of states, with any set of names, can be specified for a given node. Also by default each state is assigned a probability value 1703 in its associated CPT 1704. These probability values 1793 can be manipulated by the user through the node properties window 1601, in a preferred embodiment through the use of a text box. The CPT 1601 thus generated can further be manipulated by command through the activation of the node properties CPT module which can be user triggered to blend the CPT, smudge the CPT, or normalize the CPT. The values of the CPT can also be manipulated by the user by fitting, to a predetermined degree, the distribution of the CPT into a profile resembling a Laplace distribution. The Laplace distribution can further be manipulated, by user command or default, to conform more to an upper left (UL) Laplace distribution or a bottom right (BR) Lapace distribution.

Figure 10:
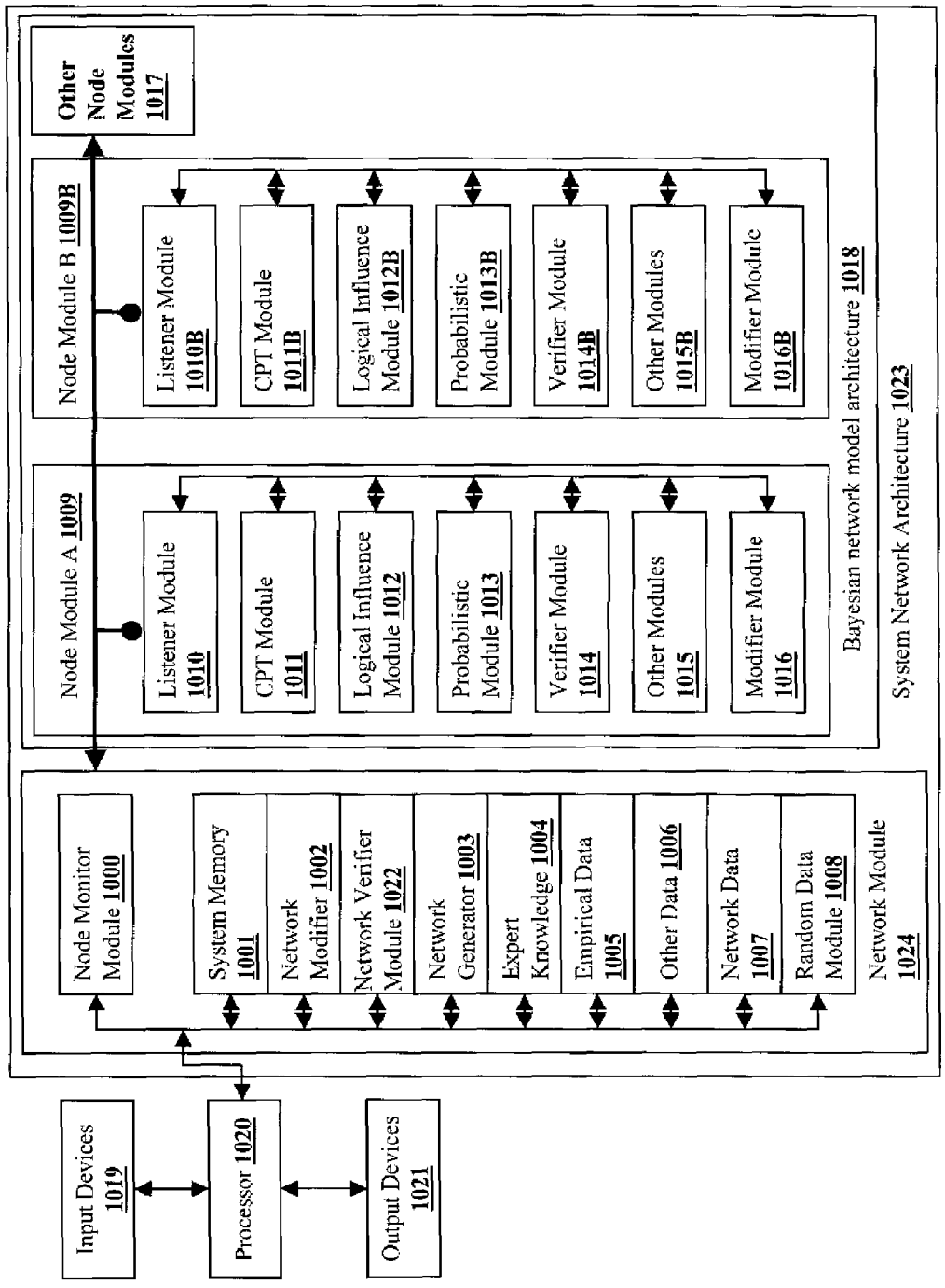
FIG. 10 illustrates a block diagram of an exemplary system network architecture in accordance with one or more aspects of the present invention.

In a preferred embodiment, each node can be assigned a discrete amount of states of which the user can manipulate name, value, sensor input and probability. The node states can be added or deleted by a user through the node properties window 1601. In a preferred embodiment, the nodes are constrained within a Bayesian network model architecture 1018, as illustrated in FIG. 10. The network model architecture 1018 comprises probabilistic relationships, logical relationships and influential relationships. These relationships are monitored and enforced by node modules 1009, 1009B which comprise probabilistic relationship module 1013, 1013B, a logical relationship module 1012, 1012B and other modules 1015, 1015B. Other modules 1015, 1015B comprise influential relationship module and additional modules. In a preferred embodiment, these modules exist within each respective node module, 1009, 1009B. The modules can function individually or in concert depending upon the current requirements of the graphical model, a network monitoring module, or manipulations of the user. Typically, enforcement of arc properties is performed by its graphically associated node modules 1009, 1009B wherein the node modules further comprises a node listener module 1010, 1010B, a node verifier module 1014, 1014B and a node metadata module.

Figure 3:
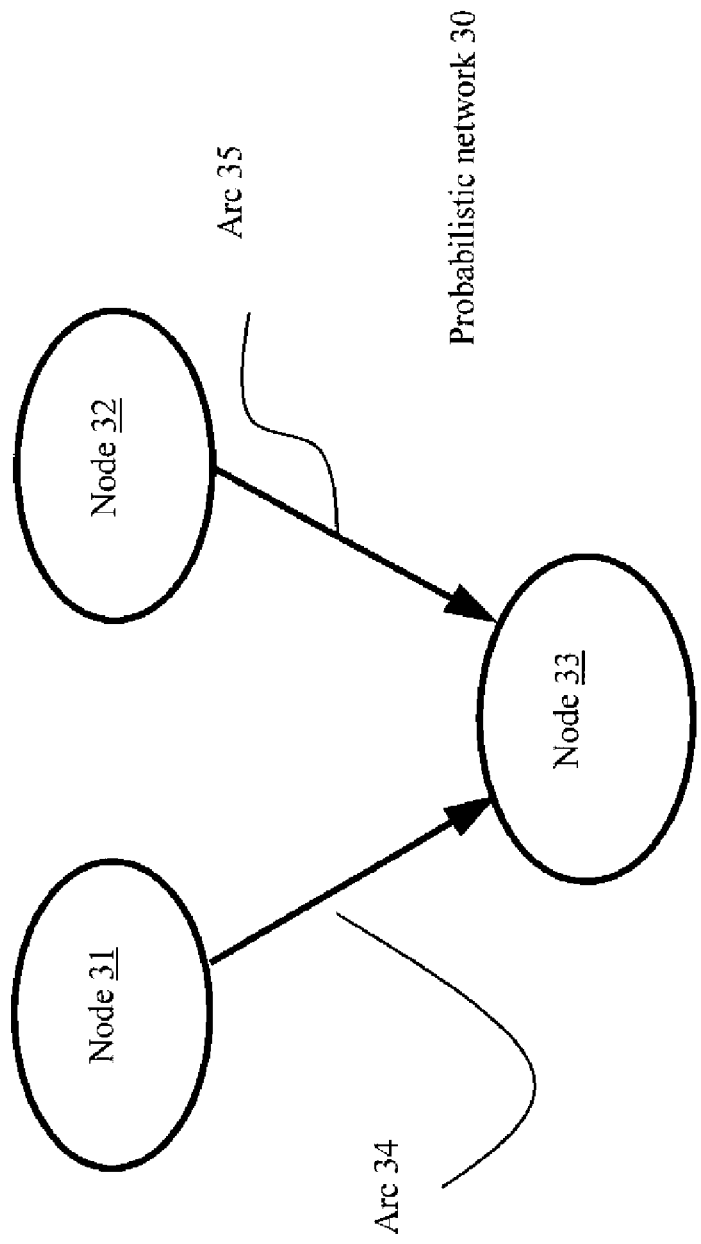
FIG. 3 illustrates an exemplary Bayesian network in accordance with one or more aspects of the present invention.
Figure 4:
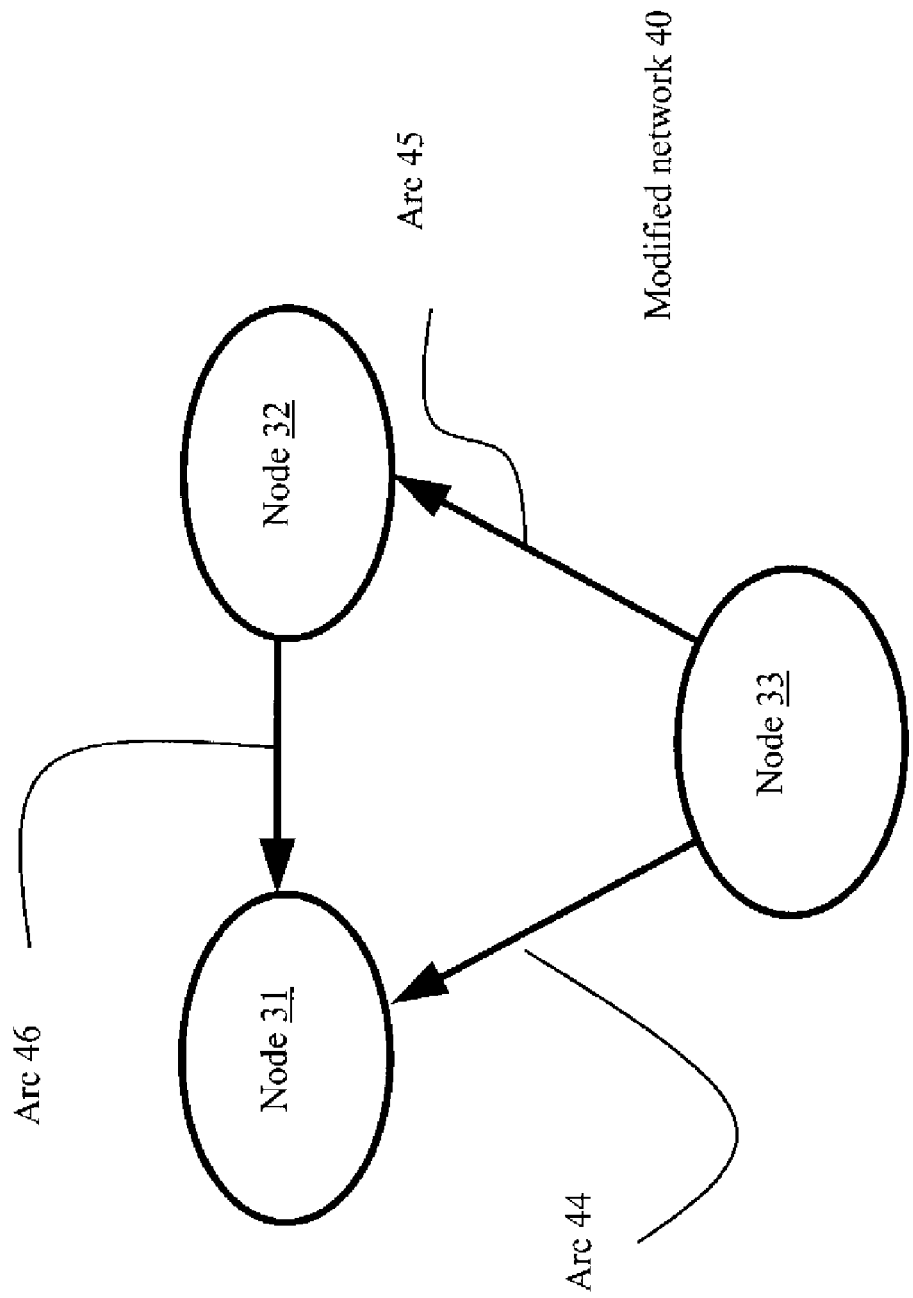
FIG. 4 illustrates an exemplary modified Bayesian network of FIG. 3 in accordance with one or more aspects of the present invention.
Figure 5:
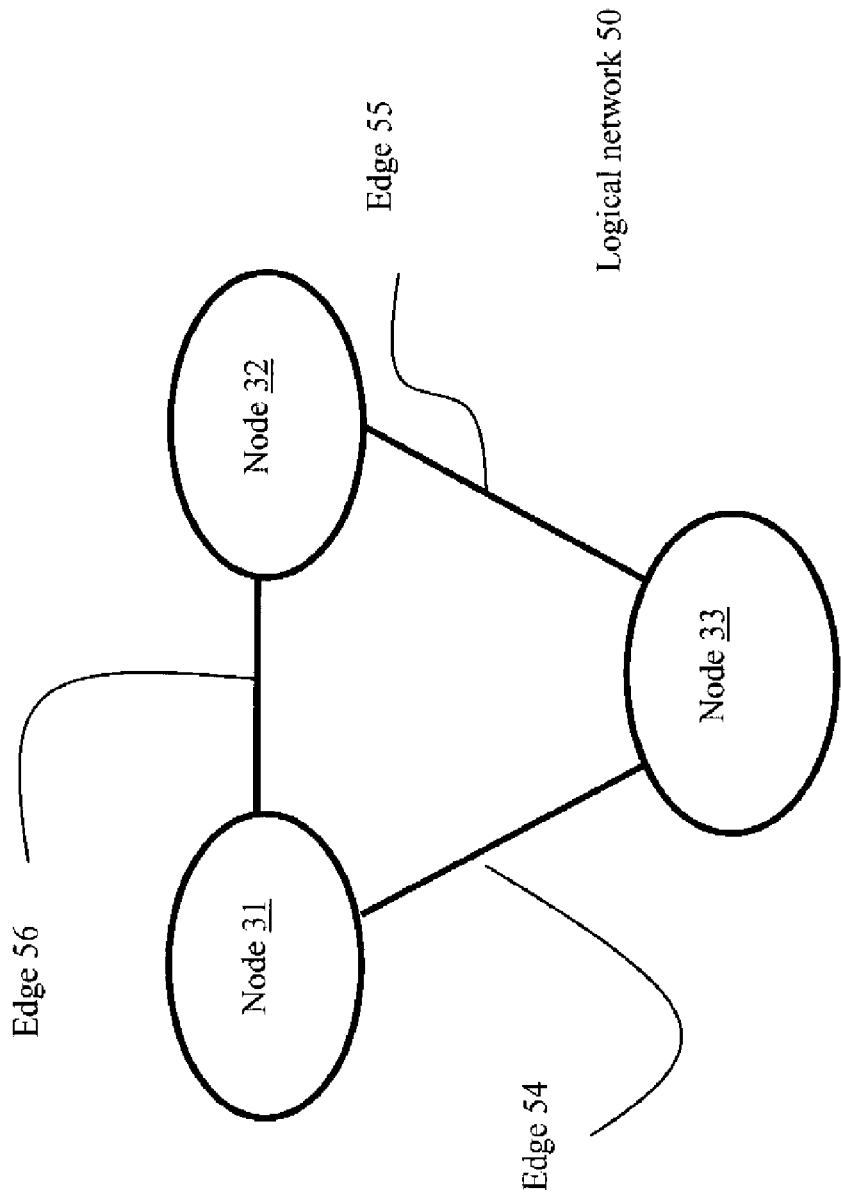
FIG. 5 illustrates an exemplary logical relational data structure of the Bayesian network of FIG. 4 in accordance with one or more aspects of the present invention.

An exemplary graphical Bayesian network architecture is illustrated in FIG. 3, having three nodes, node 31, node 32 and node 33. The Bayesian network comprises probabilistic network 30, arc 34 and arc 35. Arc 34 is used to indicate a probabilistic relationship between node 31 and node 33. Arc 35 is used in a similar manner so as to indicate a probabilistic relationship between node 32 and node 33. Node 33, in this example, is logically and probabilistically dependent upon node 31 and node 32 and is referred to as a root node. Within the Bayesian network model architecture 1018, arcs 34, 35 are A related exemplary graphical Bayesian network architecture to FIG. 3 is illustrated in FIG. 4. The network comprises the same nodes, node 31, node 32 and node 33, yet has a modified probabilistic structure. Modified network 40 comprises the same nodes a network 30, yet has arc 44, arc 45 and arc 46. In the modified network 40, node 33 is a root node. FIG. 5 illustrates a logical structure of network 30, network 40 as logical network 50. Logical network 50 is similar to network 30 and network 40, in that it contains the same nodes, node 31, node 32 and node 33 yet comprises logical influences as represented by edge 54, edge 55 and edge 56.

In a preferred embodiment, each node module 1009, 1009B, 1017 represents a probability function incorporating influencing neighboring node modules of its parental node states. In a preferred embodiment, each node module listens to at least a portion of other node modules, by employing its listener module 1010, 1010B, on which it is probabilistically and logically dependent by the implementation of various modules and constraints housed therewith. Additionally, the same node module listens to at least a portion of other node modules that are probabilistically and logically dependent upon it. In a preferred embodiment, node modules listen to neighboring node modules that are contained within its Markov blanket 203, FIG. 2.

In a preferred embodiment, node modules 1009, 1009B, 1017 can be represented as objects within an object oriented paradigm. In a preferred embodiment, node module 1009 comprises a listener module 1010 which keeps track of the presence of at least a portion of other nodes within a Bayesian network model architecture 1018, see FIG. 10. In a preferred embodiment, the listener module will listen to other nodes within its Markov blanket, see FIG. 2. Each listener module can comprise a node event listener module which can be implemented within the node module or can act an interface for communication between at least a portion of the nodes existing within the model architecture 1018. The node event listener can allow each node to keep track of the introduction, removal, and existence of other nodes within the model architecture 1018. Additionally the node listener module can also be employed to keep track of the probabilistic relationships and logical relationships established between nodes. In a preferred embodiment each node listener module 1010 comprises a list of other nodes within the architecture 1018. In the event a node is removed from the architecture 1018, the node broadcasts a message to all the nodes within its subscriber's list informing of the node's removal. In the event a node is added to the architecture 1018, the newly inserted node broadcasts a message to all existing listener modules requesting its identification be made within the lists of at least a portion of the other nodes. The newly inserted node further populates its list with the identification of the other nodes within the architecture 1018. Typically broadcasts are performed among the node event listener modules within the effected node's Markov blanket, see FIG. 2.

Graphically, logical relationships are represented as edges established between nodes and probabilistic relationships are represented as directional edges or arcs established between nodes. Entries associated within each node's CPT are thus probabilistically and logically associated between nodes within the model network for further analysis and manipulation.

As illustrated in FIG. 10, the network verifier module 1023 relies upon each node verifier module 1014, 1014B to maintain dependency, probabilistic relationships, logical relationships, mathematical relationships, and influential relationships among the collection of nodes and node modules 1009, 1009B, 1017 within the network model architecture 1018. In a preferred embodiment, each node module 1009, 1009B, 1017 is specifically aware of at least a portion of the node modules of the nodes within its Markov blanket 201, FIG. 2. This distribution of authority within the invention allows for the invention and its inference system to perform in an economical fashion, requiring less processor resources, less time, and less memory than other previous approaches. This also allows for nodes and arcs to be inserted or removed at runtime while maintaining network model architecture 1018 integrity.

In a preferred embodiment, a sensor stock list 1304 can be presented to the user or selected for viewing by the user within the graphical workspace 1305 through the activation of a sensor stock list widget or sensor stock list window. Typically, the sensor stock list comprises a list of sensors associated with the system under observation, such as a mechanical system, electrical system, chemical system, electronic system or other system specified by the user for observation thereof. Typical systems include a machine, a collection of machines, an assembly line, a manufacturing line, a process, a collection of processes, an engine, a collection of engines or any permutation thereof. Other systems well known in the engineering, processing, assembly or manufacturing arts can also be observed. The sensor list can be imported into the invention into RAM, ROM or any storage device capable of interfacing with the graphical workspace 1305, either locally or remotely. Utilized sensors can stream data directly to the sensor's associated node module which can contain a node sensor interface module.

As illustrated in FIG. 16, a representation of a logical influential relationship such as an arc or edge can be created and established between the first node and a second node, wherein the first node represents a first event occurring within the system under observation and the second node represents a second event within the same system. Additional nodes can be added to the model by the user as desired. A representation of a probabilistic influential relationship such as an arc 2021 or directional edge can also be established. The arc 2021 can be introduced into the network editing field 1305 through the use of the mouse and subsequent activation of the new arc icon 1306. Typically the user activates the new arc icon 1306 with the mouse and establishes the end points of the arc between existing nodes 2023 within the graphical model editing field 1305. The insertion or addition a new arc 2021 to a model system is typically performed by the user. In a preferred embodiment the user positions an arc 2021 within the graphical model by activating the new edge icon, clicking the mouse pointer on a node and dragging the mouse from that node to an intended dependent node, thus establishing an origin and an end point, and releasing the mouse upon the intended dependent node. Other pointing devices can be used which allow for such functionality.

In a preferred embodiment, when a node is introduced through the network editing field into a graphical model or portion thereof, the action of user introduction is recognized by a network module 1024, FIG. 10. Introduction of nodes will initiate the creation of a node module, such as node module A 1009. Introduction of additional nodes will introduce additional node modules, such as node module B 1009B and other node modules 1017, to a system network architecture 1023. The inclusion of each node can be monitored and or verified by any of the node monitor 1000, network modifier 1002, network verifier 1022, empirical data 1005, network data 1007 modules, or any of the modules within a network module 1024 module. Existing node modules previously established within the model architecture 1018 can acknowledge and recognize the inclusion of additional node modules introduced into model architecture 1018. In a preferred embodiment, network monitor module 1000 and the network verifier module 1022 work in conjunction with each node's listener modules, such as listener module 1010 and listener module 110B, for additions or editions of nodes performed in the Bayesian network model architecture 1018.

In a preferred embodiment, when an arc is introduced through the network editing field into a graphical model or portion thereof, the action of user introduction is recognized by at least a portion the network module 1024, the node monitor module 1000 or a portion of the other modules within the network module 1024. In a preferred embodiment during arc introduction, at least a portion of the involved node modules recognize, acknowledge and/or verify the introduction of an arc into the Bayesian network model architecture 1018. In a preferred embodiment, when an arc is introduced between node A and node B, arc verification is performed by the affected node modules 1009, 1009B by comparing existing logical influence structure and probabilistic influence structures existing within the Bayesian network model architecture 1018 through the employing the affected verifier modules 1014, 1014B and network verifier module 1022. Portions of node modules 1009, 1009B take into account existing arcs within the system network architecture 1023, and existing probabilistic data structures and logical data structures. In a preferred embodiment, a local probabilistic data structure and a global probabilistic data structure are housed by each probabilistic module 1013, 1013B of each node module 1009, 1009B, respectively. Similarly, a local logical data structure and a global logical data structure are housed by the logical influence module of each node module 1009, 1009B, respectively. Verification of arc introduction can further be monitored, acknowledged and verified by the network modifier module 1002, the network verifier module 1022 or other portion of the network module 1024. Following the acknowledgement of arc introduction and arc verification, node module A 1009, node module B 1009B, at least a portion of network module 1024, and at least a portion of network verifier module 1022, communicate among themselves and broadcast a verification message to portions of system network architecture 1023 comprising node module A 1009, node module B 1009B, and network module 1024. Portions of node modules accept the addition of the verified arc and initiate modifications to their respective CPT modules 1011, 1011B, logical influence modules 1012, 1012B, and probabilistic modules 1013, 1013B. Other modules within the system network architecture 1023 can recognize, acknowledge, verify, support and accommodate the inclusion of an arc within the network editing field. The recognition of the verified arc can further serve to establish mathematical influential relationships, probabilistic influential relationships and other logical influential relationships between the node modules of the Bayesian network model architecture 1018 thus serving to equate the associated tables. The probabilistic data structure and the logical data structure can serve to influence probability tables, conditional probability tables and truth tables among related nodes.

During construction of a graphical model, a network verifier module 1022, FIG. 10, comprises a graph verifier module which ensures the integrity of the mathematical model, and adherence to mathematical rules as defined by the graphical model idiom. Additions, deletions and modifications to a graphical model, such as the insertion or deletion of arcs and nodes, are verified according to specific algorithms and rules defined by the graphical model enforced by the affected modules. The graph verifier module preferably performs its function by isolating individual graphical mathematical rules for validity and comparing them to the existing graphical model.

To ensure the integrity of the graphical model, such as the Bayesian network, changes to the network, such as manipulation, insertion or deletion of nodes or arcs must be verified according to specific algorithms and rules which define the graphical model. The graph verifier module performs this verification by isolating individual mathematical rules for validity. Typically, the graph verifier module listens to the node modules within the Bayesian network model architecture 1018, or other graphical model being evaluated, and monitors any changes made to the network. The listening occurs at user specified intervals or user specified occurrences, or at user specified frequency, or at user specified incidence, or at user specified triggers or thresholds. Listening can also occur at other intervals or instances. Any changes made to the network which can affect the logical influential relationships, mathematical influential relationships, probabilistic influential relationships or modified probabilistic relationships of the network are passed to specific node verifier modules, such as 1014, 1014B within the Bayesian network model architecture 1018, and the network verifier module 1022. At least a portion of the modules, preferably each affected node's listener modules 1010, 1010B listen to the graphical model and the modifications begin made to it. Typically, this listening to modifications of the Bayesian network model architecture 1018 by the listener modules 1010, 1010B, occurs before any changes to the network are allowed to be made.

For a change to be verified, in a preferred embodiment, by verifier module 1014, verifier module 1014B, and network verifier module 1022, it must be approved by the prevailing verifier module. Once all the applicable verifier modules of the graphical model have acknowledged and approved the change, then the change is allowed to occur to the Bayesian network model architecture 1018 and subsequently to the graphical model as intended by the user within the graphical model editing field. If any of the intended changes are disallowed or not acknowledged then the intended change to the graphical model, and subsequently the Bayesian network model architecture 1018 are not allowed to occur. The graph verifier module and the specific node verifier modules 1014, 1014B allow the construction of Bayesian networks that conform to the mathematical definitions of a Bayesian network.

User attempted changes or edits to the graphical model are typically visually and graphically highlighted during editing of the model for an appropriate time frame to visually indicate to the user that an editor module has interpreted the user's intention. Typical changes which are not customarily allowed to a Bayesian network graphical model are the inclusion of a cycle, or the introduction of a cyclical path. Verified arcs 2021 are illustrated in FIG. 16. A cyclical path graphically flows from one node along a set of directional arcs back upon the originating node. In a preferred embodiment, the inclusion of a cycle is avoided by a cycle verifier module within the graph verifier module. Thus, an attempt to insert an arc between two nodes which would result in the inclusion of a cycle is not verified and thus avoided. A non-verified arc 2022 is illustrated in FIG. 16. It can readily be seen by inspection of the network model, illustrated in FIG. 16 that the inclusion of arc 2022 would introduce a cycle within the network model.

The cycle verifier module further comprises a depth-first searching cycle detector and a link creation cycle detector. Either one or both of the detectors can be implemented as per user instruction or by default settings, or as needed and governed by the graph verifier module or other appropriate module. In a preferred embodiment the cycle verifier module can be found in the network module 1024, as illustrated in FIG. 10, or in other preferred embodiments it can be found within at least one node module.

In the event that a graphical network such as a Bayesian network has been created and is present in memory, the user can retrieve the stored network from memory through a network menu item, such as the open network file menu icon 1402, FIG. 13, with associated drop down menu. In a preferred embodiment, a user can save to memory a constructed or partially constructed Bayesian belief network (BBN) through the use of a network menu item, such as the save network file menu icon 1404. A user can initiate editing of a new BBN or other graphical network by initiating a network new menu icon 1401.

Figure 15:
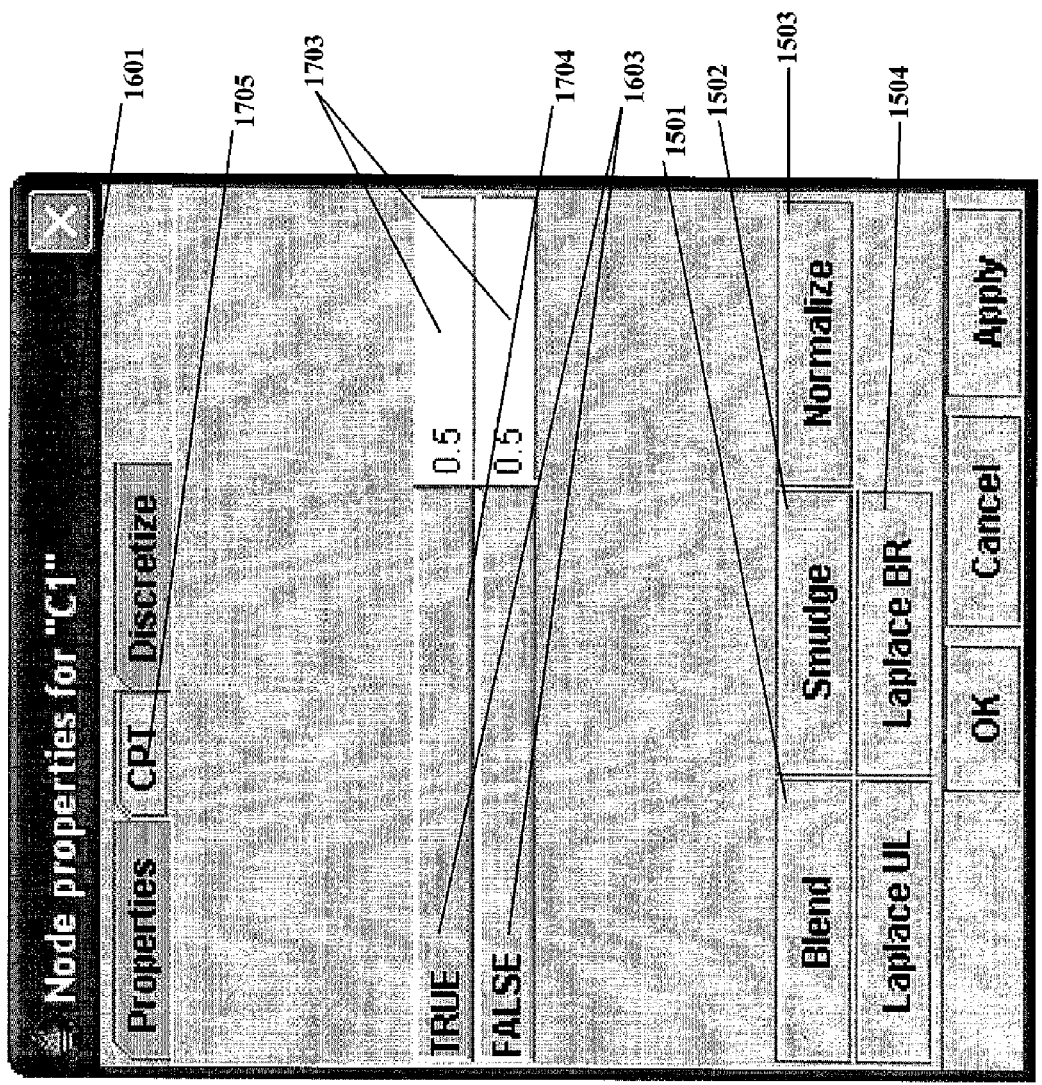
FIG. 15 illustrates an exemplary node properties window which supports a node conditional probability table tab window in accordance with one or more aspects of the present invention.

Within the graphical workspace 1350 the establishment of at least two nodes, a first node and a second node, and the establishment of a logical influence such as an arc, generates an associated probabilistic relational data structure. The probabilistic relational data structure can serve to relate associated probability tables, conditional probability tables, marginal probability tables, posterior probability tables or truth tables among at least a portion of the nodes within the graphical model. In a preferred embodiment, the probabilistic relational data structure can comprise node data, node metadata, adjacency data, probabilistic relational data, logical relational data and other related tables. Further, the incorporation of probabilistic influences between the events represented by nodes imposes logical, mathematical and probabilistic influences on the nodes related to each-other via their associated logical influence. Data can be fed to the probabilistic relational data structures via the sensors or via a data base, thus populating the tables. Typically, a first set of probabilities reflective of the probabilistic influences among the events is populated via extraction and or manipulation of the data by a table population module, present within each node's CPT module. In a preferred embodiment the CPTs are populated by default values. Probabilities can also be entered into any CPT manually by a user via the node properties window 1601, see FIG. 15, within a node properties CPT tab 1705 preferably by direct text manipulation of the CPT 1704. FIG. 15 illustrates a situation where node C1 represents two states, true and false 1702, each with an associated probability 1703 of 0.50. In a preferred embodiment event state probabilities are assigned equal values.

Figure 8:
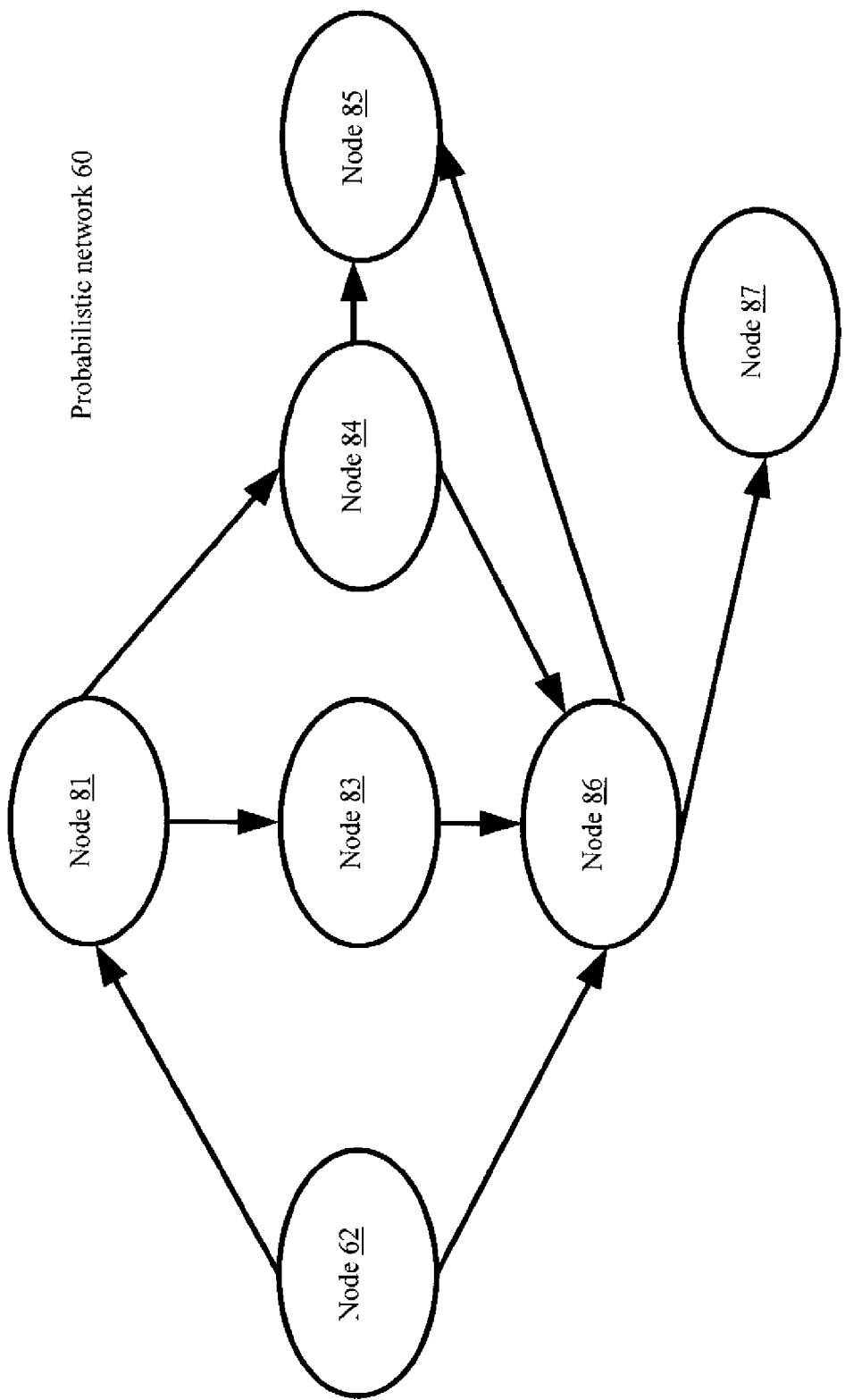
FIG. 8 illustrates another exemplary Bayesian network in accordance with one or more aspects of the present invention.

Nodes can be configured to represent an event comprising multiple states, wherein each state is associated with a probability. Typically each node is assigned a finite number of states. In a preferred embodiment within the graphical model editing field, a node property menu can be presented to the user offering node property options in the form of a drop down menu, a window or a widget. The node property menu presents options to the user for renaming the node, deleting the node, adding a state to the node, deleting a state from a node, normalizing the conditional probability tables, and manipulating other node properties such as CPT properties.

Wherein a user has completed a Bayesian graphical model, having an associated Bayesian network as illustrated in FIG. 3 comprising nodes, 31, 32, 33 and arcs 34, 35, wherein the logical relational data structure and probabilistic relational data structure have been established and verified, the user is allowed to instantiate an existing node within the Bayesian network model as an evidence node. Other exemplary Bayesian networks 60, 80 are illustrated in FIGS. 6 and 8, respectively.

In a preferred embodiment, upon the instantiation of the evidence node a network modifier module 1002 comprises a graph modifying module, see FIG. 10. The network modifier module 1002 can acknowledge the user's selection of evidence thus initiating the creation of at least a portion of a modified Bayesian network model architecture. The modified Bayesian network model architecture is similar in form to the Bayesian network model architecture 1018 yet comprises a modified probabilistic relational data structure and a modified logical relational data structure. In a preferred embodiment the Bayesian network model architecture 1018 and the modified Bayesian network model architecture comprise a similar node collection, yet can have modified logical influences and probabilistic influences. An exemplary modified probabilistic relation data structure of probabilistic data structure of FIG. 3 is illustrated in FIG. 4 which maintains the logical data structure of FIG. 3 yet further comprises an additional arc 46. The original logical data structure is maintained yet can be augmented as illustrated in FIG. 5, by the addition of edge 56. Typically, during modification the original logical influential relationships previously established between the nodes is maintained and thus maintaining the logical influential relationships established between the related events and tables associated with the system under observation.

In a preferred embodiment, upon the acknowledgement of selection of evidence, the graph modifying module communicates with the selected node's node module. The selected node module communicates with the node modules of its parental nodes, child nodes and other node modules within its Markov blanket 2001, FIG. 2. The effected node modules are passed into modification mode and hence create a modified probabilistic relational data structure, reflecting the choice of evidence node as selected. The graph modifying module observes the process, and oversees the legal modification of the network model. During the modification process, a cascading effect can promulgate among each of network node modules and their corresponding node listener modules and node verifier modules, yet is limited only to effected nodes and their corresponding node modules. In some instances, not all nodes will be affected, depending upon the selection of the evidence node and the configuration of the current Bayesian network model architecture 1018.

Figure 6:
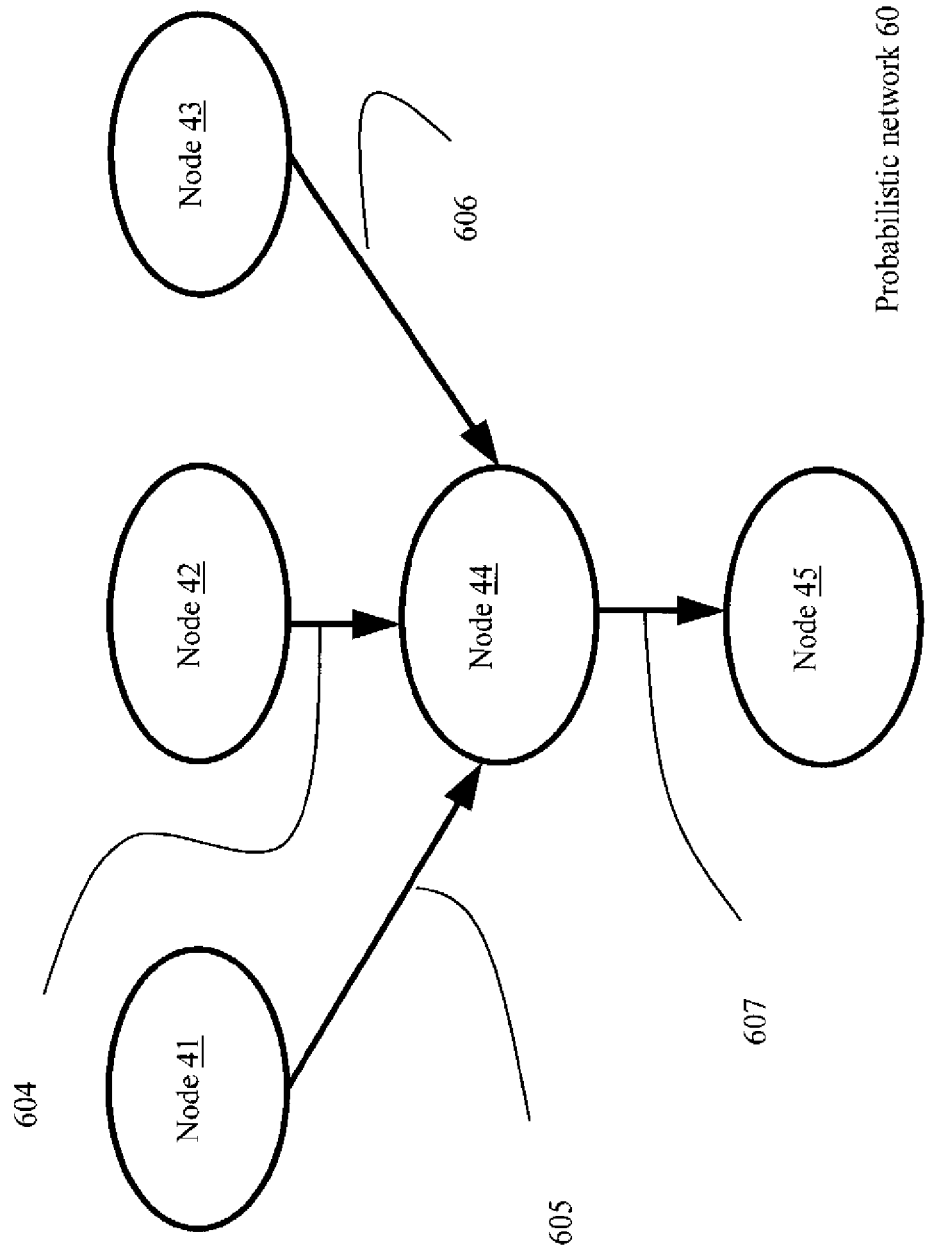
FIG. 6 illustrates alternative exemplary Bayesian network in accordance with one or more aspects of the present invention.
Figure 7:
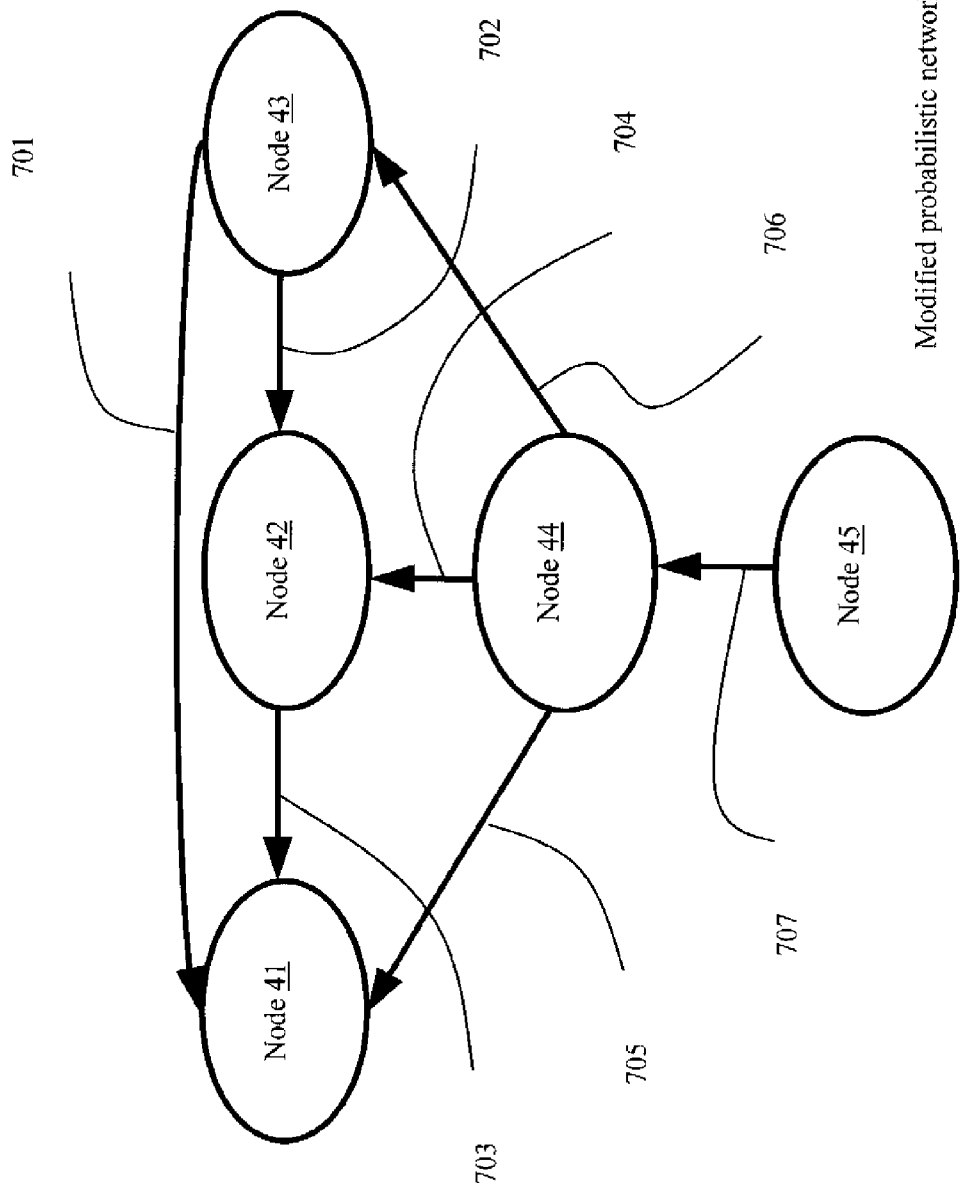
FIG. 7 illustrates an exemplary modified Bayesian network of FIG. 6 in accordance with one or more aspects of the present invention.

In a preferred embodiment, the choice of node 45 as evidence of network 60, FIG. 6, results in the generation of modified probabilistic network 70, FIG. 7, which can comprise arcs 701, 702, 703, 704, 705, 706, 707. Probabilistic network 60 can comprise nodes 41, 42, 43, 44, 45 and arcs 604, 605, 606, 607.

In a preferred embodiment, upon recognition of an evidence node of a probabilistic network, the modules function in concert to construct a modified probabilistic relational data structure which is similar to the previously established Bayesian network model architecture 1018, having a similar logical relational data structure, for that it contains the same amount of nodes, and at least the same amount of edges as the previously defined Bayesian network model architecture 1018. The modified Bayesian network model architecture comprises a modified probabilistic relational data structure, wherein arcs can be added as necessitated by the graph modifying module.

Typically, the instantiation of an evidence node as recognized by the graph modifying module will result in the creation of a second Bayesian network model architecture comprising the original node configuration, the original edge configuration, and a modified arc configuration. The modified arc configuration can further comprise additional arcs situated between existing nodes, as dictated by the graph modifying module. This second Bayesian network model architecture can be referred to as a modified Bayesian network. In a preferred embodiment, a graph populating module populates the modified probabilistic relational data structures associated with the nodes of the modified graphical model with a second set of probabilities representing modified probabilistic influences between the events. The CPT tables of each node of the modified network model are calculated and populated based on the selection of an evidence node, thus resulting in a second set of CPTs comprising at least one modified CPT. In a preferred embodiment the CPT tables of each node of the modified network model architecture can be calculated and populated based on user manipulation of the existing CPT table entries of the evidence node thus resulting in a second set of CPTs comprising at least one modified CPT. Any of the modified network model's CPTs can comprise a marginal probability table (MPT). Inference values used to populate the modified set of CPT tables are preferably calculated using a Lauritzen-Spiegalhalter (LS) algorithm, yet other applicable algorithms can be used for the calculation, which are preferably executed by a node inference module, preferably existing within the system network architecture 1023, FIG. 10.

Within the Bayesian network model, nodes are logically, probabilistically and mathematically influenced by their respective parental nodes, if they exist. For each node, node metadata is created and subsequently updated at the selection of an evidence node within the modified probabilistic relational data structure and the logical relational data structure through a triggering mechanism initiated by node event listener modules. The metadata comprises an evidence bit vector and can be used to construct an array of indexes representing a selected evidence state of each node. In a preferred embodiment, the evidence bit vector is handled by the respective node module. When a node is selected as evidence, its indication as a child is not replicated in the modified metadata, yet is re-evaluated in current metadata representing the modified model, thus reflecting the selection of evidence. Within the modified probabilistic relational data structure, logically connected nodes are indicated as child nodes with respect to the current evidence node while a modified network is generated.

For example, wherein node 33, as illustrated in FIG. 3, is selected as evidence from a network 30 a modified network 40 is created as illustrated in FIG. 4. Modified network 40 comprises an associated probabilistic data structure and related CPTs which are constructed to reflect the selection of an evidence node, node 33. The selection of evidence initiates the network population module of the system network architecture 1023, FIG. 10, for generating data samples thus populating the CPTs of the modified network 40, FIG. 4, in conjunction with the CPT population modules. The metadata of the original network is used in conjunction with a data generator to create sample states for each node while incrementing appropriate values. In a preferred embodiment, after the processing of sample states has been completed, each CPT is examined by its respective node verifier modules 1014, FIG. 10. This examination can take place during CPT population or any time before sample processing has completed. If any column of a node's CPT lacks a value, a flag is introduced into the metadata of the modified probabilistic data structure prior to the normalization of the CPT of that particular node.

Figure 9:
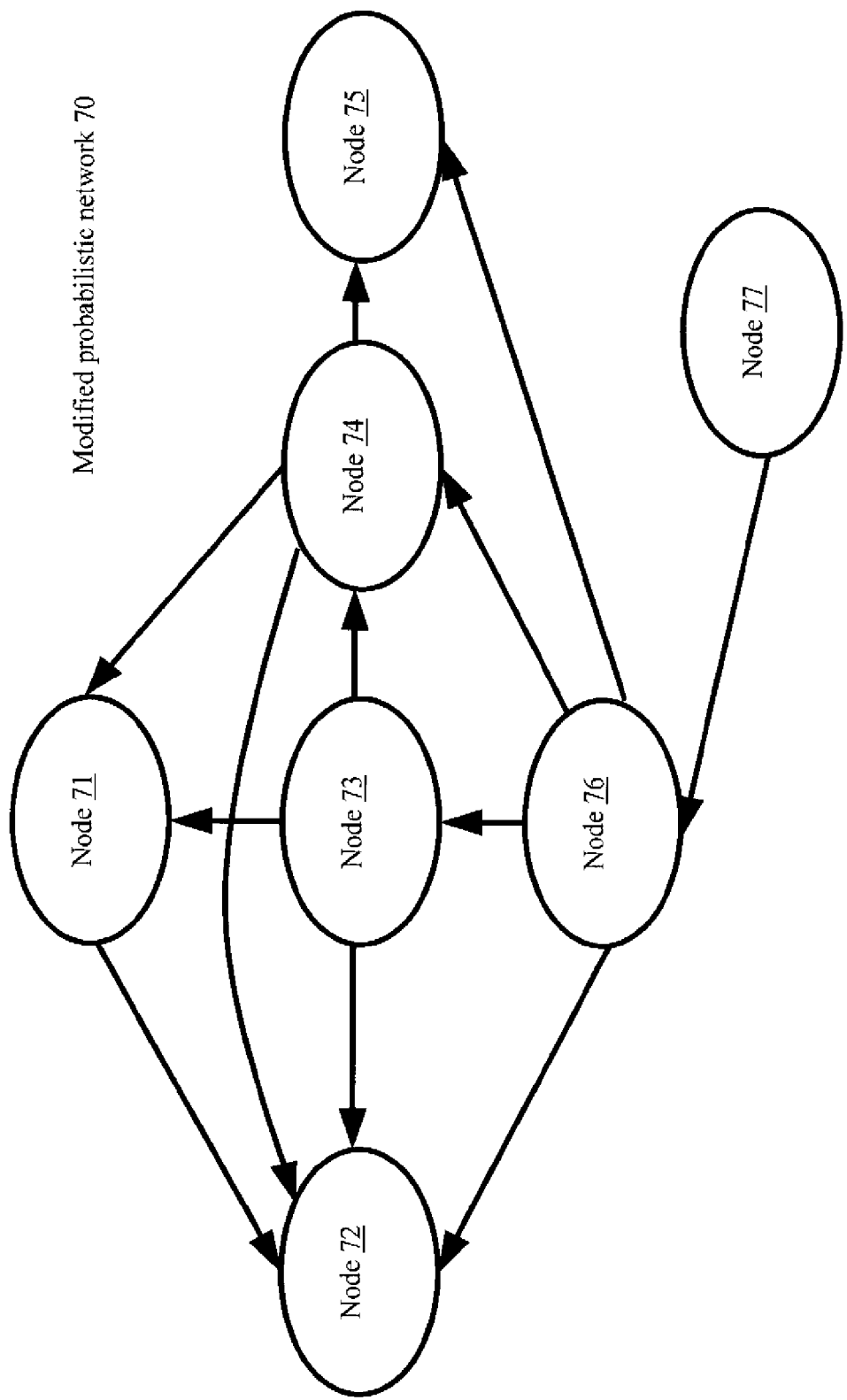
FIG. 9 illustrates an exemplary modified Bayesian network of FIG. 8 in accordance with one or more aspects of the present invention.

The selection of an evidence node in probabilistic network 60, FIG. 6, for example node 45, results in the construction of a modified network 70, FIG. 7, based on network 60. The selection of an evidence node in probabilistic network 80, FIG. 8, results in the construction of a modified probabilistic network 90, FIG. 9, based on network 80.

The existence of the modified data structures in conjunction with the original data structures provides data samples conducive to desired evidence settings in an expedited manner. The data generator in a preferred embodiment employs at least one sampling method, such as Root Evidence Sampling's (RES) method and logical data generation sampling (LGDS) method. System network architecture 1023, FIG. 10, comprises an LGDS generator module and an RES generator module which can be analyzed during run time. A comparison can be based on the gathering of samples for the LGDS generator module, the construction of the modified network, and gathering of sample states for the RES generator module. A root mean squared error (RMSE) was also compared to logical sampling. Thus, the LGDS generator module provided a very good, close to zero, root mean squared error, to which the RES generator module can be compared. The evidence was chosen from the two exemplary networks and was used in each run. The probability that a generate state would match this evidence was calculated before testing either sampling method.

Two RES generator module generated cases were run on each network. RES[10,000] used a default value of ten thousand sample state generations in order to train and adjust the modified network's CPTs. RES[1,000] was constructed with one thousand passes as the generation number. The former case provided to be the most accurate on all networks, and it did not fail to sufficiently generate test states for comparison of the set of CPT values within the network. Thus, when the CPTs were normalized, there was no improper influence on them as a result of changing the network's structure.

Other performance tests of RES[X] can be performed on other networks or the same networks in a similar fashion to calculate an average running time and RMSE. The number of sample generations on with RES[X] trains the modified network can be altered at will by a user to increase accuracy through user manipulation of a generator module interface. The number of sample generations can be manipulated at will so as to achieve a predetermined degree of accuracy, thus lending greater control to the user in the level of acceptable error. The RES[X] can also be performed on networks to a user determined threshold, such as acceptable error.

Thus, inference calculations and evaluations can be performed on any node within the graphical representation of the Bayesian network, thus presenting to a user a powerful tool to pose "what if" questions upon the network. A user is allowed to modify the CPT of the evidence node to evaluate specific "what if" questions based on the graphical model. Modifications made to the CPT of the evidence node are propagated throughout the network as necessitated. The explanatory information thus provided by the instant invention will allow the user to make informed decisions concerning the situation/ system under observation almost instantaneously.

The inferencing system can be adjusted at will by the user or a programmer via an inference engine interface. System network architecture 1023, FIG. 10, comprises at least one inference engine interface. The interface engine interface is designed so as to allow easy substitution of the algorithm by a user and thus allow the substitution to propagate throughout all node modules and graph modules.

In a preferred embodiment, a second Bayesian network graphical representation of the modified probabilistic network comprising the evidence node will be created with respect to the first Bayesian network graphical representation. The second network can be presented to the user for viewing, inspection and manipulation. The second Bayesian network can be presented to a user within a modified network window, for user inspection or user manipulation.

The inferencing functionality allows the user to pose "what if" questions with respect to the system under observation. In a typical example a Bayesian network model comprises a node representing an engine and a second node representing a cooling jacket. Wherein the engine node is dependent upon the CPT values of the cooling jacket node, a user can instantiate the cooling jacket node as evidence. This selection will allow the user to adjust the probabilistic influence the cooling jacket node has on the engine node and thus can be used to realize failure probabilities of the engine via the engine node's CPT. The alteration of the CPT of the cooling node will further adjust or recalculate the CPT of the engine node, reflecting an increase or decrease in the probability of failure.

In a preferred embodiment, the instantiation of the evidence node results in the creation of the second Bayesian network model wherein the probabilistic effects of the node representing the cooling device can be altered thus realizing subsequent and automatic manipulation of the failure value of the component in question. A user evaluating the system under observation can thus make an increasingly educated and knowledgeable decision as to what actions need to be taken in order to lower the chance of failure of the component in question. Subsequent alteration and manipulation of the cooling device's node characteristics, such as input values would manipulate the failure value of the component and would lead to instantaneous understanding of the influence the cooling device has over the component, in a probabilistic manner. In a preferred embodiment this manipulation can take place in real time while data is streaming into the probabilistic model and the modified probabilistic model for the generation of a "what if" scenario based upon a probability value forced onto the second (modified) probabilistic model by the user.

In a preferred embodiment, the probabilistic relational data structure and the modified probabilistic relational data structure are populated by a population module iteratively until a predetermined condition is met. The condition is typically set to maximize processor resources and minimize execution time. In a preferred embodiment the predetermined condition being selected from a group consisting of: steady state convergence, expected value convergence, expected threshold attainment, expected range attainment, finite iteration execution, expected bound attainment, and divergence.

A preferred embodiment can be employed to represent the events, variables, values, logical influential relationships, probabilistic relational data structure and modified probabilistic relational data structure reflected or imposed by mathematical constraints of a graphical model. In addition to Bayesian networks, other graphical models can be constructed such as directed acyclic graphs, graphical Gaussian models, Markov networks, Hidden Markov models and neural networks. The invention imposes mathematical rules, theorems, definitions and axioms associated with the respective graphical model through the use of a network verifier module 1022, typically located in memory.

The graph populating module preferably functions by initiating the population of the probabilistic relational data structure with a first set of probabilities and a second set of probabilities of the model system by incorporating at least one mathematical technique. In a preferred embodiment the first set of probabilities represents the values of the entries of the CPTs of the nodes of the graphical model, while the second set of probabilities represents the values of the entries of the CPTs of the nodes of the modified probabilistic relationship. Preferred techniques include an approximate inference technique, a sampling technique, and a random data generation technique. The most preferred technique is an exact inference technique. The exact inference technique is based upon a random data generation technique which rapidly generates sets of values for each variable which fit into the logical relational data structure, which is based upon the construction of the network model.

In a preferred embodiment node functionality of the node of first event and the node of the second event of the graphical model is defined by enforcement of the event's conditional probability table. Nodes and tables are associated with specific modules for handling mathematical influences, logical influences and probabilistic influences. These modules include mathematical influence module, logical influence module 1012, 1012B, FIG. 10, and a probabilistic influence module 1013, 1013B, respectively and are assigned to each node. Table modules such as CPT module 1011, 1011B, are present for each probability table, conditional probability table, posterior probability table, and marginal probability table. Node functionality can be altered by the user through the graphical user interface within the network editing field. The graph editing module evaluates the values of each node's table with respect to the node tables of those nodes within a Markov blanket 2001, FIG. 2. This evaluation is propagated throughout the graphical model for other nodes and their associated modules. Each effected node module listens to a portion of the remaining node modules and the graph verifier module or a portion thereof in order to maintain constraints and influences established by the network model.

Figure 14:
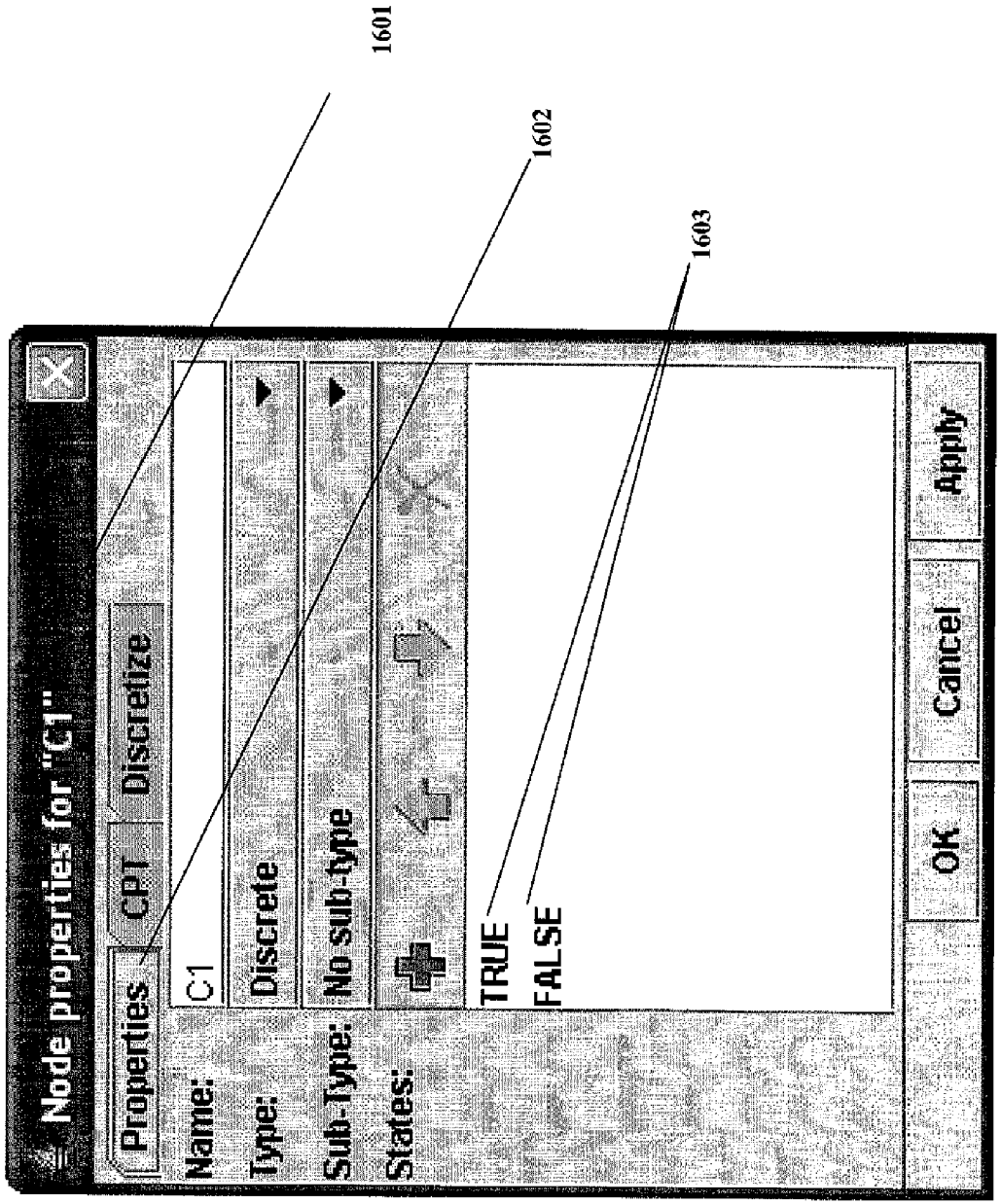
FIG. 14 illustrates an exemplary node properties window which supports a node properties tab window in accordance with one or more aspects of the present invention.

By default, a preferred embodiment creates nodes having two events, or representation of events or states, such as "true" and "false" when a node has been introduced into the model system. FIG. 14 illustrates a portion of basic profile information of node properties through a node properties user interface 1602 (UI). The values of the states in the current illustration are "true" and "false." Each node can be graphically illustrated to the user via a graphical node properties window 1601, node properties widget, node properties dialog box, node properties menu, or other similar interface that would allow for display and manipulation of values and states 1603. Also, by default the two states, "true" and "false", are assigned the probabilities 1703 of 0.50 and 0.50 for each node, as illustrated in FIG. 15. A preferred embodiment can allow for: additional states to be added to the node, probabilities of each state to be willfully assigned by a user, states to be assigned a name by the user, and node type to be toggled between discrete and continuous. In a preferred embodiment, wherein the node type is set as discrete, states can be added or deleted along with their corresponding probabilities, through activating a Conditional Probability Table (CPT) tab 1705 within a Node Properties widget 1601. Through the use of the CPT tab 1705 the user can assign or view the probabilities 1703 that the variable the node represents is in one of its states. These values control the frequency with which a particular state will be true for a given node, and are preferably generated by way of the CPT module using various data with which the CPT module relies upon. In a preferred embodiment the user can override the generated CPT values and customize the values as desired In a preferred embodiment a node's conditional probability table enforces a logic operation between the first event and the second event through the logical influence module 1012, FIG. 10. In a preferred embodiment, logical operations which are enforced by the logical influence module 1012 comprise unitary Boolean logic operation relationships such as a negate operation, a NOT operation, an identity operation and a compliment operation. A preferred logical operation module further enforces logical operations comprising binary Boolean logic operation relationships. Typical binary operations include an AND operation, an OR operation, a NOR operation, a ANDNOT operation, a NOT operation, a conditional operation and a bi-conditional operation.

In a preferred embodiment, once a node has been established within a network model architecture, such as a Bayesian network, the user can manipulate the Boolean functionality of that node at will. This functionality further allows a user to gain insight into the situation/system under observation. If a user constructs a Bayesian network model through the editor field, and uses an OR node to represent a specific event or state, the node's CPT and truth table are constructs of the logical states of its parental nodes, and the specific node's Boolean functionality. The instant invention allows a user to change the functionality of any node within the network architecture model. Node functionality can comprise an AND operation, an OR operation, a NOR operation, a NAND operation and a NOT operation.

In a preferred embodiment, a node's conditional probability table (CPT) module 1010, 1010B, FIG. 10, enforces a Boolean logic operation relationship, through its associated logical operation module. Boolean logic operation relationships can be selected from the group of relationships comprising an associativity operation, a commutativity operation, an absorption operation, a distributivity operation and compliment operation. The Boolean logic operation relationships are preferably represented graphically wherein at least a portion of the graphical model contains a node selected from the group comprising an OR node, an AND node, a NOR node, a NAND node and a NOT node. Complex Boolean logical operations can be graphically represented using a single node in the graphical model by mathematically combining the functionalities of multiple Boolean logical operators thus allowing the graphical editor workspace to display a single node associated with multiple Boolean operators. Combining multiple Boolean operators for use within a single node can be accomplished through the node properties window and is handled by the nodes logical operation module. In a preferred embodiment the complex operations can further be graphically represented within the network model using a single node incorporating any permutation of unitary logic operation relationships and binary logic operation relationships. Additionally other secondary complex operations can be graphically represented within the network model and can be used to combine the functionalities of previously established complex operations with any other combination of logical operations. The ability to compress the graphical model in a graphical and logical fashion allows the user to focus on specific areas of the system under observation, thus leading to user ease and understanding of the system under observation by avoiding overwhelming the user with non-critical information about the system.

In a preferred embodiment, the graphical network editor further supports compressing of nodes through the use of a compress tool found within the tool palette. A pointing device, typically a mouse or stylus is used to activate the compress tool, which then allows the user to encompass a set of nodes within the graphical editing field that the user wishes to compress. The network verifier module recognizes, acknowledges, verifies and initiates this intended function and passes control to the graphical network editing module to perform the graphical compressing by coordinating the effected node modules, thus realizing a Bayesian network with its original functionality, yet exhibiting graphically fewer nodes. The Boolean logic represented by the initial set of nodes now compressed into a complex Boolean logical operation represented graphically by a single node exhibits the exact functionality as the initial set of nodes. In the event that the intended action is not fully verified by any of the network modules, wherein at least one node intended to be part of the compression is not verified to be compressed, the graphical network editing module allows only verified nodes to participate in the compression.

In a preferred embodiment, the invention can be incorporated with system monitors for monitoring real world systems such as machines and assembly lines. System monitors can be implemented for the observation and control of commercial systems. Typical commercial systems comprise an engineering processor, a chemical processor, an electrical processor, an asset processor, a mechanical processor, a biological processor, a biomedical processor, a solar processor, a radiological processor, a manufacturing processor, an environmental processor, an agricultural processor, a monitoring processor, and an assembly processor.

The monitoring of systems, especially in process automation industry, is focused on the monitoring of mechanical and electrical assets and systems, their health and early signs of imminent failure. The failure of a single component can result in the halting of an entire manufacturing process, or industrial asset. It can result in catastrophic loss, if a failing component is not diagnosed in a timely fashion. This would result in a loss of production and consequently loss of profits. It can also result in the loss of expensive machinery or equipment. Mechanical and electrical sensors used to monitor the health of a system or component under observation still require some degree of human interpretation. Data streaming from sensors can overwhelm an operator with information, thus leading to confusion and possible loss of components. The instant invention allows users to graphically construct a Bayesian network, and to logically and probabilistically relate multiple sensors and to relate multiple facets of the system so as to monitor and predict production, failure and current health of the system under observation. This increased ability, as afforded to a user, allows for improved decision making and increased knowledge of the system under observation.

Other graphical modes which can be modeled, in addition to a Bayesian network include but are not limited to a directed acyclic graph, a graphical Gaussian model, a Markov network, a Hidden Markov model and a neural network.

Relaxed Boolean Constraints

Figure 11:
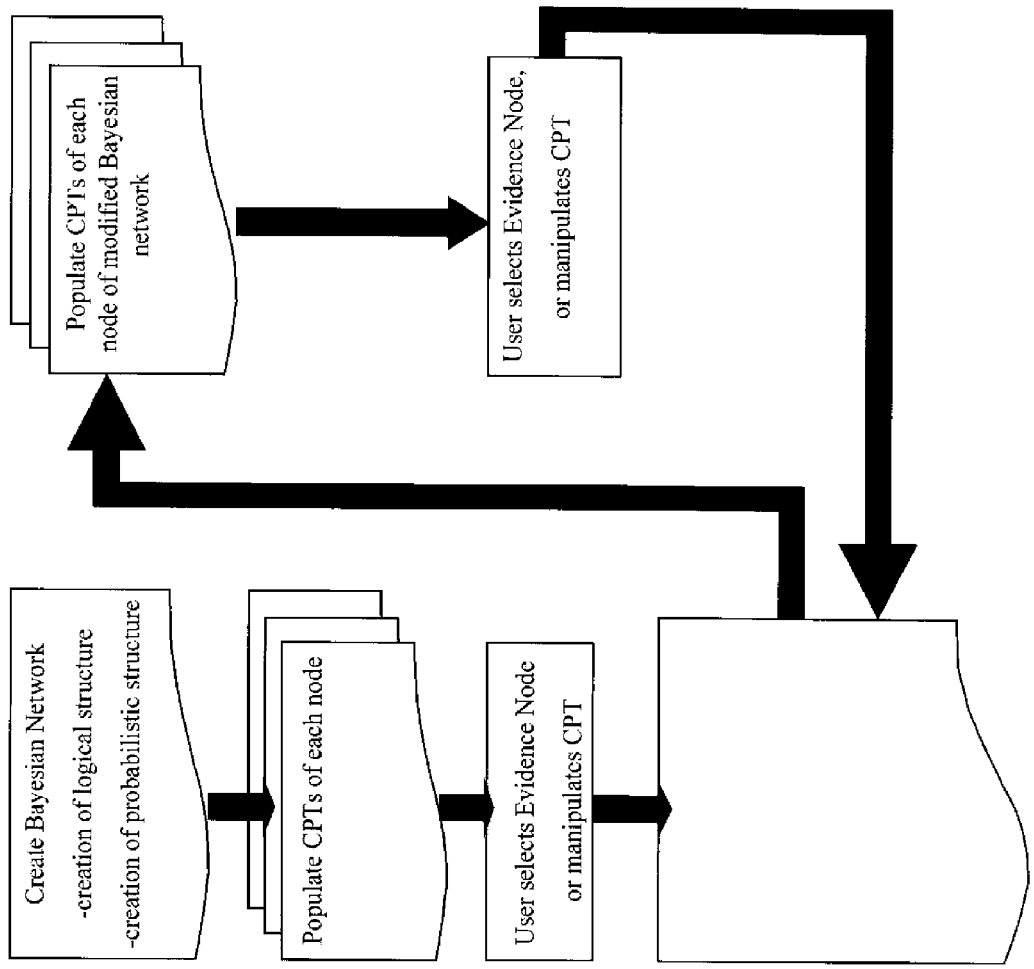
FIG. 11 illustrates an exemplary logical flow diagram in accordance with one or more aspects of the present invention.
Figure 12:
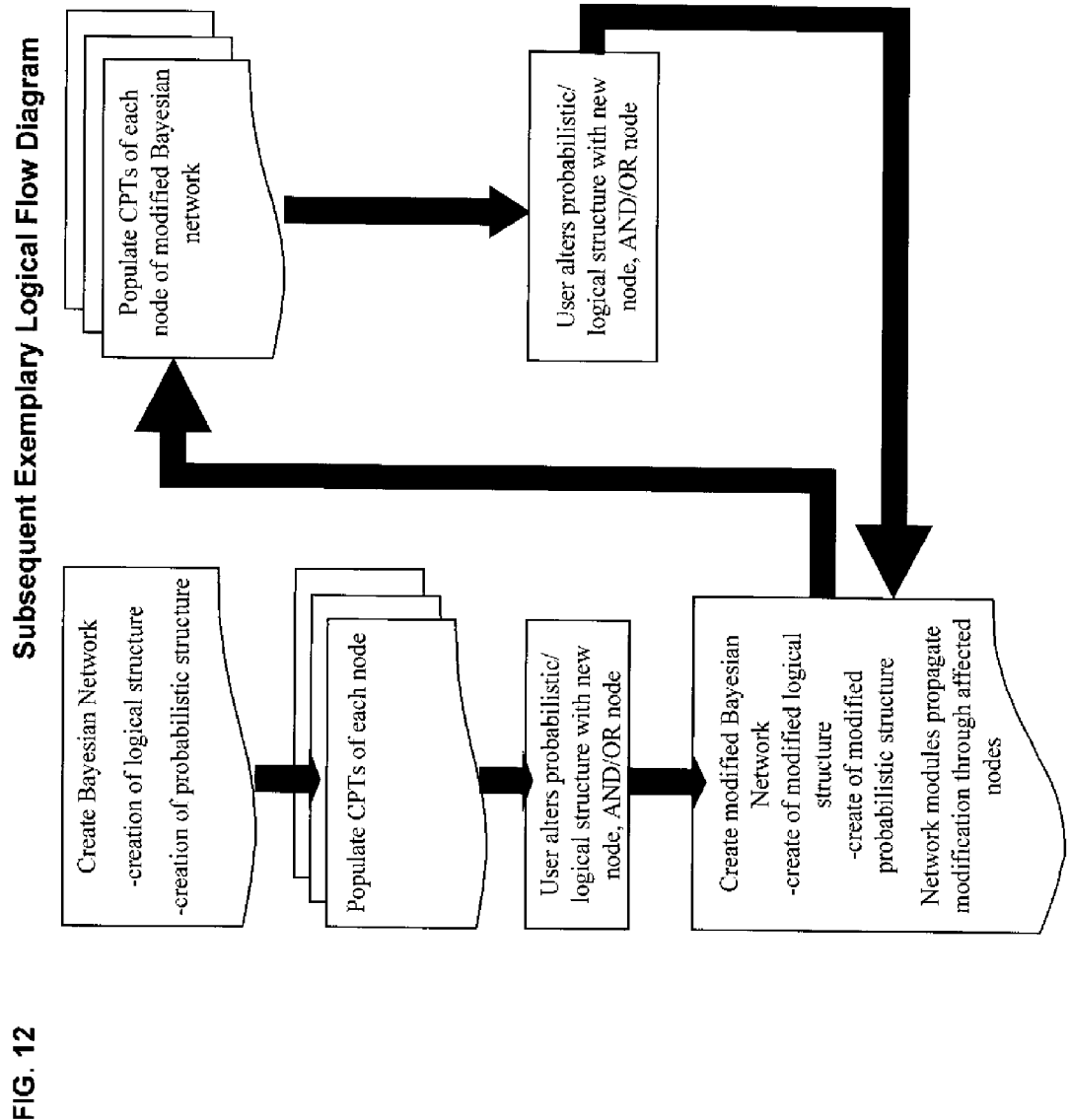
FIG. 12 illustrates another exemplary logical flow diagram in accordance with one or more aspects of the present invention.
Figure 19:
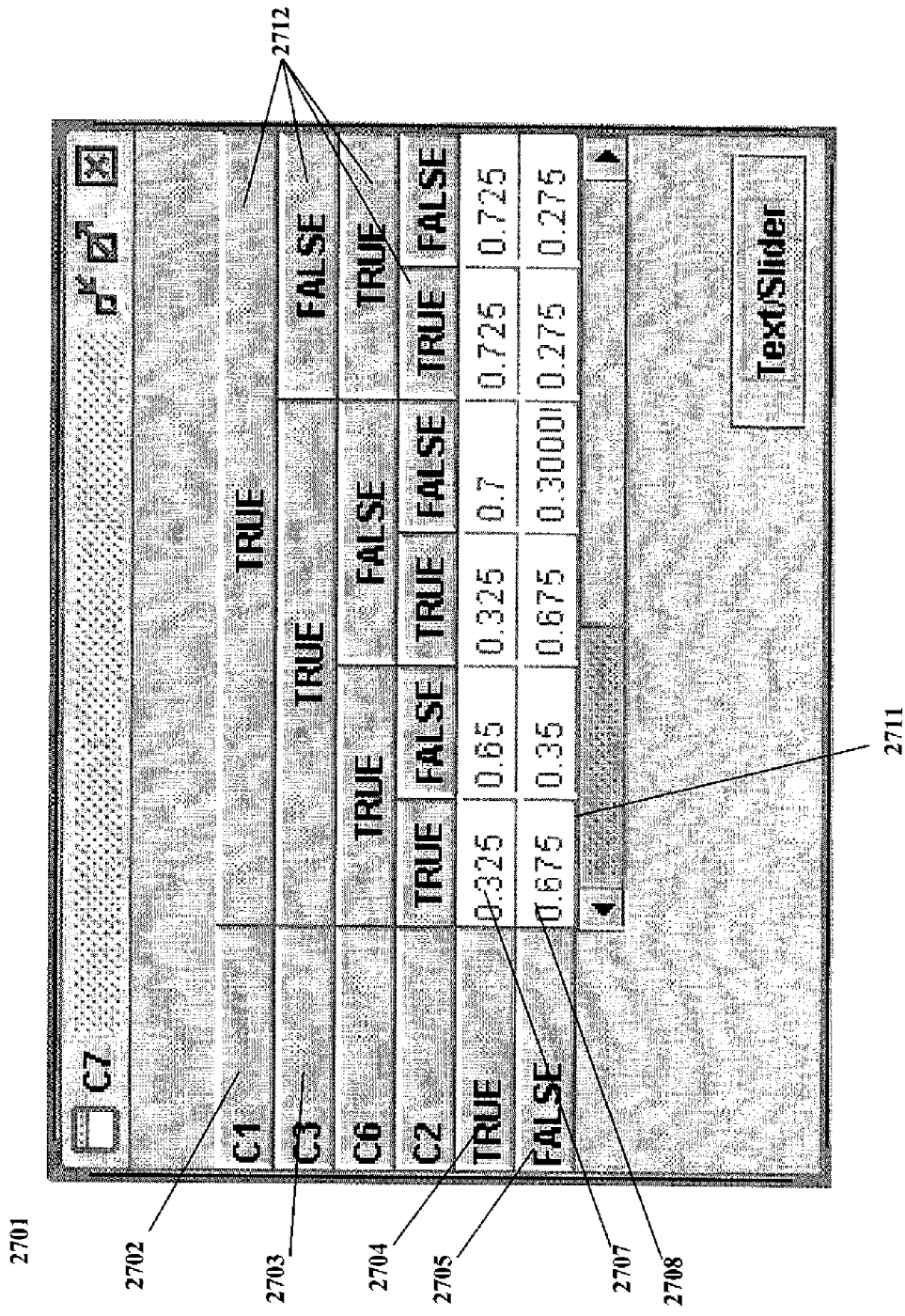
FIG. 19 illustrates an exemplary text CPT window of node C7 comprising state values of node C1, node C2, node C3 and node C6 in accordance with one or more aspects of the present invention.

A preferred embodiment further comprises a method for processing probabilities within a graphical model, such as a Bayesian network. The method further comprises computer implemented steps of creating a probabilistic relational data structure, such as graphically represented as a Bayesian network, 1706 FIG. 17, comprising a collection of related nodes, 1701 1703, and arcs, 1702. At least a portion of this method is illustrated in FIG. 11. Arcs can also be referred to as directional edges. Each node, 1701 1703, is associated with a set of values populating entries of a probability table (CPT) or probability vector. Preferred graphical representations of CPTs, 1704 1705, are illustrated in FIGS. 17, 18 & 19. The probabilistic relational data structure comprises entries of a first probability vector comprising at least a first probability of a first state of a first event. Further, the probabilistic relational data structure comprises a second set of entries of a second probability vector of a second state of a second event. Influential relationships are also established among related node modules, 1009, 1009B, 1017 FIG. 10, and can be represented in the graphical model as edges or arcs. In a preferred embodiment, influential relationships among related nodes are handled by each nodes logical influence module 1012. Manipulation of the first probability of the first state manipulated during run time, will concurrently update the set of complimentary probabilities.

The Bayesian network is in a preferred embodiment created through a graphical user interface (GUI) comprising a graphical network editing field, a tool palette, and a graphical object palette. In a preferred embodiment a user can construct a graphical representation of a Bayesian network through the GUI. In a preferred embodiment each node comprises a node monitoring module, further comprising a property module, a CPT module, a logical influences module, and a probabilistic influential module. Further each node module can comprise at least one listener module. In a preferred embodiment each module further comprises a listener for the observation of changes of neighboring nodes, preferably the nodes observed by each node listening module are within a Markov blanket 2001, FIG. 2. Changes made to an established Bayesian network are observed, evaluated and verified by at least one module within the system network architecture 1023, FIG. 10.

Each node can be assigned a node label, a set of events, comprising at least one event, corresponding event labels, a CPT comprising numerous values, and an associated data source comprising a sensor through the utilization of a node properties window. In a preferred embodiment, wherein a data source has been associated with an asset comprising a finite set of states, the node CPT module sets the CPT table to have an even distribution across the state space of the asset. By default, predetermined events and predetermined event labels can be assigned to each member of the state space.

In a preferred embodiment, the node properties window 1601 allows the user to associate event labels with the node currently being manipulated. Upon entering probability values 1703 for each event of the node, the values can be normalized through activation of a graphically represented the normalization function 1503. In a preferred embodiment, newly created nodes within the editor are automatically assigned two events with equal probability, as illustrated in FIG. 15.

Further, events can be assigned a logical state value, typically true or false, as illustrated in FIG. 15 1603. State values representing states of the events can further assume values such as true, false, not-true and not-false. Probability values most preferably assume values in the range of zero and unity.

Events can be assigned value ranges corresponding to each event. This feature is convenient when using scalar measuring quantities as realized from scalar sensors such as thermometers. As an example, if a thermometer was associated with the node as a sensor, multiple states can be assigned to the node for the representation of thermal ranges. To further illustrate this example, a user can assign the values of −273 C to 0 C as "freezing", 1 C to 15 C as "cold", 16 C to 99 C as hot, and 100 C to infinity as "boiling." This functionality allows for the systematic handling of continuous sensor ranges to be handled in a discrete fashion. It can be easily seen that value ranges can be set as increasingly smaller ranges to reflect smaller changes in the temperature of the event being monitored by the thermometer, leading to increased system sensitivity.

This also allows the user the flexibility to adjust, manipulate and modify sensitivity as handled by the invention. This functionality also allows a user to monitor continuous ranges of interest by bracketing a range of interest with two neighboring open-ended intervals of lesser interest. This increased functionality would be of consequence in the monitoring of systems under observation using a thermometer to monitor the state of a chemical substance as it passes through its various physical states. The monitoring of changes in state such as a substance increasing in temperature from a solid state to a liquid state, or the state of a gas as its temperature fluctuates between its liquid state and its gaseous state can be necessitated by specific systems under observation. A user can use a continuous range of temperature values about a range of temperatures spanning a state change temperature, say −10 C to +10 C for water at STP, while bracketing the range with two discrete ranges of −273 C to −10 C and +10 C to infinity. This functionality can be referred to as relaxation of Boolean constraints.

In a preferred embodiment, each node can be assigned a discrete amount of states of which the user can manipulate a variety of characteristics comprising name, value, sensor input and probability. The node states can be added or deleted by a user through the node properties window 1602, as illustrated in FIG. 14. In a preferred embodiment the nodes are constrained within a Bayesian network by probabilistic relationships, logical relationships and influential relationships. These relationships are monitored and enforced by a probabilistic relationship module, a logical relationship module and an influential relationship module, respectively. In a preferred embodiment, at least a portion of these modules exist within each node module. The modules can function individually or in concert depending upon the requirements of the graphical model, the network monitoring module, or manipulations of the user. Typically, enforcement of arc properties is performed by neighboring graphically associated node modules wherein the node modules further comprises a node listener module 1009 1009B, a node verifier module 1014 and a node metadata module. In a preferred embodiment the node metadata module is present in module 1015.

As illustrated in FIG. 10, each node module, such as node module A 1009, node module B 1009B, and other node modules 1017, in a preferred embodiment represent, store, maintain and enforce their own probability function and CPT. The node's probability function is a construct of logical influences, and values of data sources comprising values of other CPTs, the form of the Bayesian network model, Bayes' Theorems, values of evidence nodes, and root nodes. In a preferred embodiment each CPT is the ward of a respective custodial CPT module 1011, 1011B. In a preferred embodiment each node's probability function, along with a random data module 1008 is used in the population of its CPT. Typically, the random data module 1008 stores and operates a random data generator which preferably is used to populate CPTs.

Node module A 1009 can comprise other modules for the handling of data, probabilistic relationships, logical relationships, marginal probabilities, conditional probabilities; conditional probability tables (CPTs), data, metadata, and other functionalities. Other modules can comprise a CPT module 1011, a logical influence module 1012, a probabilistic module 1013, a verifier module 1014, a modifier module 1016 and other modules 1015. Node module 1010B can comprise a CPT module 1011B, a logical influence module 1012B, a probabilistic module 1013B, a verifier module 1014B, a modifier module 1016B and other modules 1015B.

Specifically, each node employs its' listener module 1010, 1010B to monitor other nodes within the Bayesian network model of which it is probabilistically and logically dependent upon. Additionally, the node listener modules 1010, 1010B listen to other node modules that are probabilistically and logically dependent upon it. In a preferred embodiment, node modules listen to neighboring node modules that are contained within its Markov blanket. In a preferred embodiment, listener modules are pinged by the network monitor module 1000 whenever a change in the structure of the network model is detected to facilitate in the updating of each affected node's CPT and module data. A node module is specifically aware of the node modules of nodes within its Markov blanket 2001, FIG. 2, or a portion thereof.

Graphically, logical relationships can be represented as edges established between nodes and probabilistic relationships are in a preferred embodiment represented as directional edges or most preferably arcs between established nodes. Entries associated with each node are thus probabilistically and logically associated between nodes within the model network for further analysis and manipulation.

The network verifier module 1022 relies upon each node verifier module 1014, 1014B to maintain dependency, probabilistic relationships, logical relationships, mathematical relationships, and influential relationships among the collection of nodes within a model network. The network verifier module works in conjunction with the node verifier modules 1014, 1014B to maintain adherence to Bayesian network rules and theorems. The distribution of authority within the invention allows for the invention and its inference system to perform in an economical fashion, requiring less processor time, and less memory over the prior methods utilizing a model network-wide monitoring and calculations, wherein such prior which approaches involve NP-hard computation.

In a preferred embodiment, sensor data ranges record can include a flag to indicate whether or not the sensor reading should be considered when performing diagnosis. The sensor data is taken into account during system evaluations when streaming sensor data falls within the predetermined ranges. The sensor data range can be assigned flags comprising "isSteadyState" flag in a user specified range of sensor output. In a preferred embodiment, the complimentary range can be assigned "isFailureState" flag. Data falling within of "isSteadyState" flag range can be ignored, thus saving processing resources. Typically, an assets' sensor data falling within "isFailureState" flag range is interpreted as the asset to be in a "failure mode state" of operation. Wherein a failure mode state has been detected, or if the probability of failure mode state has risen above a predetermined level of probability, the detection of such an event can trigger a messaging service to render a message, such as a work order, to be posted. The posted message can further be sent to a technician for further human analysis, for personal inspection of the asset.

In a preferred embodiment, the graphical verifier module listens and observes node module activity present within the Bayesian network model architecture 1018, and or the system network architecture 1023. In a preferred embodiment, wherein a user manipulates a first probability value of a state of a first event of probabilities of a node's CPT, CPTs of dependent nodes can be subsequently affected. CPTs are housed and monitored by each node's CPT module 1011, 1011B. A second set of CPTs are generated to reflect the manipulations of the user based on the previously established logical relational data structure, probabilistic relational data structure, mathematical relational data structure and the manipulated first probability value. The second set of CPTs is associated with a modified model and can co-exist in memory with the CPTs of the unmodified network model. The calculations of the second set of CPTs, comprising a second probability of the second state of the second event are mathematically based on the user modified probability of the first event. The logical relational data structure of the modified model network is based upon the logical relationship of the first model network by maintaining the constraints imposed by the logical relationships among the events of the graphical model.

In a preferred embodiment, wherein a sensor can be employed for accumulation or streaming of continuous range data of an event, a data interface module, present within a node module, can manipulate the data, perform a user specified transformation function for generation of a discrete representation of user specified range values for population of a CPT. In a preferred embodiment CPT values are handled by their specific CPT module, present within its respective node module. The CPT thus generated comprises a probability vector of discrete variables representative of a continuous variable.

The probability vector, 1703 FIG. 15, can be further manipulated during run-time by the user. The probability values can be altered, at the user's request, to more closely reflect the characteristics of a Laplace distribution, a normal distribution, or other known mathematical distribution. Additional alterations of the data can also be performed by blending, coalescing and smudging. At least a portion of these alterations can be performed by the user through a node properties window 1601 by activation of tools 1501, 1502, 1503 & 1504.

The degree to which the alterations are calculated are based upon a user selected metric, in a preferred embodiment between zero and unity. In a preferred embodiment this metric can be selected and executed by the use of a graphically represented slider presented to the user in the GUI. The terminal positions of the slider represent the numerical limitations of the metric, namely one and zero. Repopulation of the affected CPT can occur iteratively during re-evaluation of the CPT. Re-evaluation can also be triggered by the manipulation of a distinct probability of the events of the graphical model. In a preferred embodiment the re-evaluation executes at run time until a predetermined condition is met. CPT population and re-evaluation can be performed under the constraints of a predetermined condition, selected from the group comprising: steady state convergence, value convergence, threshold attainment, threshold excess, range attainment, finite iteration execution, expected bound attainment, divergence, time constraint.

In a preferred embodiment re-population of CPTs is performed iteratively and can employ a simulation selected form the group of methods comprising: Laplace, semi-analytic, Markov, Monte Carlo, Gibbs, smudge, blend and variational simulation methods.

Data Generator Interface Manipulation

Figure 20:
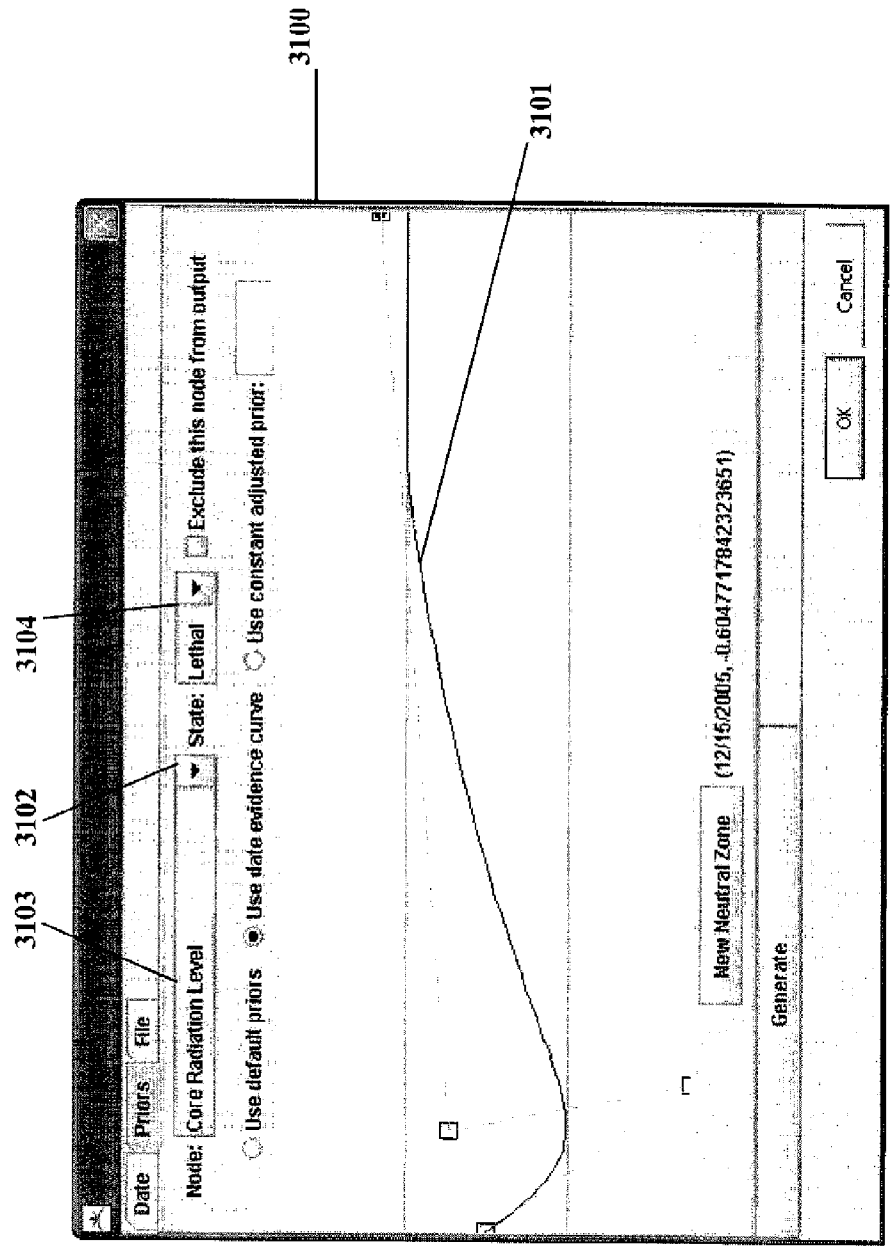
FIG. 20 illustrates an exemplary use data evidence curve option of a prior tab of a data generator window which supports a data generator module in accordance with one or more aspects of the present invention.

In a preferred embodiment the user can be presented with a case data generator window or widget, as illustrated in FIG. 20. Generation of case data is handled by a case data generator module, typically found within the network module 1024, or within the random data module 1008, FIG. 10. In a preferred embodiment, at least a portion of the case data is employed by the graph population module and at least a portion of the CPT population modules for further manipulation and subsequent population of CPTs within a Bayesian network. Other network models or probabilistic models, can comprise a directed acyclic graph, a graphical Gaussian model, a Markov network, a Hidden Markov model and a neural network.

In a preferred embodiment case data can be associated with a specific node through the use of a drop down menu 3102 which can present names or labels 3103 of previously established nodes. The data or a portion thereof can be used in other tables of the network nodes.

The case data generator window 3100 in a preferred embodiment is presented to a user as a sub-panel, allowing the user control of the creation and handling of data through the manipulation of a curve 3101, as illustrated in FIG. 20. The case data generator window can be presented to a user for indication of a related first event among a collection of situationally related event labels. For example, related event labels 3104 can comprise "none," "mild," and "lethal" for the representation of states of events of a node representing "Core Radiation Level." As stated before, events modeled with the Bayesian network can be observable or unobservable.

Figure 21:
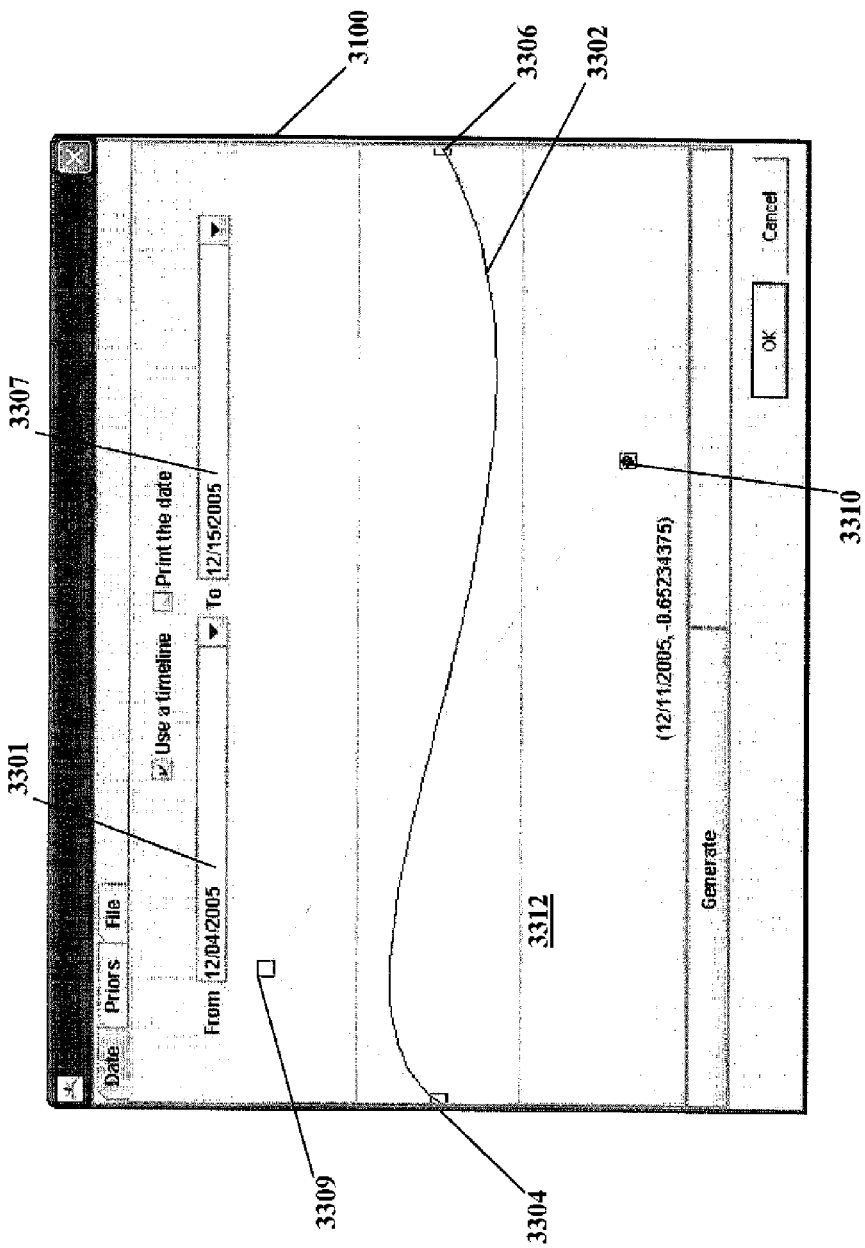
FIG. 21 illustrates an exemplary timeline option, between Dec. 4, 2005 and Dec. 15, 2005, date tab of a data generator window which supports a data generator module in accordance with one or more aspects of the present invention.

In a preferred embodiment, the user is presented through the case data generator window 3100, the ability to assign time constraints 3301, 3307 upon the end points of curve 3302, as illustrated in FIG. 21. The user can establish a time range for which the data cases will be generated which comprises a date range and can handle any legitimate increment. The establishment of the association of each end point 3304, 3306 with a date 3301, 3307 respectively defines a date range for which the case data will be generated. Other points, such as control points 3309, 3310 are provided to the user through the window with which the user can manipulate the shape, direction and path of the curve 3302. This manipulation is performed via a mathematical properties module which handles the properties and appearance of the curve 3302 and is preferably present within the system network architecture 1023. This functionality thus creates a user manipulable distribution of an incidence profile of observable or unobservable events. The events are generated with respect to a user defined time unit within the user manipulable time interval. The case data generator module can interpret the creation of a curve as a probability distribution representing probabilities of an occurrence of the first event within the time interval. Data cases are subsequently created, based on the probability and distribution of the related first event. Thus, creating a user manipulable distribution of an incidence profile of an event of interest.

In a preferred embodiment, the user is also free to establish and manipulate a time interval of which the events occur. The events can be observable or unobservable, depending upon the nature of the situation under observation. The control points 3309, 3310 allow the user to specify the occurrence of an event over a predetermined time frame. The window and case data generator module allow the user to click upon the curve presented and edit the positioning of data points along the curve. Preferably a free-hand drawing tool is implemented within the case data generator module for curve 3302 manipulation.

In a preferred embodiment, the case data generator module preferably employs a Bezier Curve (BC) module for mathematical control and graphical interpretation of the curve. It is possible to control the shape of the curve at its endpoints and at least one point along the curve for the manipulation of case data generated by the case data generator module through user manipulation of the curve. The metadata of the original network is used in conjunction with a data generator to create sample states for each node while incrementing appropriate values. In a preferred embodiment, after the processing of sample states has been completed, each CPT of the associated Bayesian network model is examined by node verifier modules. Other preferred implementations fit natural cubic splines, b-splines, or other graph-able functions to points that the user has chosen.

To allow the user to edit the curve directly, the BC module recognizes user input in a preferred embodiment through the use of a mouse or similar pointing device. Wherein a user clicks on or near the curve, within a curve editor panel, a control point is established, such as control point 3309 or 3310. The control point's data is collected by the BC module's rendered point module. In a preferred embodiment this module employs a getRenderedPointAt( ) method. An integer can be passed to the method based upon a counter and the number of points specified in the editor sub-panel 3312. Preferably, a co-existing method on Curve(DoublePoint point) returns the rendered point that is within a predefined tolerance of the intended coordinates of the mouse click, about the curve 3302. A numerical position of the point is stored in a list of curve points. The tolerance is adjustable to allow for control of data granularity. Curve point tolerance can be manipulated via a tolerance interface which is preferably accessed by the BC module.

In a preferred embodiment, the BC module further comprises an array which tracks user flagged rendered points. During painting of the panel, a paintCurvePoints( ) paint method access the rendered points, checks an array of points collected, and paints the points accordingly. Looping occurs through the array each time to evaluate which points need to be located on the rendered curve. The shape of the curve is based on the intended location of data points, data point tolerance and the order of the points.

During editing of the curve, a user can drag rendered points to an intended position wherein an approximate control point is rendered indicating a newly established point along the curve. Wherein an existing point is within the tolerance of the pointer position, a new control point is created when a click is performed in an empty zone. Subsequently, the curve is calculated based upon the update when the editor repaints the screen. Selecting a point with the pointing device can affect the control points. Curve point data can be saved explicitly allowing for a user to drag points along the curve thus allowing painting of a smooth and continuous rerendered curve. In a preferred embodiment, the curve can be calculated based upon the changes recognized by the Bezier Curve module.

In a preferred embodiment, data cases comprise fields and records, the fields comprising values, which can be constrained by the probabilistic influential relationships as defined by a probabilistic model to maintain data integrity, tolerance and accuracy.

In a preferred embodiment of the invention, the user can draw original data values from an existing historical record of some system that has been modeled via the representation, and can superimpose various interesting scenarios on that historical data by graphical manipulation of one or more events over time. This provides a quick and intuitive capability to test the model representation and inference system on rare events given plausible starting conditions.

GUI Node Representation Visualization and Manipulation

A preferred embodiment comprises a method for processing conditional probabilities comprising computer implemented steps of creating a representation of a first event and a representation of a second event within a user manipulable environment. The graphical workspace is traditionally presented to the user on a display device or other type of monitor. Typically the method is performed in a computer implemented system having at least one processor or virtual machine, at least one memory unit, at least one processing unit, at least one input device, at least one output device, optionally a network, optionally shared memory among the at least one processor. Preferred steps involved in the method are illustrated in FIG. 11.

In a preferred embodiment a user manipulable environment displays a graphical user interface (GUI) presenting a workspace to a user, wherein the workspace supports the graphical representation, as illustrated in FIG. 13. The GUI allows for the generation and manipulation of a graphical representation of a graphical network, such as a Bayesian network or other graphical model used to simulate a model system as a representation of a system under observation. Graphical representation of a system typically comprises arcs and nodes. Additionally, the GUI presents a first palette of user manipulable graphical objects. The first palette can comprise a tool palette 1301 comprising a pointer, a hand, a magnifier, a text tool, a paintbrush, a paint can, an erasure, and a spray can, file command tools 1401-1404, network command tools, a CPT tool, a first logical tool, a second logical tool and a third logical tool. In a preferred embodiment, an object palette is also offered to the user within the graphical workspace by presenting a collection of icons representing graphical objects, such as a new node icon 1302, a new edge icon, a new arc icon 1306 for the creation and manipulation of nodes, edges and arcs, respectively. Nodes are typically used to represent a first state of a first event, such as the state of a condition of an asset.

Graphical networks such as Bayesian networks can be used to monitor the health of a system under observation, such as an engine or a pump and its related components. Wherein a Bayesian network is employed, a node can be typically employed to represent the state of the conditions of the related components. Components such as a power source, or a battery can each be represented with a node, indicating the state of the component. State values can comprise "operational", "failing", "needs adjusting" and "inoperative" for example.

Graphical objects such as nodes and arcs for representation of the environment or system under observation can be added or deleted by a user during the construction or execution of the graphical model. The manipulations are recognized by at least one graph verifier module, present within a system network architecture 1023 FIG. 10, for verification and adherence to graphical theorems defined by the specific graphical network model being employed. Typically, the insertion of a new node into a graphical model is recognized when an arc connecting it to an existing node is allowed by at least a governing portion of the graph verifier module. Nodes modules, 1009 1009B 1017, further comprise node graph verifiers which allow for insertion of legal arcs between nodes of the graphical model. Upon the verification of an arc, mathematical relationships, logical relationships and probabilistic relationships are established between the recently connected nodes, and at least a portion of the nodes within the Markov blanket 2001, FIG. 2.

Dependent mathematical relationships between nodes are indicated by arcs whereas a lack of an arc is indicative of an independent mathematical relationship. Graphical networks are typically represented by graphical models comprising Bayesian networks, directed acyclic graphs, graphical Gaussian models, Markov networks, Hidden Markov models, neural networks and other graphical models. Further, systems under observation can comprise observable events and unobservable events. Observable events are typically distinguished by a domain expert, or other user, during observation of the system under observation and typically used to name or label events associated with nodes. Note that, with regard to the instant invention, any user of a data processing system can play the role of a domain expert, the term is not limiting with respect to potential users.

In a preferred embodiment, upon the verification of a new arc, the CPTs of the recently related nodes are subsequently updated and populated to reflect any additional probabilistic influence which the newly introduced node can exude. Population of the CPT is handled through the node population module which communicates with the network's data generation module which is preferably present within network module 1024, FIG. 10. The CPTs of the related nodes can be presented to a user for manipulation. Entries of the recently inserted CPT reflect mathematical constraints imposed by the graphical representation upon entries of the remaining CPT and can be graphically represented in the workspace for inspection and manipulation.

In a preferred embodiment, a user can manipulate the execution regime of an inference system, thus allowing for user manipulation of accuracy, execution time and other process metrics.

Figure 2:
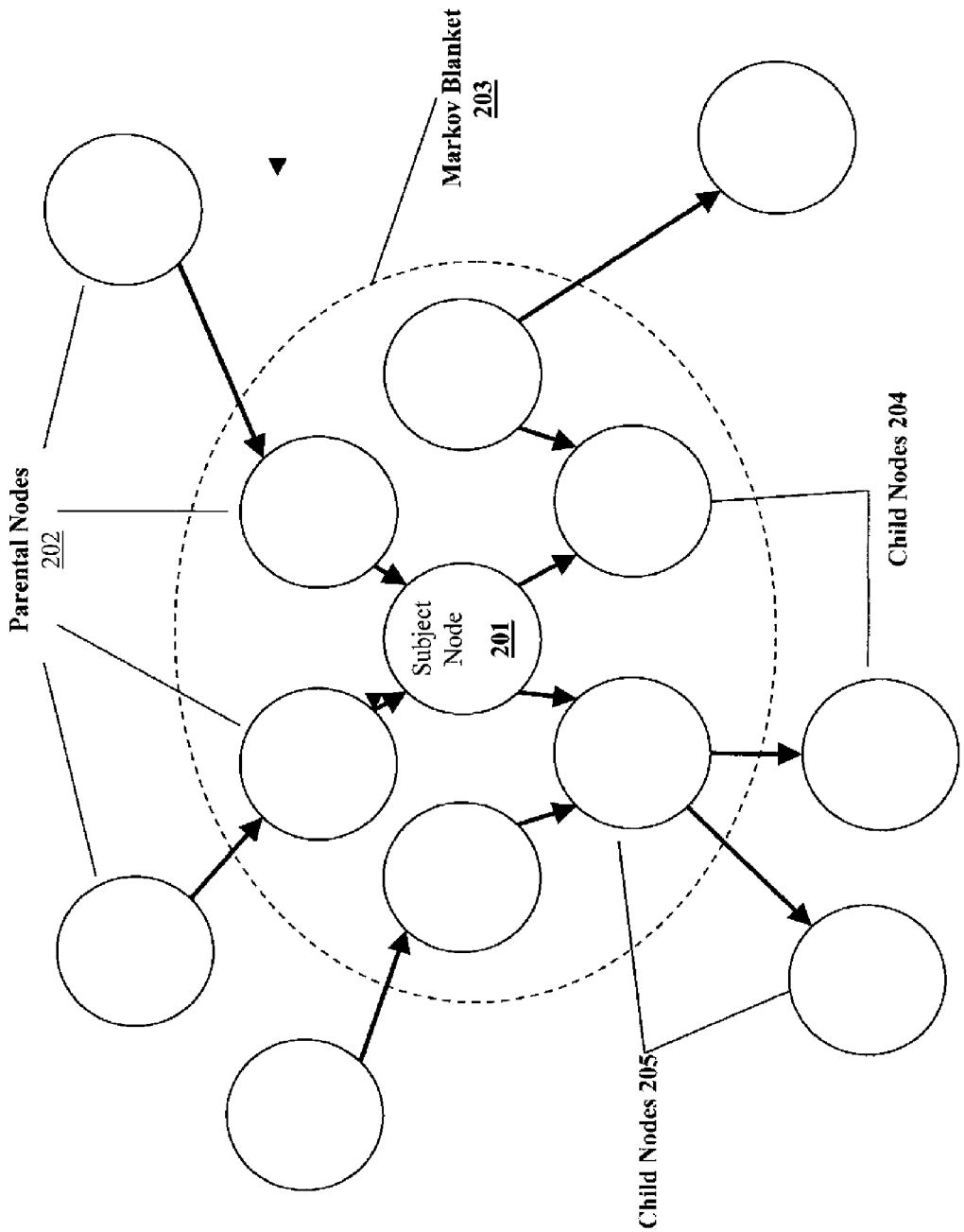
FIG. 2 illustrates an example of a Markov blanket in accordance with one or more aspects of the present invention.

As with the introduction of new graphical objects, the manipulation of a first node's CPT is recognized by its node CPT module, which propagates a change intention signal to node modules within a Makov blanket, 2001, FIG. 2. Subsequent signaling can propagate throughout the model network architecture 1018, FIG. 10, to other nodes and their respective modules within each node's Markov blanket but is dependent upon predefined system constraints. Affected CPTs of other nodes are subsequently updated to reflect the changes made to the first CPT, thus exhibiting inference with respect to states of affected events. Entries of the first conditional probability table and the entries second conditional probability table thus reflect probabilities of the states of events of their respective nodes. Node population modules subsequently populate affected CPTs reflecting the manipulations of the first conditional probability table.

CPT Graphical Manipulation

In a preferred embodiment a user can be presented with a GUI such as a CPT column value window FIG. 18 within the workspace for viewing, editing and manipulation of probabilistic values 2707, 2708 of events associated with a selected node. Typically the CPT column value window 2701 is launched by initiating a menu, such as a drop-down menu associated with the selected node. Upon initiation of the CPT column value window 2701, a user is presented with a CPT of the selected node. In the example presented node C7 is being exemplified and is influenced by nodes C1, C2, C3, C6 as can be seen upon inspection of FIG. 18. The CPT can be toggled between two presentation states. In the first state, the user is presented with numerical values of the probabilities of the events of the selected node in a table format, as illustrated in FIG. 19. The table can be expanded to show the labels of the selected node's parental nodes, in this example nodes C1, C2, C3 and C6, thus revealing the Boolean state values of the parental nodes in the table. A first set of probability values of a first conditional probability table representing at least one state of an event are presented to the user to allow the user to view and manipulate those values. The set of probability values are presented for editing, manipulation or manual population. Re-establishment of the values by a user will be monitored by the specific node CPT module for normalization and compliance to graphical model constraints. Typically, the values are normalized for each logical state, such as 2712, of the selected node. The logical state, 2712, typically comprises the specific logical states, such as true and/or false, of the selected node and the specific logical states of its parental nodes. Normalization is typically performed by the selected node's node monitor module.

The logical states of the parental nodes can be hidden from view, or exposed by the user, through an expansion table toggle. A user can expand the view of logically related nodes and be presented with at least one subject node name or label, and a list of node labels of at least a portion of the parental nodes of the subject node, typically listed in a specific order. In a preferred embodiment, the nodes are listed in logical order as they are logically represented within the Bayesian network model. In a preferred embodiment, users can specify any number of alternative orderings for nodes, and the system will display nodes as required by a given ordering.

In the second state of the CPT column value window, graphical representations of the first set of values of the selected node's conditional probability table are graphically presented to the user in proportion to the magnitude of the individual values of its associated CPT, as illustrated in FIG. 18. Typically, the probability values are represented graphically for user manipulation in a preferred embodiment by a vertically aligned graphic, which resembles a sectional bar graph, such as 2711. The graphic is used to represent the respective probabilities of each logical state, 2704 2705, of the selected node, C7. A portion of the graphic is associated with a first state 2706 of the node and is indicated with a first color. The remaining portion of the graphic 2709 are similarly associates a numerically proportional portion of the area of the graphic with the value of the probability of its respective state. Each state is associated a distinct color, so as to be visually distinct from neighboring portions. Each portion of the graphic is proportional in area to the value of the probability of the node's states. The probability values of the states are handled by the node's CPT module and are accessed by the CPT column value window module for graphical representation. Further, the actual numerical value, 2707 2708, of the state is presented in its respective graphic portion.

Further, a slider 2710 is presented to the user that is preferably located between each portion 2706 2709 of the graphic. Through graphical manipulation of the slider 2710, a user can simultaneously adjust the CPT's state probability values 2707 2708. This functionality allows rapid manipulation of a node's CPT through the CPT column value window. The graphical manipulation is handled by the CPT column value module and passes an adjustment intention to the selected node's CPT module for acknowledgement and manipulation of the node's CPT. Thus, proportional changes of the user manipulated graphical representation are represented and expressed in the node's CPT and are reflected in the selected node's graphical CPT representation.

In a preferred embodiment more than two logical states can be represented within the CPT column value window 2701, thus presenting the user additional sliders, similar to 2710, for graphical manipulation of numerical values present within related CPTs.

In a preferred embodiment the CPT column value window is used in conjunction with a Bayesian network, yet can also be used with other graphical network models such as a directed acyclic graph, a graphical Gaussian model, a Markov network, a Hidden Markov model and a neural network for graphically representing at least a first conditional probability table and a second conditional probability table of logically related events.

Multiple CPT column value windows can be presented to a user at the same time, thus allowing simultaneous representation of the CPTs of two nodes associated with a common graphical model. Wherein the nodes are probabilistically dependent, user manipulation of the first CPT can affect the values of the second CPT. Probability values of a first event of the first node, and probability values of a second event of the second node can be represented through their respective CPT column value windows. Manipulation of a first probability value, either by way of the slider or through textual manipulations, will affect the second CPT. User manipulation of the first CPT will be recognized by the affected node module and will subsequently initiate the inference node module.

Through the use of slider 2710 via the second state or through use of textual manipulation via the first state, the CPT can be manipulated by the manipulation of the probability values of the second state of the CPT column value window.

The manipulation of the probability value will cause the graph listener module to recognize the selection of the effected CPT and its associated node as an evidence node, thus initiating the inference module. The inference module will then perform its calculations and related functions based on the manipulated CPT thus signaling other probabilistically related node modules to initiate a generation of a second set of CPTs within the model network, and possible construction of a modified Bayesian network model architecture 1018, FIG. 10.

Wherein the second state, as illustrated in FIG. 18, of the CPT column value window is activated a proportional graphically representation of the modified CPTs will appear as the CPTs of the affected node are populated by the node's population module. Thus, the manipulated graphical representations of the first nodes CPT will graphically manipulate the CPTs of the probabilistically related nodes and reflect inference as dictated by the graphical model.

In a preferred embodiment, the CPT column value window can employ the previously described bar graph or can employ a graphical representation or a graph lending proportionality to numerically representational area such as a graph selected from the following: a histogram, a bar graph, a radial bar graph, a bar chart, a block diagram, a candlestick chart, a glyph, a pictogram, a pie chart, a scatterplot, a scatter graph, a Karnaugh map, a Veitch diagram, a box plot, a Venn diagram, a Euler diagram, a Johnston diagram, a box-and-whisker diagram, a Smith chart. Other graphical representations can be employed such as graphics which reflect an associated probability of an event with a graphical dimension proportional to the magnitudes of at least one of the values of the conditional probability table of a node.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

We claim:

1. In a computer system, having at least one processor or virtual machine, at least one memory unit, at least one input device and at least one output device, and optionally a network and optionally memory shared among the at least one processor, a data processing method for modifying probabilistic data structures comprising the computer implemented steps of:
   g. creating a representation of a first event and a representation of a second event of a model system;
   h. creating a representation of at least one logical influential relationship between the first event and the second event;
   i. creating a representation of a probabilistic relational data structure incorporating probabilistic influences of the at least one logical influential relationship between the first event and the second event;
   j. populating the probabilistic relational data structure with a first set of probabilities representing the probabilistic influences between the first event and the second event;
   k. creating a modified probabilistic relational data structure while maintaining the logical influential relationships between the first event and the second event; and
   l. populating the modified probabilistic relational data structure with a second set of probabilities representing modified probabilistic influences between the first event and the second event while preserving the logical influential relationships between the first event and the second event.

2. The method of claim 1, further comprising providing the user with the ability to encode a behavior of a boolean operator in the representation, by creating a probabilistic relational data structure incorporating probabilistic influences of the at least one logical influential relationship between the first event and the second event, where the boolean operator is at least one chosen from the group consisting of: "AND", "OR", "NOT", "NOR", "NAND", and "XOR".

3. The method of claim 2, wherein creating a representation of a probabilistic relational data structure encoding the behavior of a Boolean operator provides the user with mechanisms and tools for encoding expert rules in a network comprised of probabilistic relationships.

4. The method of claim 2, further comprising encoding the representation of the events and logical influential relationships, reflecting constraints implicit in a graphical model, where the graphical model is at least one selected from the group consisting of:
   a Bayesian network, a directed acyclic graph, a graphical Gaussian model, and a Hidden Markov model.

5. The method of claim 2, further comprising encoding the representation of the events and logical influential relationships of the probabilistic relational data structure, reflecting constraints implicit in a graphical model, wherein the graphical model is at least one selected from the group consisting of:
a Bayesian network, a directed acyclic graph, a graphical Gaussian model, a Markov network, and a hidden Markov model.

6. The method of claim 2, further comprising encoding the representation of the events and logical influential relationships of the modified probabilistic relational data structure, reflecting constraints implicit in a graphical model, wherein the graphical model is at least one selected from the group consisting of:
a Bayesian network, a directed acyclic graph, a graphical Gaussian model, a Markov network, and a hidden Markov model.

7. The method of claim 2, further comprising populating the first set or the second set of probabilities of the probabilistic relational data structure of the model system by at least one technique selected from the group of techniques consisting of:
an exact inference technique; an approximate inference technique; a sampling technique; and a random data generation technique.

8. The method of claim 2, further comprising defining the node functionality of the first event and the second event of a graphical model by enforcing a conditional probability table that associates the first event with the second event.

9. The method of claim 8, further comprising enforcing a logic operation between the first event and the second event wherein the logic operation is at least one selected from the group consisting of:
a unary Boolean logic operation relationship and a binary Boolean logic operation relationship.

10. The method of claim 8, further comprising enforcing at least one Boolean logic operation relationship selected from the group of relationships consisting of:
associativity, commutativity, absorption, distributivity and compliment; by filling appropriate values of a conditional probability table.

11. The method of claim 8, further comprising representing a Boolean logic operation relationship by using at least one node selected from the group consisting of:
an OR node, an AND node, a NOR node, a NAND node, an XOR node, and a NOT node.

12. The method of claim 8, further comprising representing a Boolean logic operational relationship involving multiple operators by a composed node exhibiting composed Boolean logic operational relationships wherein the composed node is composed of at least one selected from the group consisting of:
an OR node, an AND node, a NOR node, a NAND node, an XOR node, and a NOT node.

13. The method of claim 8, further comprising populating the probabilistic relational data structure and the modified probabilistic relational data structure by iteratively recalculating the values for the probabilistic relational data structure and the modified probabilistic relational data structure until a predetermined condition is met, wherein the predetermined condition is at least one selected from a group consisting of:
steady state convergence, expected value convergence, expected threshold attainment, expected range attainment, finite iteration execution, expected bound attainment, and divergence.

14. A monitoring system incorporating the method of claim 2, wherein the monitoring system monitors data sources relating to a dynamically changing system, and constructs alerts or communications relating to particular events or patterns of events occurring in the system, wherein the system is at least one selected from the group consisting of:
an engineering processor, a chemical processor, an electrical processor, an asset processor, a mechanical processor, a biological processor, a biomedical processor, a solar processor, a radiological processor, a manufacturing processor, an environmental processor, an agricultural processor, a monitoring processor, and an assembly processor.

15. In a computer system, having at least one processor or virtual machine, at least one memory unit, at least one input device and at least one output device, and optionally a network and optionally memory shared among the at least one processor, a method for processing relationships within a graphical model comprising the computer implemented steps of:
e. creating a probabilistic relational data structure comprising entries of a first probability of at least a first state of a first event and entries of a second probability of at least a second state of a second event, wherein the probabilistic relational data structure reflects constraints of (probabilistic relationships, logical relationships and influential relationships) as represented by the graphical model;
f. manipulating the first probability of the first state of the first event;
g. calculating the second probability of the second state of the second event based upon the manipulations of the first probability of the first event; and
h. maintaining the constraints imposed by the logical relationships between the events of the graphical model.

16. The method of claim 15, further comprising creating a representation of a probabilistic relational data structure incorporating probabilistic influences of the at least one logical influential relationship between the first event and the second event provides the user with the ability to encode a the behavior of a Boolean operator in the representation, where the Boolean operator is composed of at least one chosen from the group consisting of:
"AND", "OR", "NOT", "NOR", "NAND", and "XOR".

17. The method of claim 16, further comprising providing the user with the ability to encode expert rules in a network comprised of probabilistic relationships by encoding the behavior of a Boolean operator in the representation of a probabilistic relational data structure.

18. The method of claim 16, further comprising obtaining a parameter that controls the constraint requiring crisp logic behavior of the Boolean operator in the representation.

19. The method of claim 16, further comprising obtaining a parameter from the user wherein the parameter dictates the degree of crisp logic behavior to apply to at least one Boolean operator in the representation.

20. The method of claim 16, further comprising supporting user-manipulation of the first probability of the first state from a discrete variable to a continuous variable, and altering a set of complimentary probabilities of the first event and the second event while maintaining the constraints of probabilistic relationships, the logical relationships and the influential relationships imposed by the graphical model.

21. The method of claim 16, further comprising supporting manipulation of the first probability of the first state during run time, and concurrently updating a set of complimentary probabilities.

22. The method of claim 16, further comprising supporting a range of the first probability of the first state between zero and one.

23. The method of claim 16, further comprising supporting a representation of the logical state value of the at least one state of the events in the graphical model wherein the representation is at least one value selected group of values consisting of:
   true, false, not-true and not-false.

24. The method of claim 16, further comprising normalizing a probability distribution of each event of each state at run time.

25. The method of claim 16, further comprising creating a probabilistic relational data structure as represented by the graphical model wherein the graphical model is at least one model type selected from the group consisting of:
   a Bayesian network, a directed acyclic graph, a graphical Gaussian model, a Markov network, and a hidden Markov model.

26. The method of claim 16, further comprising the steps of:
   i. performing iteration of re-evaluation of the probabilities triggered by the manipulation of a distinct probability of the events of the graphical model, and
   j. executing the re-evaluation at run time until a pre-determined condition is met.

27. The method of claim 26, further comprising applying a predetermined condition wherein the predetermined condition is least one selected from the group consisting of:
   steady state convergence, value convergence, threshold attainment, threshold exceedment, range attainment, finite iteration execution, expected bound attainment, divergence, and time constraint.

28. The method of claim 26, further comprising re-evaluation of the probabilities employing at least one simulation method selected from the group consisting of:
   Laplace, semi-analytic, Markov, Monte Carlo, Gibbs, smudge, blend and variational simulation methods.

29. The method of claim 16, further comprising representing each event by a probability vector composed of the probabilities of each state of each event.

30. The method of claim 29 further comprising incorporation of at least one probability of the probability vector in generating of a conditional probability table of a desired state of an event.

31. In a computer system, having at least one processor or virtual machine, at least one memory unit, at least one input device, at least one output device, optionally a network, optionally shared memory among the at least one processor, a method for generating data from a user-specified profile comprising computer implemented steps of:
   e. identifying a first element among within a model system that contains at least one second element;
   f. creating a user-modifiable incidence profile of the first element per incremental unit of the second element within an interval of units of the second element;
   g. creating a probability distribution representing probabilities of a value of the first element within the interval of units of the second element; and
   h. generating data cases based on the probability and distribution of the first element.

32. The method of claim 31, further comprising representing successive states of an independent variable as an interval of units of the second element.

33. The method of claim 31, further comprising representing successive times of a time variable as an interval of units of the second element.

34. The method of claim 31, further comprising applying values from the fields of records to the probabilistic influential relationships defined by the probabilistic graphical model, wherein the records are drawn from data cases.

35. The method of claim 31, further comprising creating a probabilistic relational data structure as represented by the graphical model wherein the graphical model is at least one model type selected from the group consisting of:
   a Bayesian network, a directed acyclic graph, a graphical Gaussian model, a Markov network, and a hidden Markov model.

36. The method of claim 31, further comprising bounding the incidence profile within a particular range.

37. The method of claim 31, further comprising the steps of:
   i. initially obtaining the incidence profile from existing data, and
   j. optionally supporting modification of the incidence profile.

38. The method of claim 31, further comprising enabling the user's construction of a visible representation of a line, wherein the line represents behavior of the first element with respect to incremental units of a second element, and optionally wherein the user-modifiable incidence profile is created by the user.

39. The method of claim 38, further comprising enabling the user's construction of a visible representation of a line wherein the visible representation of a line is accomplished by at least one method selected from the group consisting of:
   selecting data points through which a line is constructed by linear regression;
   selecting data points through which a line is constructed by non-linear regression;
   selecting data points which connect a piece-wise linear line;
   selecting data points through which a quadratic function is fit;
   selecting data points through which a polynomial function is fit;
   selecting data points through which an exponential function is fit;
   selecting data points through which a trigonometric function is fit;
   selecting points through which a cubic spline is fit;
   selecting points that are used as control points for a Bezier curve; and
   selecting points that are used to patch together segments constructed by some other method.

40. The method of claim 31, further comprising the steps of:
   e. initially obtaining the incidence profile from existing data,
   f. depicting that profile as a visible line, and
   g. optionally modifying the line by obtaining at least one changed feature of the visible line from the user.

41. In a computer implemented system having at least one processor or virtual machine, at least one memory unit, at least one processing unit, at least one input device, at least one output device, optionally a network, optionally shared memory among the at least one processor, a method for generating and manipulating a graphical representation of probabilistically related events, the method comprising the computer implemented steps of:
   g. presenting a workspace to a user, the workspace supporting the graphical representation;

h. presenting a first pallet of user manipulable graphical objects, the graphical objects representing at least a first state of a first event;
i. presenting a second pallet of user manipulable graphical tools;
j. presenting at least one user manipulable first conditional probability table of a state of an event exhibiting inference with respect to a second state of a second event;
k. populating a second conditional probability table reflecting the manipulations of the first conditional probability table; and
l. populating the second conditional probability table of the second state to meet a user-selected metric of accuracy.

42. The method of claim 41, further comprising representing independent mathematical relationships and dependent mathematical relationships, wherein the graphical representation is at least one selected from the group consisting of:
   a Bayesian network, a directed acyclic graph, a graphical Gaussian model, a Markov network, and a hidden Markov model.

43. The method of claim 41, further comprising monitoring the user manipulable graphical objects comprising nodes and arcs, and concurrently updating the first and second conditional probability tables to reflect the user manipulations of the graphical objects.

44. The method of claim 41, further comprising representing the relationship between at least one state and at least one other state, wherein the user manipulable graphical objects comprise nodes and arcs for representation of the environment, wherein the nodes are representing the states and the arcs are representing mathematical dependence between the states.

45. The method of claim 42, further comprising representing at least one entry of the first conditional probability table and at least one entry of the second conditional probability table as a visible graph, wherein the entries are reflecting mathematical constraints as imposed by the graphical model representation.

46. The method of claim 45, further comprising portraying the probabilities of the states of events of entries of the first conditional probability table and the entries second conditional probability table.

47. The method of claim 46, further comprising portraying the probabilities of the states of events, wherein the probabilities of the states of the events reflect exact inference.

48. The method of claim 41, further comprising representing events as a node, and associating the events with a conditional probability table for the node.

49. The method of claim 42, further comprising using arcs for representing conditional dependencies among connected nodes, and using the lack of arcs between nodes for representing conditional independence.

50. In a computer implemented system having at least one processor or virtual machine, at least one memory unit, at least one processing unit, at least one input device, at least one output device, optionally a network, optionally shared memory among the at least one processor, a method for processing conditional probabilities comprising computer implemented steps of:
   e. presenting in a workspace a user manipulable graphical representation of a first set of values of a first conditional probability table representing at least one state of at least one event;
   f. reflecting proportional changes of the user manipulated graphical representation in the first conditional probability table;
   g. calculating inference of a second state of a second event of a second conditional probability table, the calculation being based on the user changes of the first conditional probability table; and
   h. proportionally graphically representing a second set of values of the second conditional probability table in a second graphical representation.

51. The method of claim 50, further comprising representing a graphical model relating the first conditional probability table and the second conditional probability table wherein the graphical model is at least one selected from the group consisting of:
   a Bayesian network, a directed acyclic graph, a graphical Gaussian model, a Markov network, a Hidden Markov model and a neural network.

52. The method of claim 50, further comprising the steps of:
   e. obtaining a user's manipulation of the graphical representations of at least one of the conditional probability tables, and
   f. propagating the influences a set of complimentary conditional probability tables of related events.

53. The method of claim 50, further comprising graphically presenting a visible representation of values of the first or second the conditional probability table to the user, wherein the visible representation is proportional to the magnitude of the individual values of the conditional probability table.

54. The method of claim 50, further comprising graphically presenting a visible representation of values of the first or second conditional probability tables by at least one visible representation selected from the group consisting of:
   a histogram, a bar graph, a radial bar graph, a bar chart, a block diagram, a candlestick chart, a glyph, a pictogram, a pie chart, a scatterplot, a scatter graph, a Karnaugh map, a Veitch diagram, a box plot, a Venn diagram, a Euler diagram, a Johnston diagram, a box-and-whisker diagram, a Smith chart, and a graphic reflecting an associated probability of an event with a graphical dimension proportional to the magnitudes of at least one of the values of the conditional probability table of a node.

55. In a data-processing system, having:
   one or more processors or virtual machines,
   each processor comprising one or more cores,
   the system comprising one or more memory units,
   one or more input devices,
   one or more output devices,
   optionally a network, and
   optionally shared memory supporting communication among the processors, a computer implemented system for modifying probabilistic data structures and processing relationships comprising:
   i. a means of creating a representation of a first event and a representation of a second event of a model system;
   j. a means of creating a representation of at least one logical influential relationship between the first event and the second event;
   k. a means of creating a representation of a probabilistic relational data structure incorporating probabilistic influences of the at least one logical influential relationship between the first event and the second event;
   l. a means of populating the probabilistic relational data structure with a first set of probabilities representing the probabilistic influences between the first event and the second event;

m. a means of creating a modified probabilistic relational data structure while maintaining the logical influential relationships between the first event and the second event;
n. a means of populating the modified probabilistic relational data structure with a second set of probabilities representing modified probabilistic influences between the first event and the second event while preserving the logical influential relationships between the first event and the second event; manipulating the first probability of the first state of the first event;
o. a means of calculating the second probability of the second state of the second event based upon the manipulations of the first probability of the first event; and
p. a means of maintaining the constraints imposed by the logical relationships between the events of the graphical model.

56. In a data-processing system, having:
one or more processors or virtual machines,
each processor comprising one or more cores,
the system comprising one or more memory units,
one or more input devices,
one or more output devices,
optionally a network, and
optionally shared memory supporting communication among the processors, a computer implemented system for generating data from a user-specified profile comprising:
e. a means of identifying a first element among within a model system that contains at least one second element;
f. a means of creating a user-modifiable incidence profile of the first element per incremental unit of the second element within an interval of units of the second element;
g. a means of creating a probability distribution representing probabilities of a value of the first element within the interval of units of the second element; and
h. a means of generating data cases based on the probability and distribution of the first element.

57. In a data-processing system, having:
one or more processors or virtual machines,
each processor comprising one or more cores,
the system comprising one or more memory units,
one or more input devices,
one or more output devices,
optionally a network, and
optionally shared memory supporting communication among the processors, a computer implemented system for generating and manipulating a graphical representation of probabilistically related events and processing conditional probabilities comprising:
g. a means of presenting a workspace to a user, the workspace supporting the graphical representation;
h. a means of presenting a first pallet of user manipulable graphical objects, the graphical objects representing at least a first state of a first event;
i. a means of presenting a second pallet of user manipulable graphical tools;
j. presenting at least one user manipulable first conditional probability table of a state of an event exhibiting inference with respect to a second state of a second event; and
k. a means of populating a second conditional probability table reflecting the manipulations of the first conditional probability table;
l. a means of populating the second conditional probability table of the second state to meet a user-selected metric of accuracy;
m. a means of presenting in a workspace a user manipulable graphical representation of a first set of values of a first conditional probability table representing at least one state of at least one event;
n. a means of reflecting proportional changes of the user manipulated graphical representation in the first conditional probability table;
o. a means of calculating inference of a second state of a second event of a second conditional probability table, the calculation being based on the user changes of the first conditional probability table; and
p. a means of proportionally graphically representing a second set of values of the second conditional probability table in a second graphical representation.

* * * * *